(12) United States Patent
Gray et al.

(10) Patent No.: US 11,555,687 B2
(45) Date of Patent: Jan. 17, 2023

(54) CAPACITIVE IMAGING GLOVE

(71) Applicant: SigmaSense, LLC., Wilmington, DE (US)

(72) Inventors: Patrick Troy Gray, Cedar Park, TX (US); Gerald Dale Morrison, Redmond, WA (US); Daniel Keith Van Ostrand, Leander, TX (US); Richard Stuart Seger, Jr., Belton, TX (US); Shayne X. Short, Austin, TX (US); Timothy W. Markison, Mesa, AZ (US)

(73) Assignee: SigmaSense, LLC., Wilmington, DE (US)

( * ) Notice: Subject to any disclaimer, the term of this patent is extended or adjusted under 35 U.S.C. 154(b) by 763 days.

(21) Appl. No.: 16/535,464

(22) Filed: Aug. 8, 2019

(65) Prior Publication Data

US 2021/0041218 A1 Feb. 11, 2021

(51) Int. Cl.
*G01B 7/287* (2006.01)
*G06F 3/01* (2006.01)
(Continued)

(52) U.S. Cl.
CPC ......... *G01B 7/287* (2013.01); *A41D 19/0024* (2013.01); *G01P 15/18* (2013.01); *G06F 3/014* (2013.01); *G06F 3/017* (2013.01)

(58) Field of Classification Search
CPC ...... G01B 7/287; G01B 7/14; A41D 19/0024; G01P 15/18; G01P 15/00; G06F 3/014; G06F 3/017
See application file for complete search history.

(56) References Cited

U.S. PATENT DOCUMENTS 6,218,972 B1   4/2001  Groshong
6,665,013 B1  12/2003  Fossum et al.
(Continued)

FOREIGN PATENT DOCUMENTS

CN   103995626 A   8/2014
CN   104182105 A  12/2014
WO   2019067144 A1  4/2019

OTHER PUBLICATIONS

International Searching Authority; International Search Report; International Application No. PCT/US2020/044179; dated Oct. 30, 2020; 10 pgs.

(Continued)

*Primary Examiner* — Alvaro E Fortich
*Assistant Examiner* — Zannatul Ferdous
(74) *Attorney, Agent, or Firm* — Garlick & Markison; Timothy W. Markison; Shayne X. Short

(57) ABSTRACT

A capacitive imaging glove includes electrodes implemented throughout the capacitive imaging glove and drive-sense circuits (DSCs) such that a DSC receives a reference signal generates a signal based thereon. The DSC provides the signal to a first electrode via a single line and simultaneously senses it. Note the signal is coupled from the first electrode to the second electrode via a gap therebetween. The DSC generates a digital signal representative of the electrical characteristic of the first electrode. Processing module(s), when enabled, is/are configured to execute operational instructions (e.g., stored in and/or retrieved from memory) to generate the reference signal, process the digital signal to determine the electrical characteristic of the first electrode, and process the electrical characteristic of the first electrode to determine a distance between the first electrode and the second electrode, and generate capacitive image data representative of a shape of the capacitive imaging glove.

20 Claims, 56 Drawing Sheets

(51) Int. Cl.
  *G01P 15/18* (2013.01)
  *A41D 19/00* (2006.01)

(56) References Cited

U.S. PATENT DOCUMENTS

| | | | |
|---|---|---|---|
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,547,114 | B2 | 10/2013 | Kremin |
| 8,587,535 | B2 | 11/2013 | Oda et al. |
| 8,625,726 | B2 | 1/2014 | Kuan |
| 8,982,097 | B1 | 3/2015 | Kuzo et al. |
| 9,201,547 | B2 | 12/2015 | Elias |
| 2007/0063992 | A1 | 3/2007 | Lundquist |
| 2011/0063154 | A1 | 3/2011 | Hotelling et al. |
| 2011/0298745 | A1 | 12/2011 | Souchkov |
| 2012/0278031 | A1 | 11/2012 | Oda |
| 2013/0278447 | A1 | 10/2013 | Kremin |
| 2014/0327644 | A1* | 11/2014 | Mohindra ............... G06F 3/044 345/174 |
| 2015/0091847 | A1 | 4/2015 | Chang |
| 2015/0346889 | A1 | 12/2015 | Chen |
| 2016/0188049 | A1 | 6/2016 | Yang et al. |
| 2017/0000369 | A1* | 1/2017 | Hyde ................... A61B 5/6806 |
| 2017/0344156 | A1 | 11/2017 | Jordan et al. |
| 2018/0125425 | A1* | 5/2018 | Garudadri ............ A61B 5/6828 |

OTHER PUBLICATIONS

Baker; How delta-sigma ADCs work, Part 1; Analog Applications Journal; Oct. 1, 2011; 6 pgs.

Brian Pisani, "Digital Filter Types in Delta-Sigma ADCs", Application Report SBAA230, May 2017, pp. 1-8, Texas Instruments Incorporated, Dallas, Texas.

* cited by examiner communication system 10 computing device 12 computing device 14 computing device 18

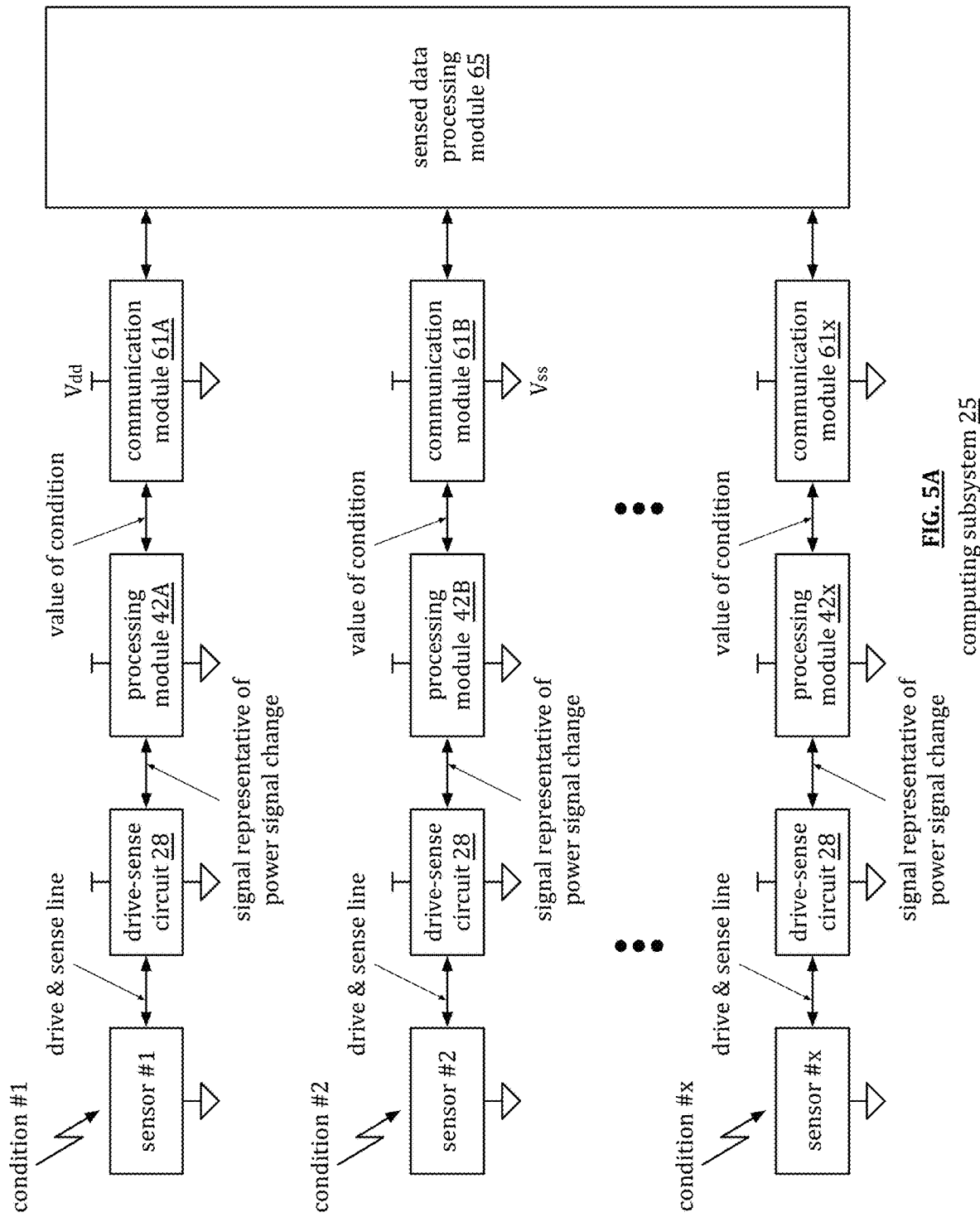

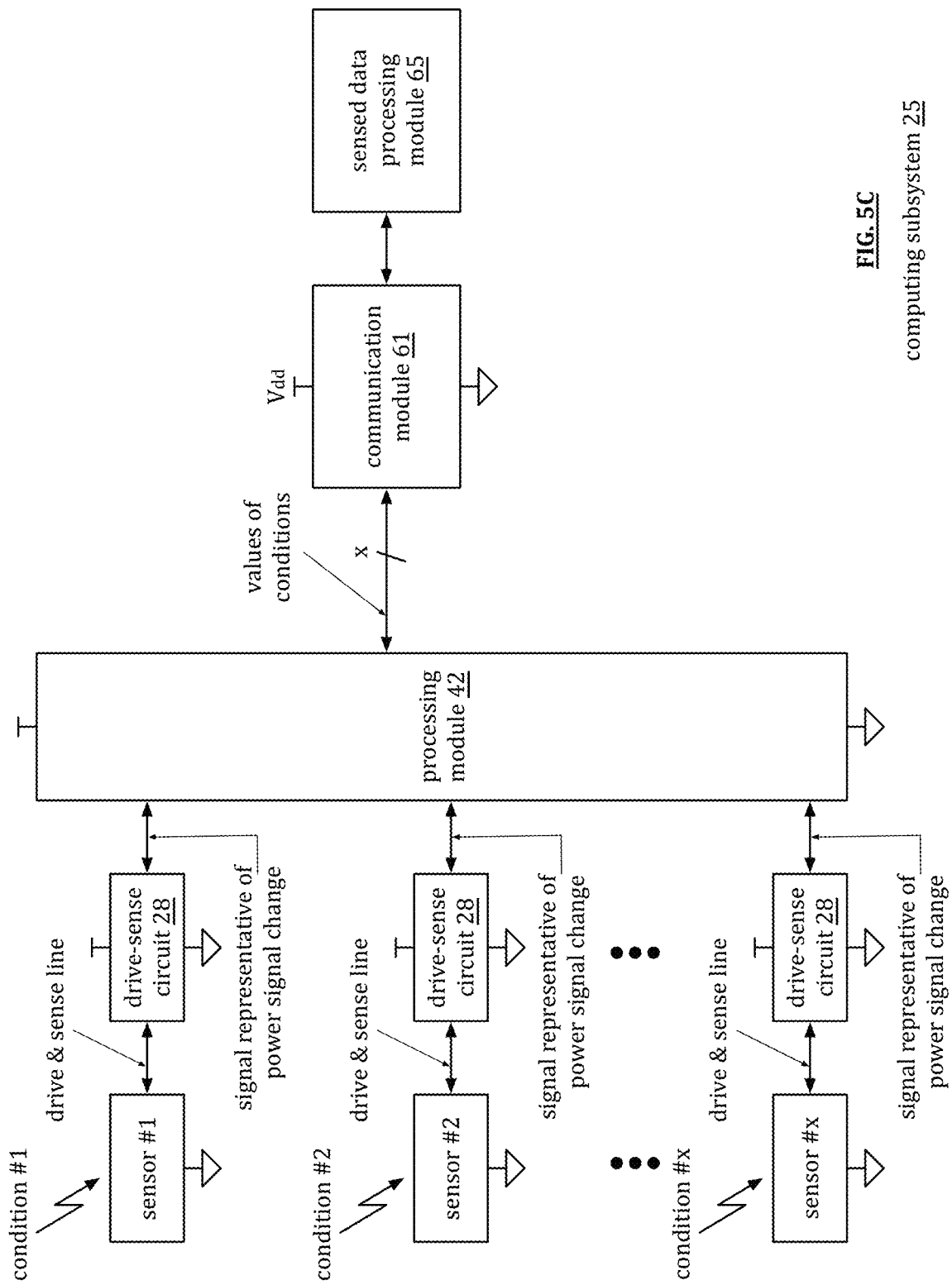

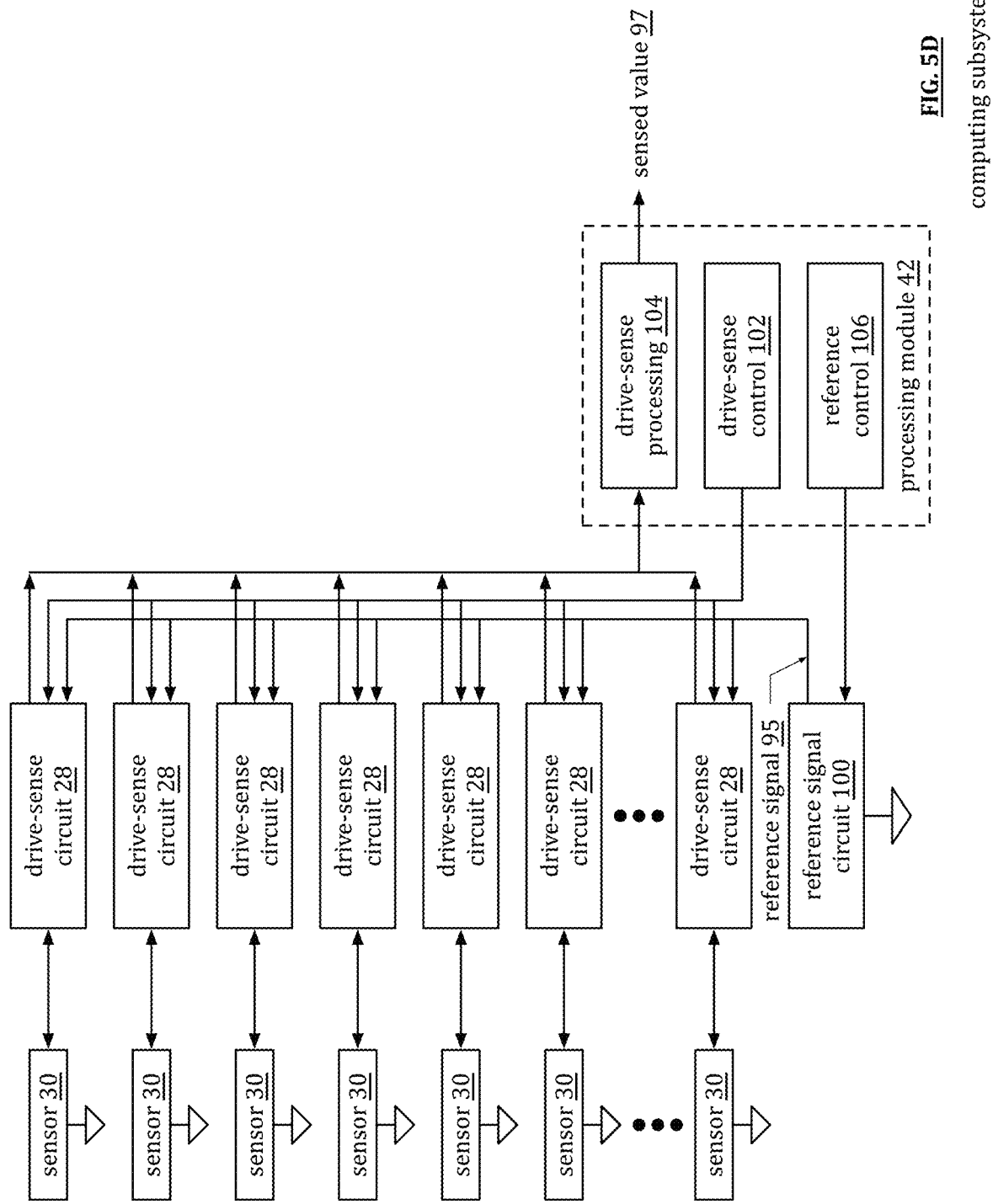

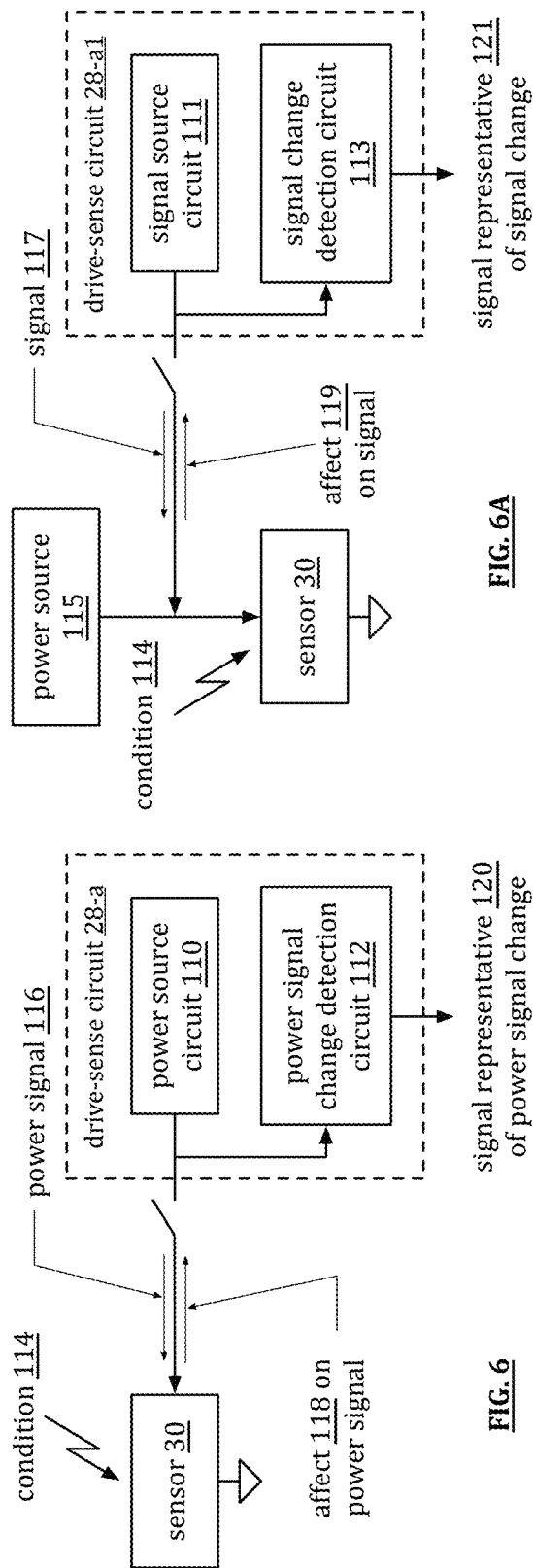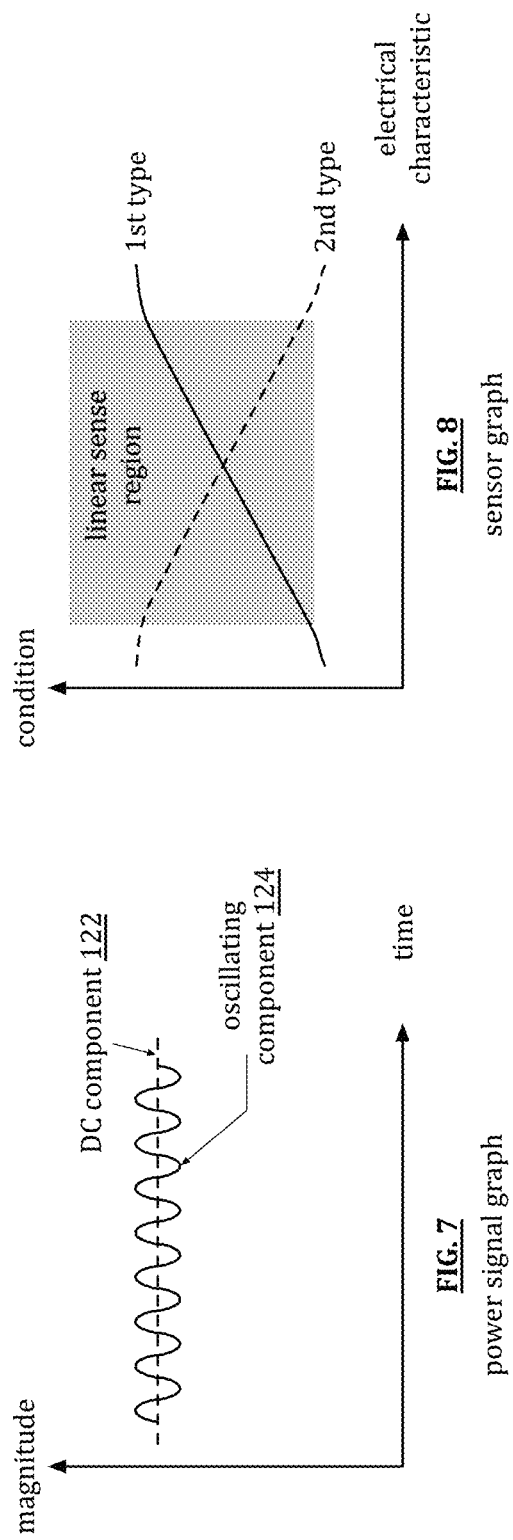

power signal graph power signal graph power signal graph power signal graph

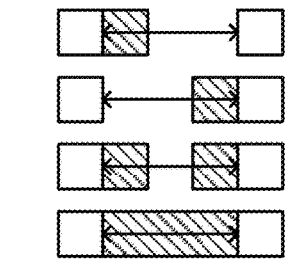

FIG. 14A 1401

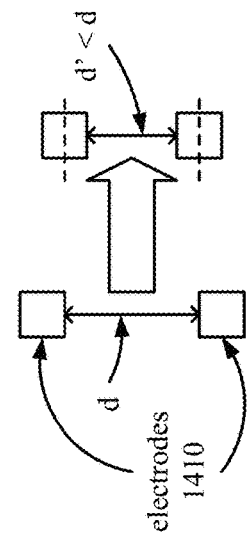

FIG. 14B 1402

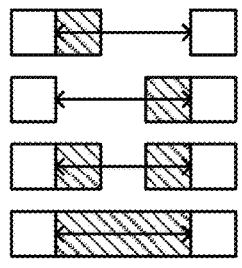

FIG. 14C 1403 electrodes 1410

$C = Q/V = \varepsilon_0(A/d)$ or $\varepsilon_0\varepsilon_r(A/d)$ decrease of capacitance (C to C'<C) as distance (d) between electrodes increases (e.g., d to d' > d)

increase of capacitance (C to C'>C) as distance (d) between electrodes decreases (e.g., d to d' < d)

at least some dielectric material ($\varepsilon_r$) between electrodes and/or compressible material

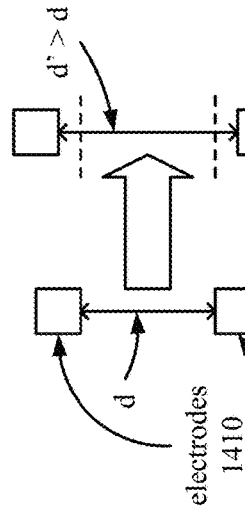

FIG. 14D 1404 each electrode connected to respective DSC electrodes 1410 drive-sense circuit (DSC) 28

DSC 28 ref. signal, power input, comm., I/F, control, digital information from DSC, etc.

processing module(s) 42 (incl. memory and/or coupled to memory)

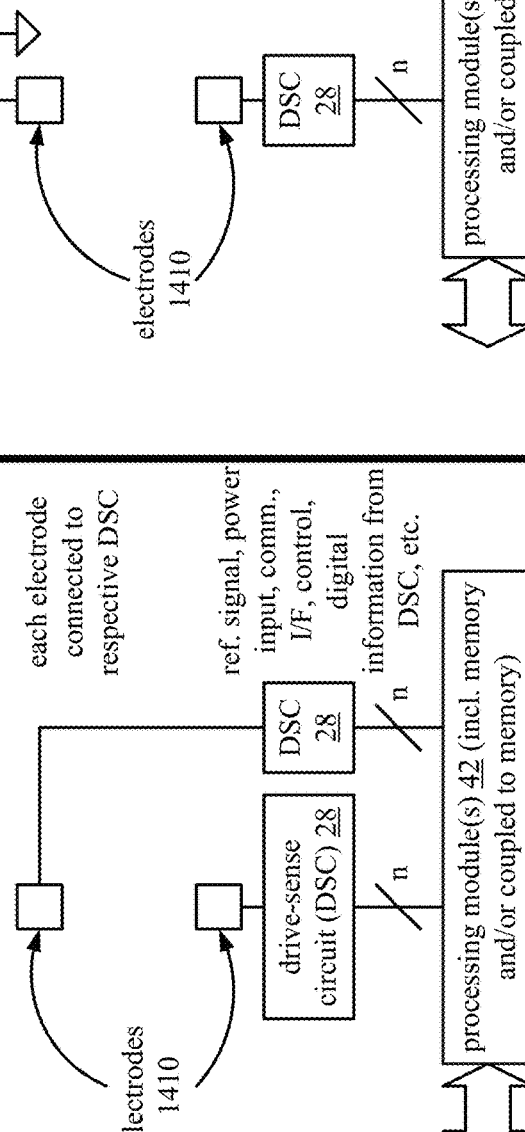

FIG. 14E 1405 electrode connected to a DSC, other electrode grounded (e.g., circuit/common or earth ground, or connected to other known voltage potential)

electrodes 1410

DSC 28 processing module(s) 42 (incl. memory and/or coupled to memory)

1701

1702

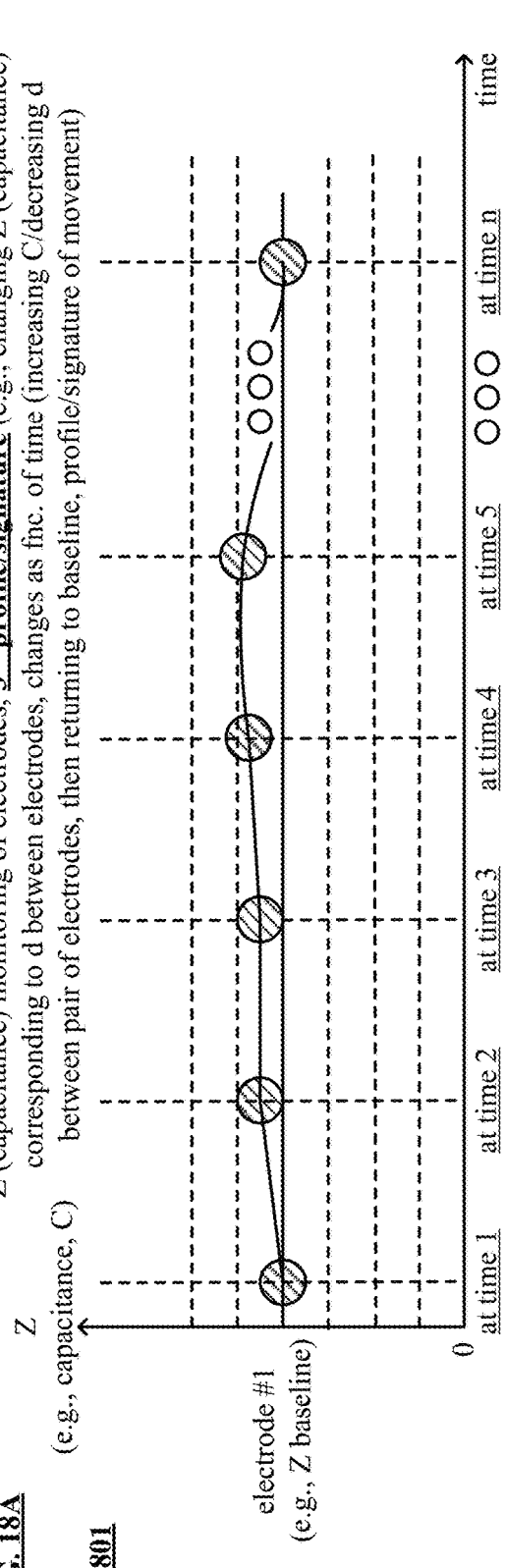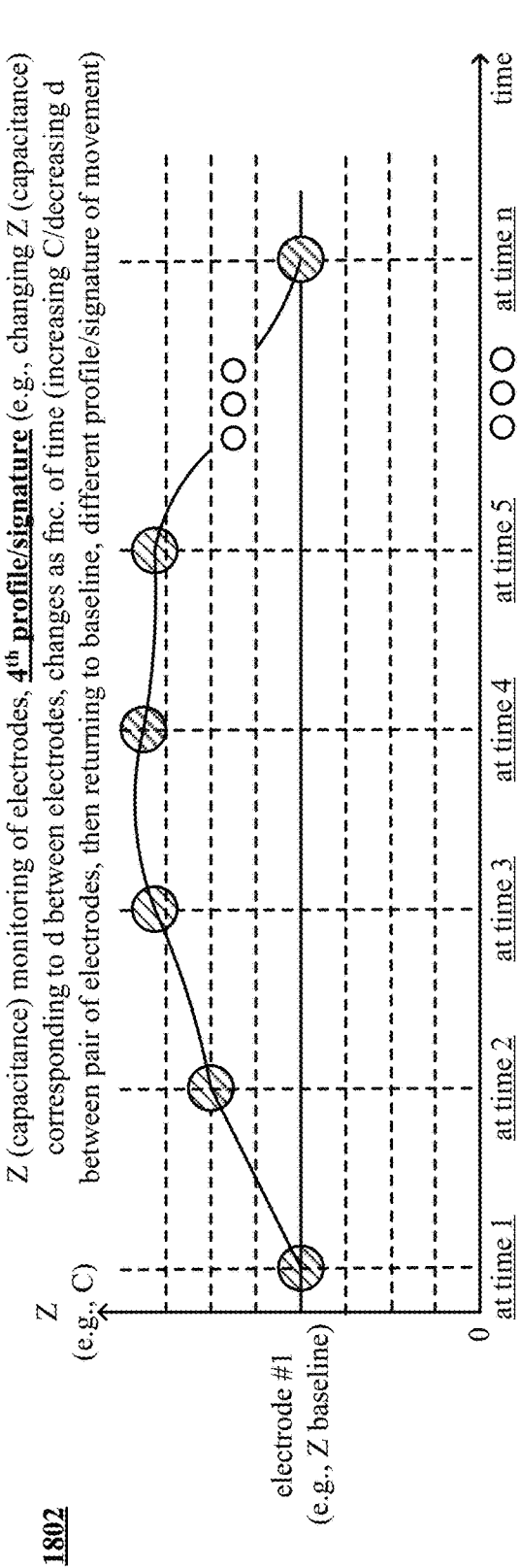

1901

1902

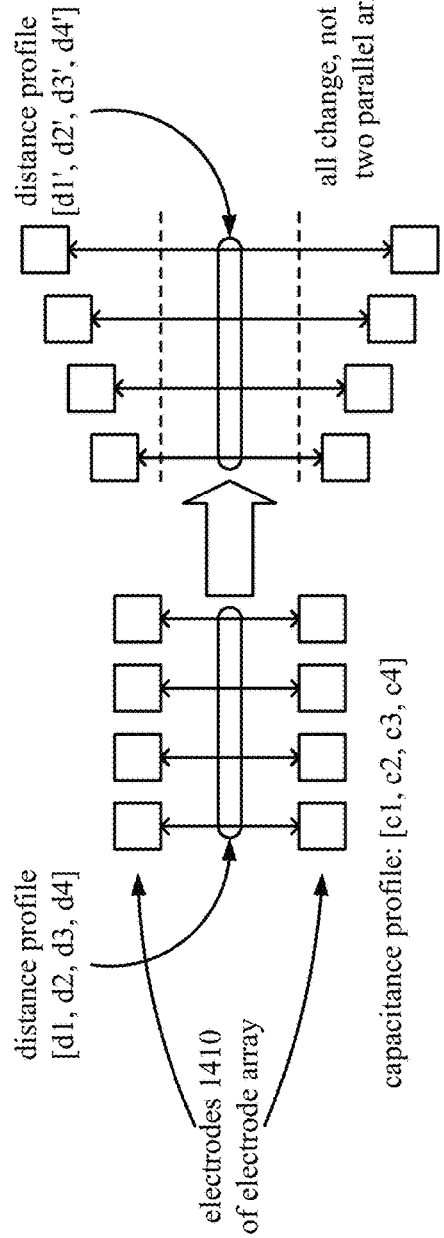
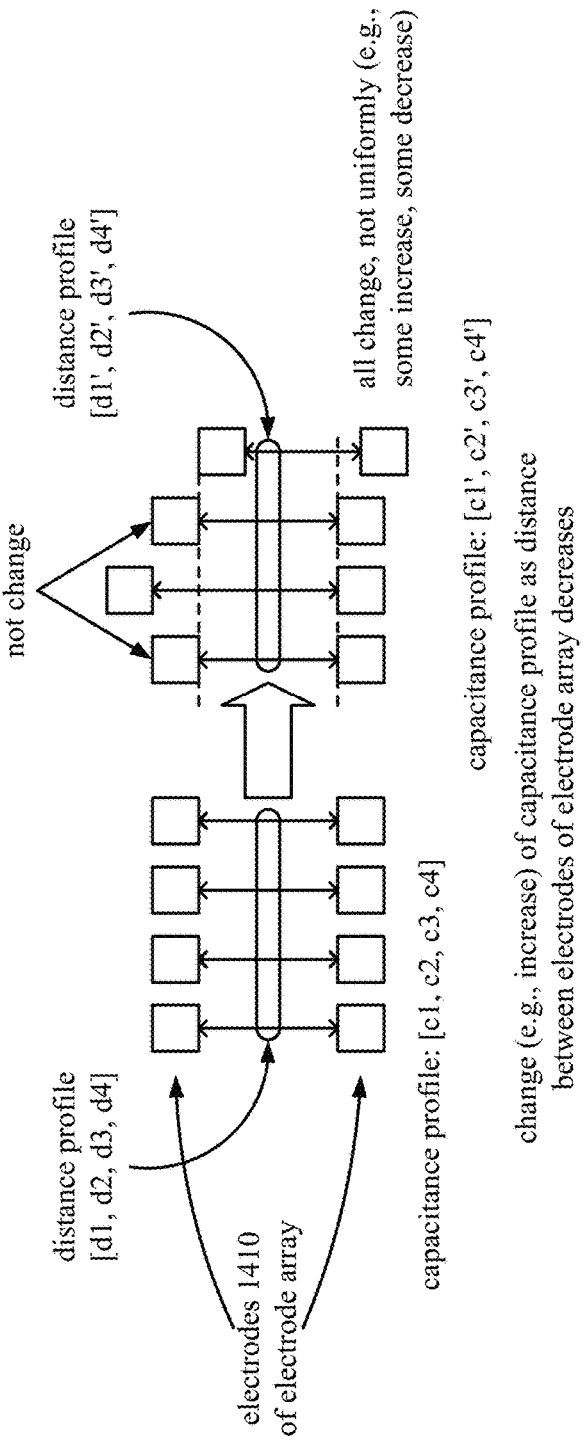
FIG. 20A
2001
FIG. 20B
2002

2003

2004

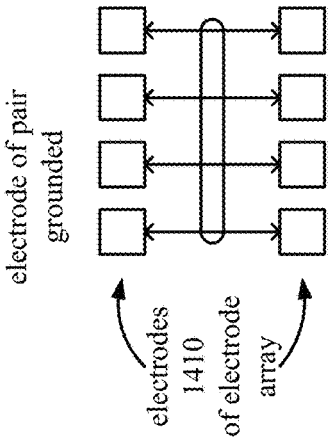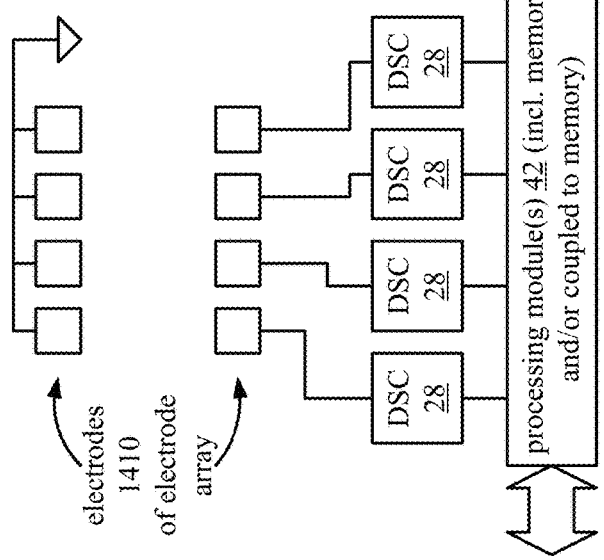
FIG. 21B 2102 — 1 electrode of each pair connected a DSC, other electrode of pair grounded
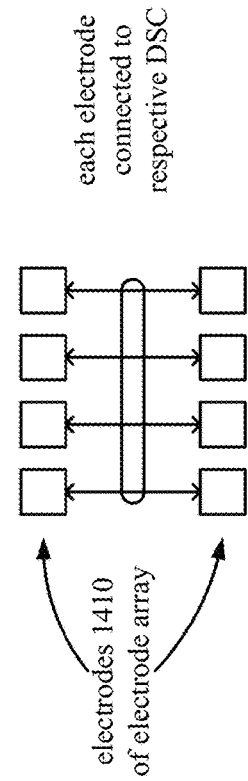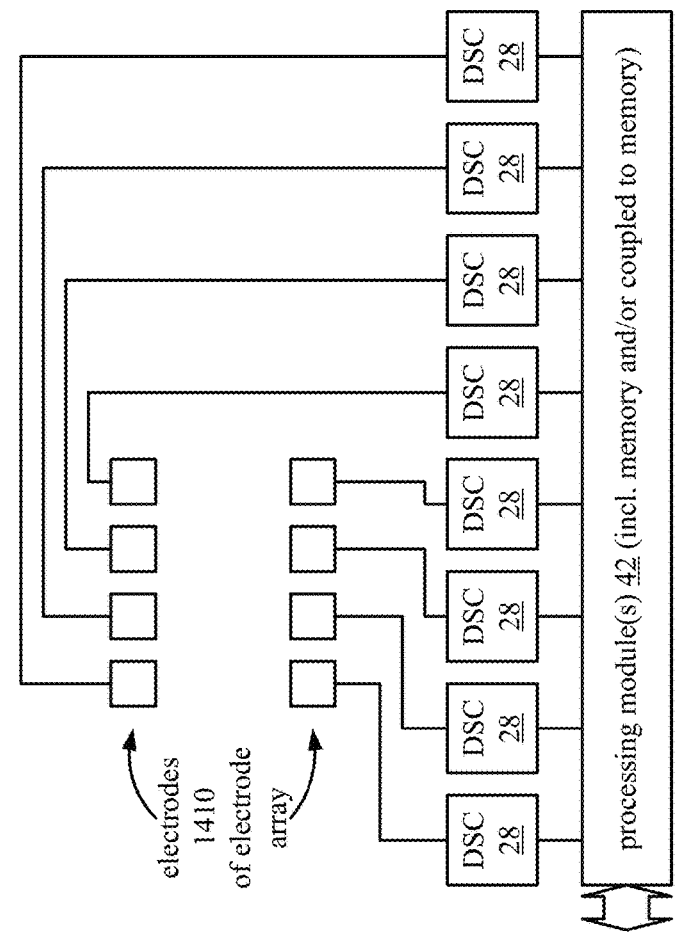
FIG. 21A 2101 — each electrode connected to respective DSC

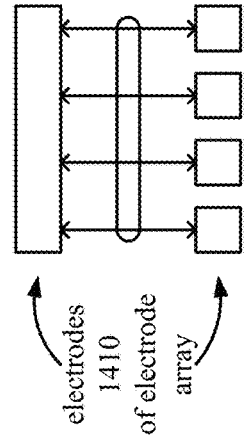
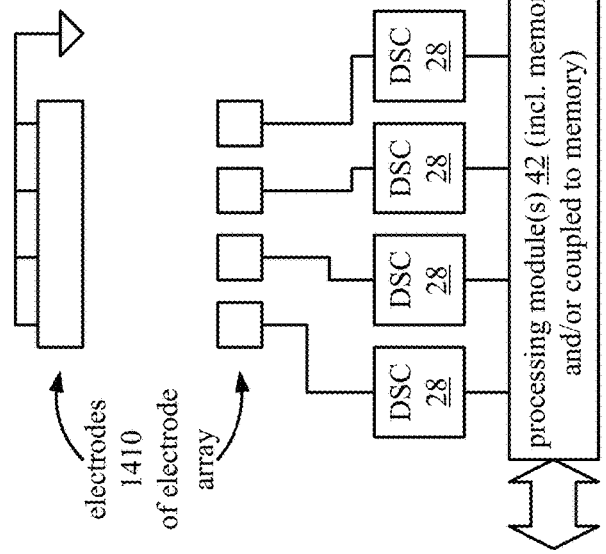
FIG. 21D
2104
1 electrode of each pair connected a DSC, other electrode of pair grounded
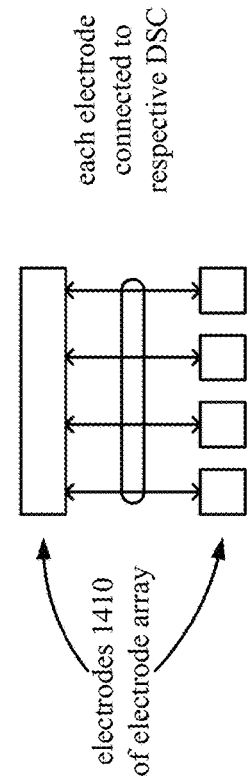
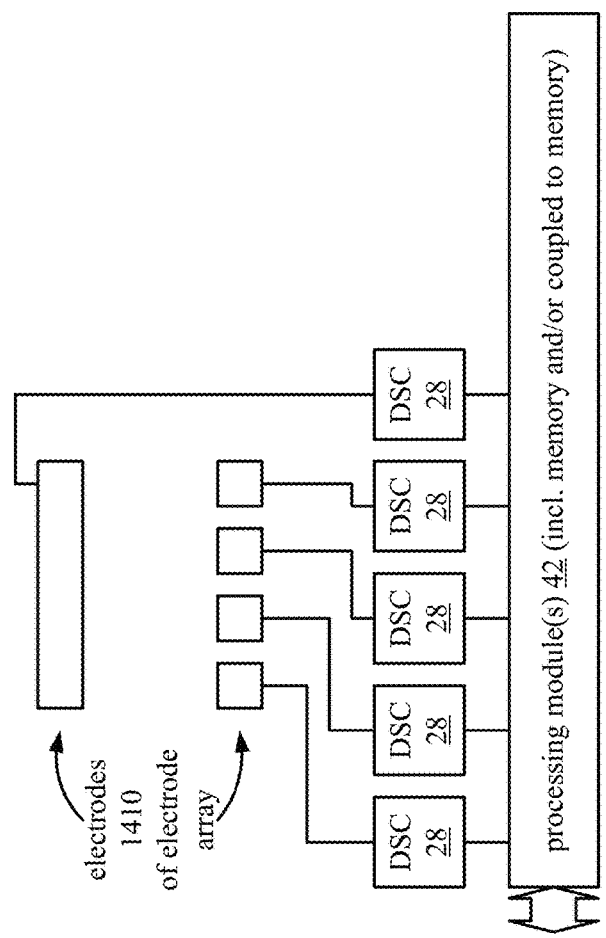
FIG. 21C
2103
each electrode connected to respective DSC

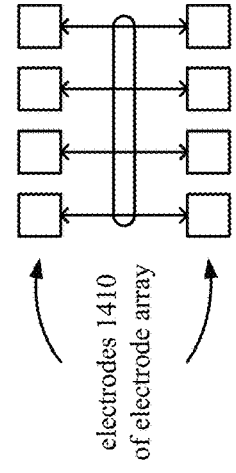
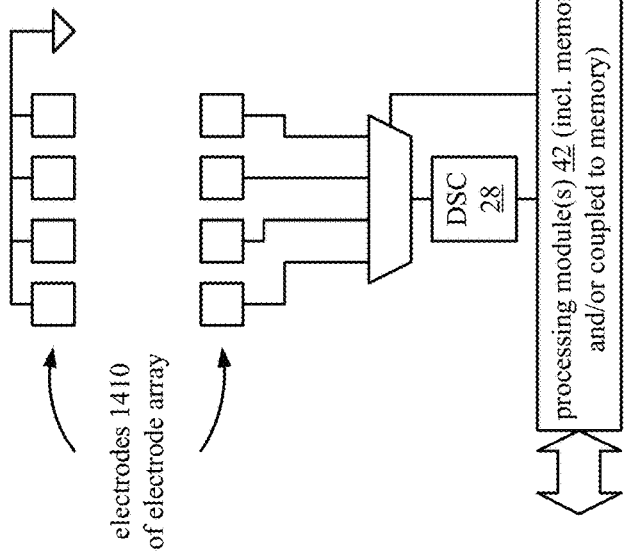

FIG. 22B 2202 — 1 electrode of each pair connected a DSC, other electrode of pair grounded electrodes 1410 of electrode array

DSC 28 processing module(s) 42 (incl. memory and/or coupled to memory)

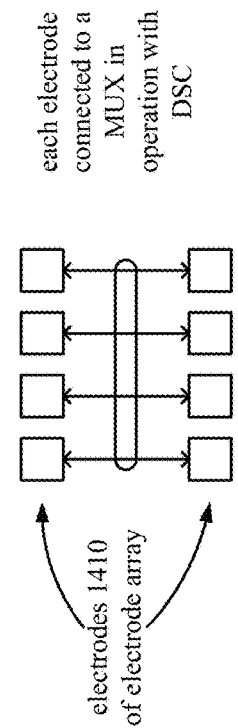
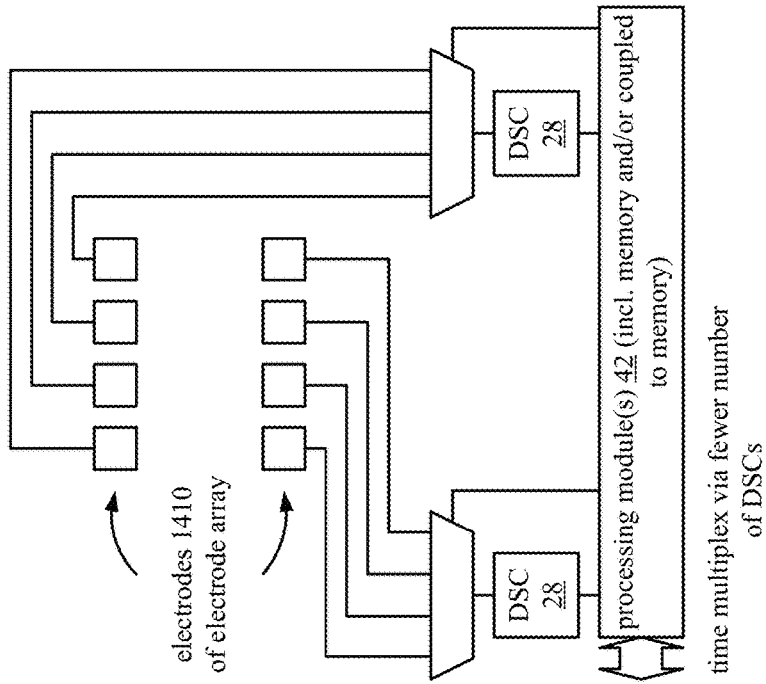

FIG. 22A 2201 — each electrode connected to a MUX in operation with DSC electrodes 1410 of electrode array

DSC 28 processing module(s) 42 (incl. memory and/or coupled to memory)

time multiplex via fewer number of DSCs

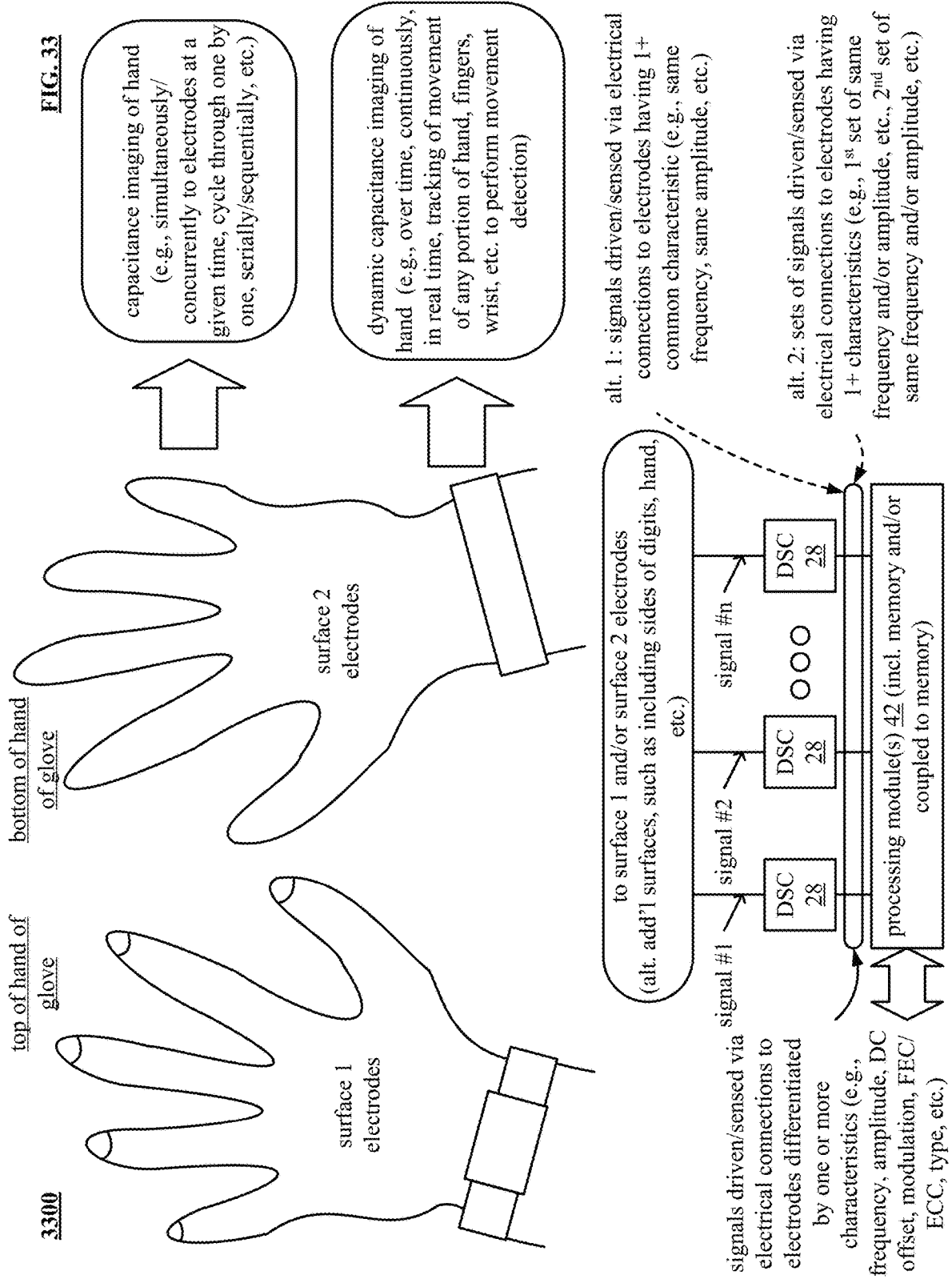

FIG. 40A

4001 start/continue

↓ providing, from a DSC, a signal to an electrode and simultaneously sensing that signal via the electrode 4010

↓ detecting an electrical characteristic of the electrode via sensing of the signal 4020

↓ generating a digital signal representative of the electrical characteristic of the electrode 4030

↓ processing the digital signal to determine the electrical characteristic of the electrode (e.g., impedance, capacitive reactance, capacitance, etc. of the electrode) 4040

↓ generating data corresponding to a distance between the electrode and another electrode based on the electrical characteristic of the electrode (e.g., based on characteristic(s) of the signal, the determined impedance, capacitive reactance, capacitance, etc. of the electrode) 4050

↓ end/continue

FIG. 40B

4002 start/continue

↓ providing, from DSCs, signals to at least some of the electrodes of a capacitive imaging glove and simultaneously sensing those signals via the at least some of the electrodes of the capacitive imaging glove 4011

↓ determining electrical characteristics of the at least some of the electrodes of the capacitive imaging glove (e.g., impedance, capacitive reactance, capacitance, etc. of the electrode) 4021

↓ generating data corresponding to distances between at least some of the electrodes of the capacitive imaging glove (e.g., between first electrode and second electrode, between third electrode and fourth electrode, etc.) based on the electrical characteristics of the at least some of the electrodes of the capacitive imaging glove (e.g., based on characteristic(s) of the signals, the determined impedances, capacitive reactances, capacitances, etc. of the electrodes) 4031

↓ generating capacitive image data representative of a shape of the capacitive imaging glove based on the distances between the at least some of the electrodes of the capacitive imaging glove (e.g., between first electrode and second electrode, between third electrode and fourth electrode) 4041

↓ end/continue

4400 c1a2b is capacitance between electrodes 1a and 2b capacitance (similar naming convention for others)

signals from subset of electrodes sensed via 2b (any desired subset)

electrode 2b drive-sense signal (monitor/sense signals of interest (SOIs) coupled into 2b from selected electrodes 1a, 1b, 2a, 3a, 3b based on those signal characteristics [e.g., predetermined, orthogonality, etc.])

alt. electrode 2b drive-sense signal (monitor/sense SOIs coupled into 2b from selected electrodes 1b, 2a, 3b, 4b based on those signal characteristics [e.g., predetermined, orthogonality, etc.])

to other electrodes 1410

DSC 28s (e.g., 128 on 1 chip)

processing module(s) 42 (incl. memory and/or coupled to memory)

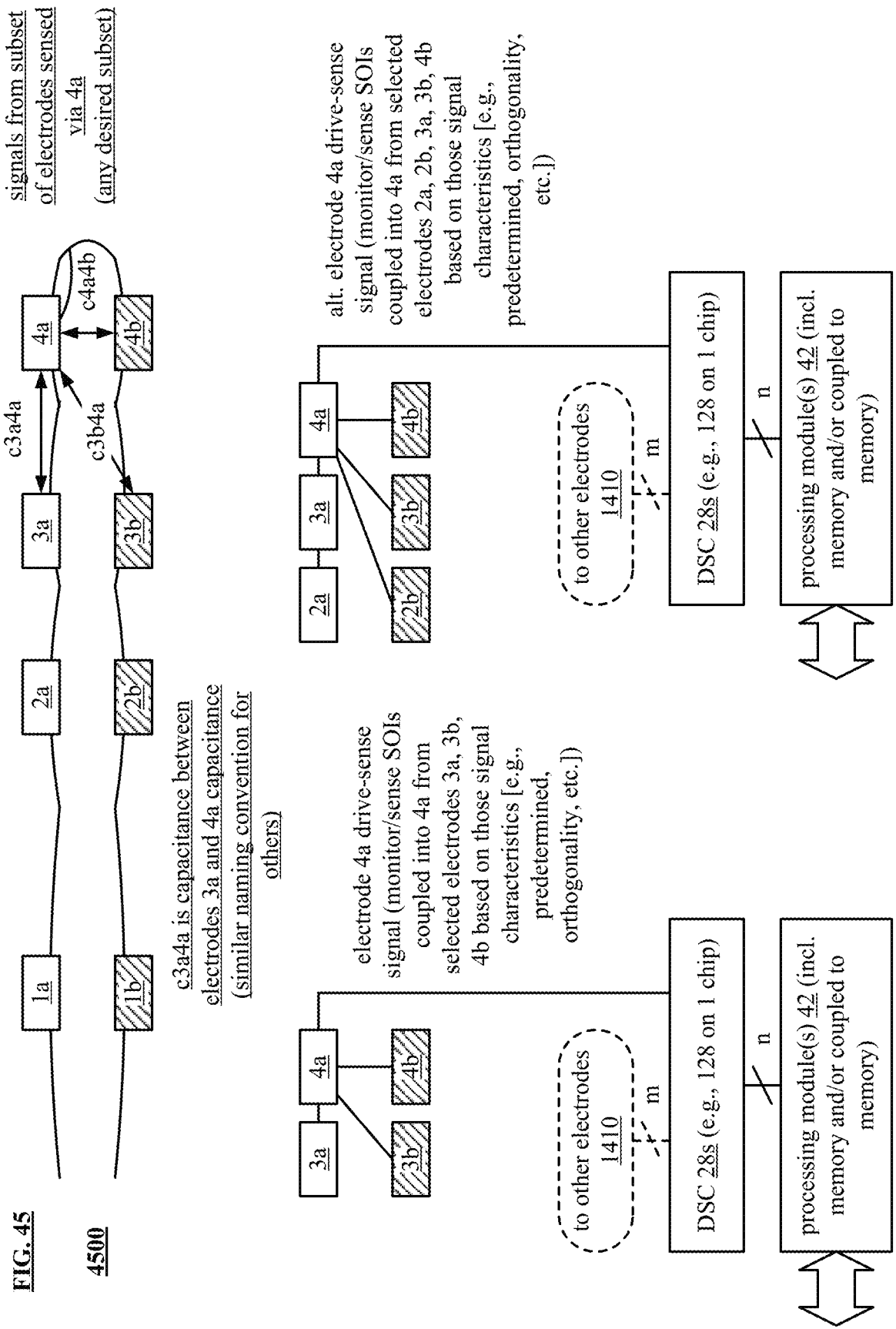

FIG. 46 start/continue driving/sensing (e.g., simultaneously driving and sensing) a first signal via a first electrode associated with a digit of a capacitive imaging glove 4610 via sensing of the first signal via the first electrode, detecting capacitive coupling of one or more other signals of interest (e.g., differentiated from one another and the first signal by frequency) to the first electrode associated with the digit of the capacitive imaging glove from a corresponding one or more other electrodes of interest also associated with the digit of the capacitive imaging glove (e.g., that are assigned to be looked for, detected, etc. via the first electrode in accordance with digit movement detection based on capacitive imaging) 4620 performing processing (e.g., filtering) of the first signal based on the signal differentiation to determine presence of the one or more other signals of interest being coupled therein (e.g., frequency selective filtering looking for the one or more frequencies) 4630 based on a determination of presence of the one or more other signals of interest being coupled therein, determining an electrical characteristic of the first electrode of the capacitive imaging glove (e.g., impedance, capacitive reactance, capacitance, etc. of the electrode) 4640 generating data corresponding to distances between the first electrode and the one or more other electrodes of interest of the capacitive imaging glove based on the electrical characteristic of the first electrode of the capacitive imaging glove 4650 generating capacitive image data representative of a shape and/or change thereof of the digit of the capacitive imaging glove based on the distances between the first electrode and the one or more other electrodes of interest of the capacitive imaging glove in accordance with digit movement detection based on capacitive imaging 4660 end/continue

( start/continue )

driving/sensing (e.g., simultaneously driving and sensing) a first signal via a first electrode associated with a digit of a capacitive imaging glove 5010 via sensing of the first signal via the first electrode, detecting capacitive coupling of one or more other signals of interest (e.g., differentiated from one another and the first signal by frequency) to the first electrode of the digit of the capacitive imaging glove from a corresponding one or more other electrodes of interest associated with the digit and also at least one other digit of the capacitive imaging glove (e.g., that are assigned to be looked for, detected, etc. via the first electrode in accordance with inter-digit movement detection based on capacitive imaging) 5020 performing processing (e.g., filtering) of the first signal based on the signal differentiation to determine presence of the one or more other signals of interest being coupled therein (e.g., frequency selective filtering looking for the one or more frequencies) 5030 based on a determination of presence of the one or more other signals of interest being coupled therein, determining an electrical characteristic of the first electrode of the capacitive imaging glove (e.g., impedance, capacitive reactance, capacitance, etc. of the electrode) 5040 generating data corresponding to distances between the first electrode and the one or more other electrodes of interest associated with the digit and also the at least one other digit of the capacitive imaging glove based on the electrical characteristic of the first electrode of the capacitive imaging glove 5050 generating capacitive image data representative of a shape and/or change thereof of the digit and/or the at least one other digit of the capacitive imaging glove based on the distances between the first electrode and the one or more other electrodes of interest associated with the digit and also at least one other digit of the capacitive imaging glove in accordance with inter-digit movement detection based on capacitive imaging 5060

( end/continue )

FIG. 54 start/continue receiving inputs (e.g., sensing information) from one or more position and/or orientation sensors implemented within a capacitive imaging glove 5410 processing the inputs from the one or more position and/or orientation sensors implemented within the capacitive imaging glove to generate information of the position and/or orientation of the capacitive imaging glove 5420 processing the information of the position and/or orientation of the capacitive imaging glove to generate/render image and/or video data of the capacitive imaging glove including the position and/or orientation of the capacitive imaging glove 5430 providing the image and/or video data of the capacitive imaging glove including the position and/or orientation of the capacitive imaging glove to a display, computer monitor, etc. for display thereon 5440 end/continue

5400

CAPACITIVE IMAGING GLOVE

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

FIG. 5A is a schematic plot diagram of a computing subsystem in accordance with the present invention;

FIG. 5C is a schematic block diagram of another embodiment of a computing subsystem in accordance with the present invention;

FIG. 5D is a schematic block diagram of another embodiment of a computing subsystem in accordance with the present invention;

FIG. 6 is a schematic block diagram of a drive center circuit in accordance with the present invention;

FIG. 6A is a schematic block diagram of another embodiment of a drive sense circuit in accordance with the present invention;

FIG. 7 is an example of a power signal graph in accordance with the present invention;

FIG. 8 is an example of a sensor graph in accordance with the present invention;

FIG. 14A is a schematic block diagram of an embodiment of varying capacitance between two electrodes based on change of distance between them in accordance with the present invention;

FIG. 14B is a schematic block diagram of another embodiment of varying capacitance between two electrodes based on change of distance between them in accordance with the present invention;

FIG. 14C is a schematic block diagram of various embodiments of dielectric material implemented between two electrodes to facilitate improved capacitive coupling in accordance with the present invention;

FIG. 14D is a schematic block diagram of an embodiment of drive-sense circuits (DSCs) implemented to interact with electrodes based on capacitive coupling between them and to detect the capacitance between the electrodes based on the distance between them in accordance with the present invention;

FIG. 14E is a schematic block diagram of another embodiment of a DSC implemented to interact with at least one electrode of a pair of electrodes based on capacitive coupling between them and to detect the capacitance between the electrodes based on the distance between them in accordance with the present invention;

FIG. 18A is a schematic block diagram of another embodiment of a profile or signature associated with varying capacitance between electrodes in accordance with the present invention;

FIG. 18B is a schematic block diagram of another embodiment of a profile or signature associated with varying capacitance between electrodes in accordance with the present invention;

FIG. 20A is a schematic block diagram of another embodiment of varying capacitance between electrodes of an array based on change of distance between the respective electrodes of the array in accordance with the present invention;

FIG. 20B is a schematic block diagram of another embodiment of varying capacitance between electrodes of an array based on change of distance between the respective electrodes of the array in accordance with the present invention;

FIG. 21A is a schematic block diagram of another embodiment of DSCs implemented to interact with electrodes based on capacitive coupling between them and to detect the capacitance between the electrodes based on the distance between them in accordance with the present invention;

FIG. 21B is a schematic block diagram of another embodiment of DSCs implemented to interact with electrodes based on capacitive coupling between them and to detect the capacitance between the electrodes based on the distance between them in accordance with the present invention;

FIG. 21C is a schematic block diagram of another embodiment of DSCs implemented to interact with electrodes based on capacitive coupling between them and to detect the capacitance between the electrodes based on the distance between them in accordance with the present invention;

FIG. 21D is a schematic block diagram of another embodiment of DSCs implemented to interact with electrodes based on capacitive coupling between them and to detect the capacitance between the electrodes based on the distance between them in accordance with the present invention;

FIG. 22A is a schematic block diagram of another embodiment of DSCs implemented to interact with electrodes based on capacitive coupling between them and to detect the capacitance between the electrodes based on the distance between them in accordance with the present invention;

FIG. 22B is a schematic block diagram of another embodiment of DSCs implemented to interact with electrodes based on capacitive coupling between them and to detect the capacitance between the electrodes based on the distance between them in accordance with the present invention;

FIG. 33 is a schematic block diagram of an embodiment of circuitry implemented to drive and simultaneously sense signals having particular characteristics provided to electrodes in a capacitive imaging glove in accordance with the present invention;

FIG. 40A is a schematic block diagram of an embodiment of a method for execution by one or more devices in accordance with the present invention;

FIG. 40B is a schematic block diagram of an embodiment of a method for execution by one or more devices in accordance with the present invention;

FIG. 43 is a schematic block diagram of another embodiment of varying capacitance between electrodes associated with a digit or finger in a capacitive imaging glove in accordance with the present invention;

FIG. 44 is a schematic block diagram of another embodiment of varying capacitance between electrodes associated with a digit or finger in a capacitive imaging glove in accordance with the present invention;

FIG. 45 is a schematic block diagram of another embodiment of varying capacitance between electrodes associated with a digit or finger in a capacitive imaging glove in accordance with the present invention;

FIG. 46 is a schematic block diagram of another embodiment of a method for execution by one or more devices in accordance with the present invention;

FIG. 50 is a schematic block diagram of another embodiment of a method for execution by one or more devices in accordance with the present invention;

Figure 53:
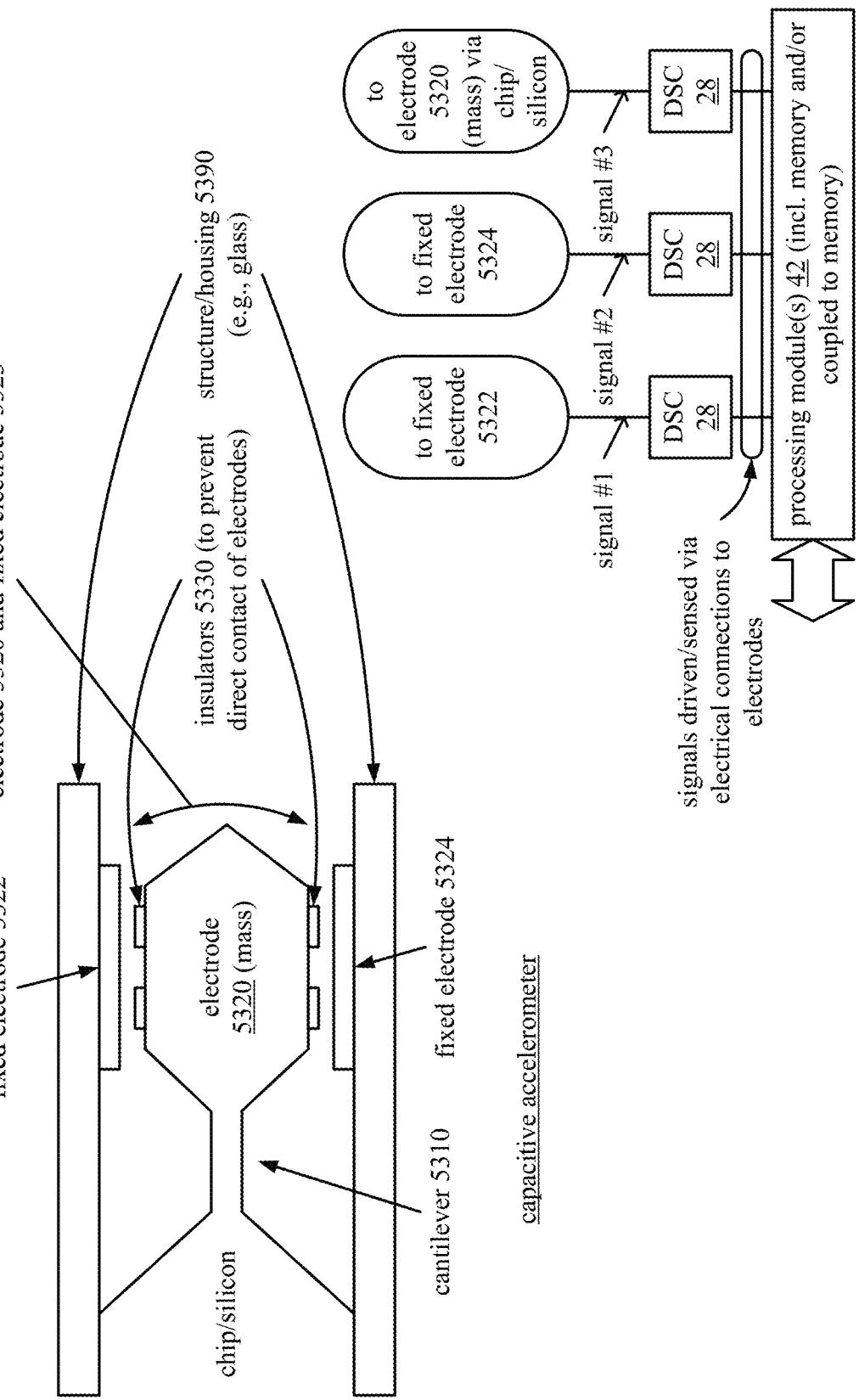

FIG. 53 is a schematic block diagram of an embodiment of a capacitance accelerometer as may be implemented within one or more sensors of a capacitive imaging glove to facilitate hand movement detection in a 3-D space in accordance with the present invention; and FIG. 54 is a schematic block diagram of another embodiment of a method for execution by one or more devices in accordance with the present invention.

DETAILED DESCRIPTION OF THE INVENTION

Figure 1:
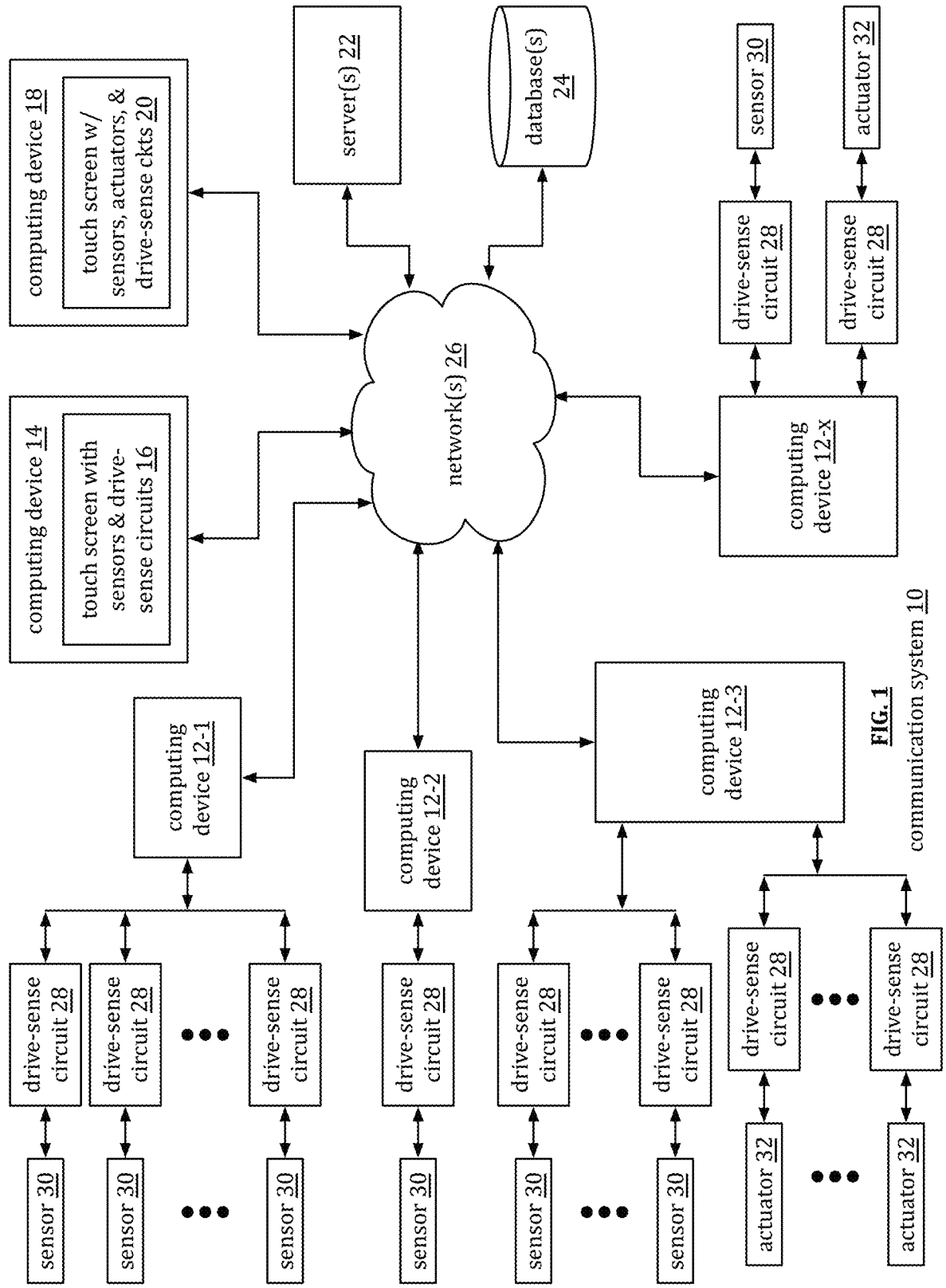
FIG. 1 is a schematic block diagram of an embodiment of a communication system in accordance with the present invention.

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a sensor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

Figure 2:
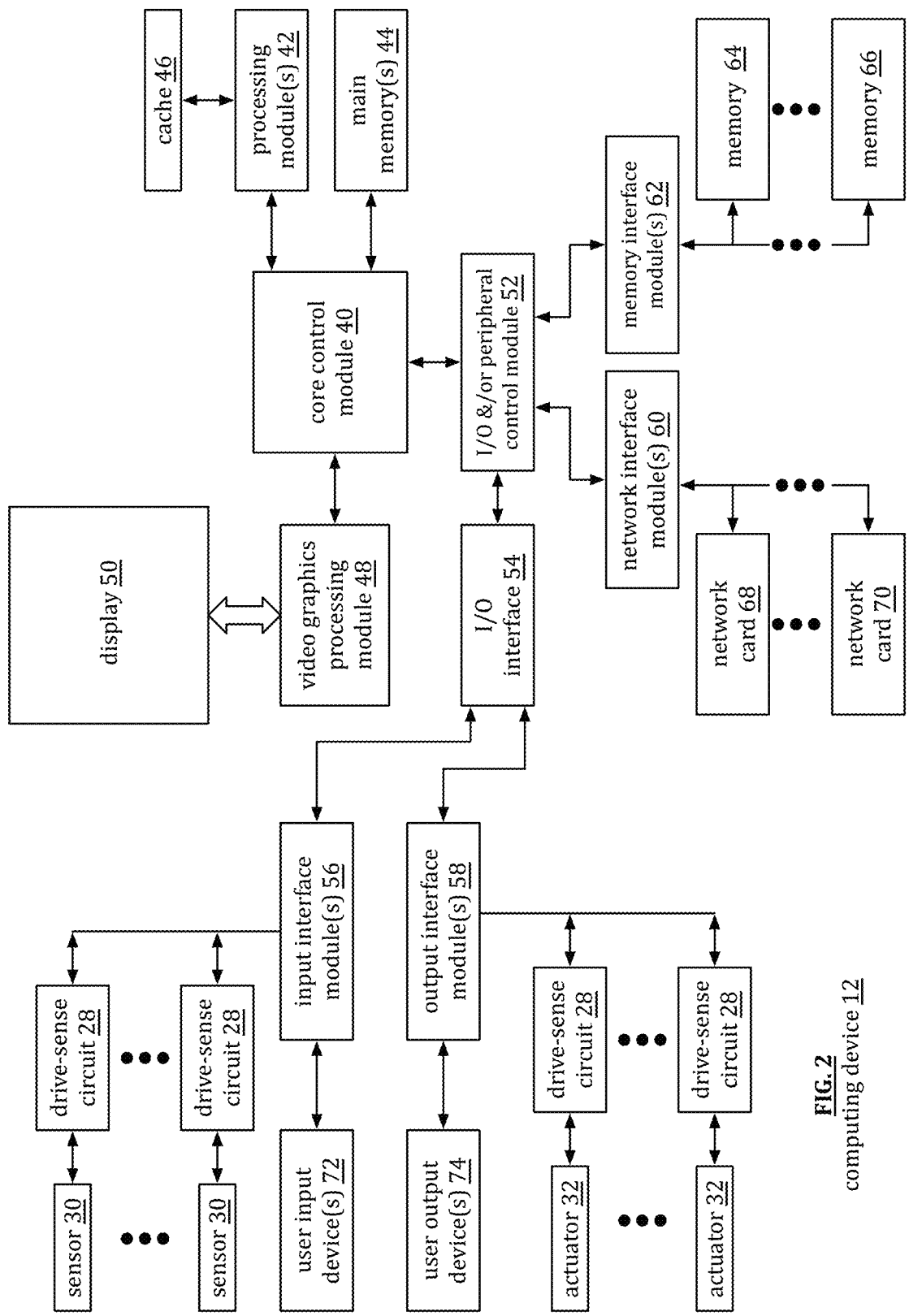
FIG. 2 is a schematic block diagram of an embodiment of a computing device in accordance with the present invention.

FIG. 2 is a schematic block diagram of an embodiment of a computing device 12 (e.g., any one of 12-1 through 12-x). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 (4$^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
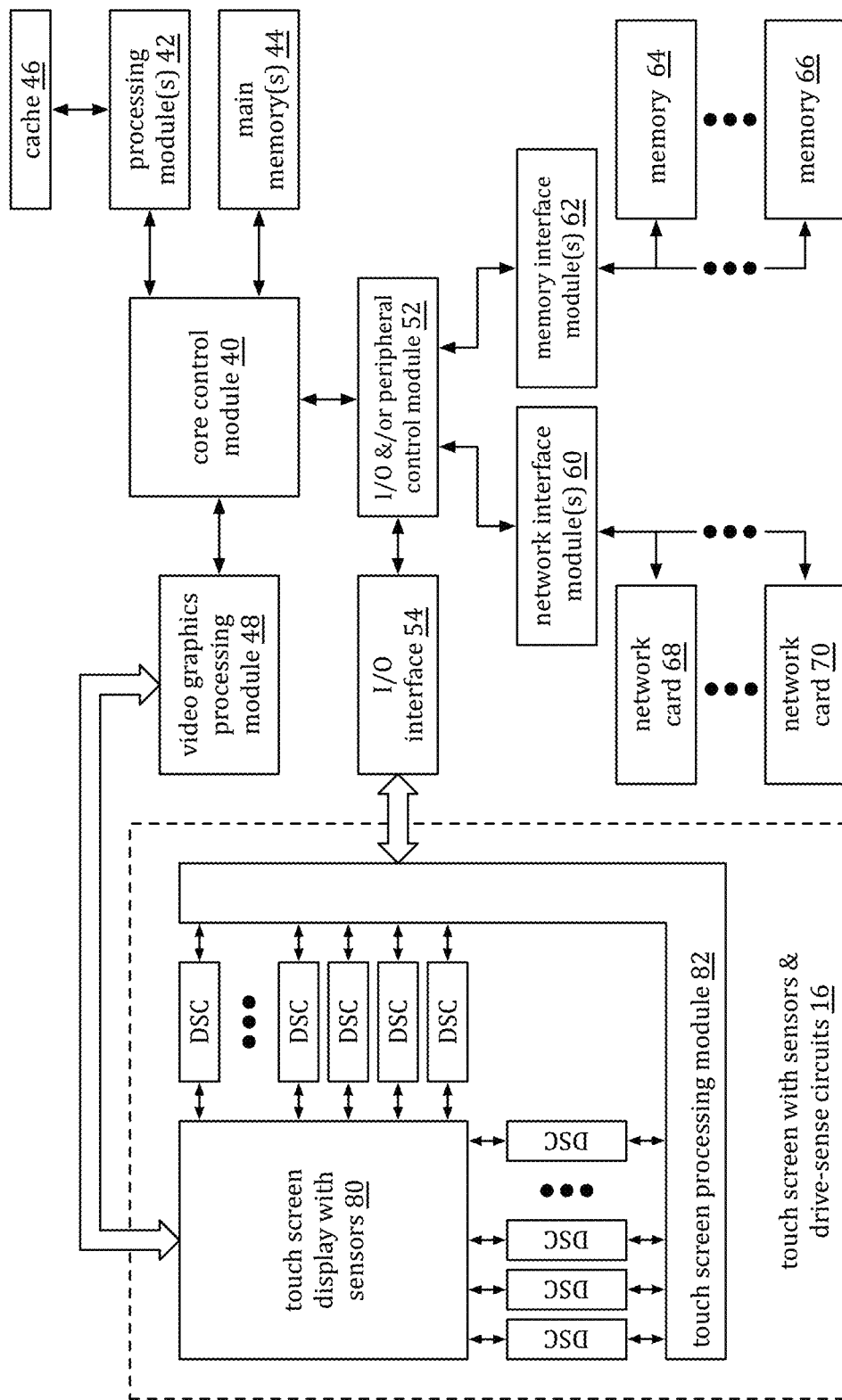
FIG. 3 is a schematic block diagram of another embodiment of a computing device in accordance with the present invention.

FIG. 3 is a schematic block diagram of another embodiment of a computing device 14 that includes a core control module 40, one or more processing modules 42, one or more main memories 44, cache memory 46, a video graphics processing module 48, a touch screen 16, an Input-Output (I/O) peripheral control module 52, one or more input interface modules 56, one or more output interface modules 58, one or more network interface modules 60, and one or more memory interface modules 62. The touch screen 16 includes a touch screen display 80, a plurality of sensors 30, a plurality of drive-sense circuits (DSC), and a touch screen processing module 82.

Computing device 14 operates similarly to computing device 12 of FIG. 2 with the addition of a touch screen as an input device. The touch screen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
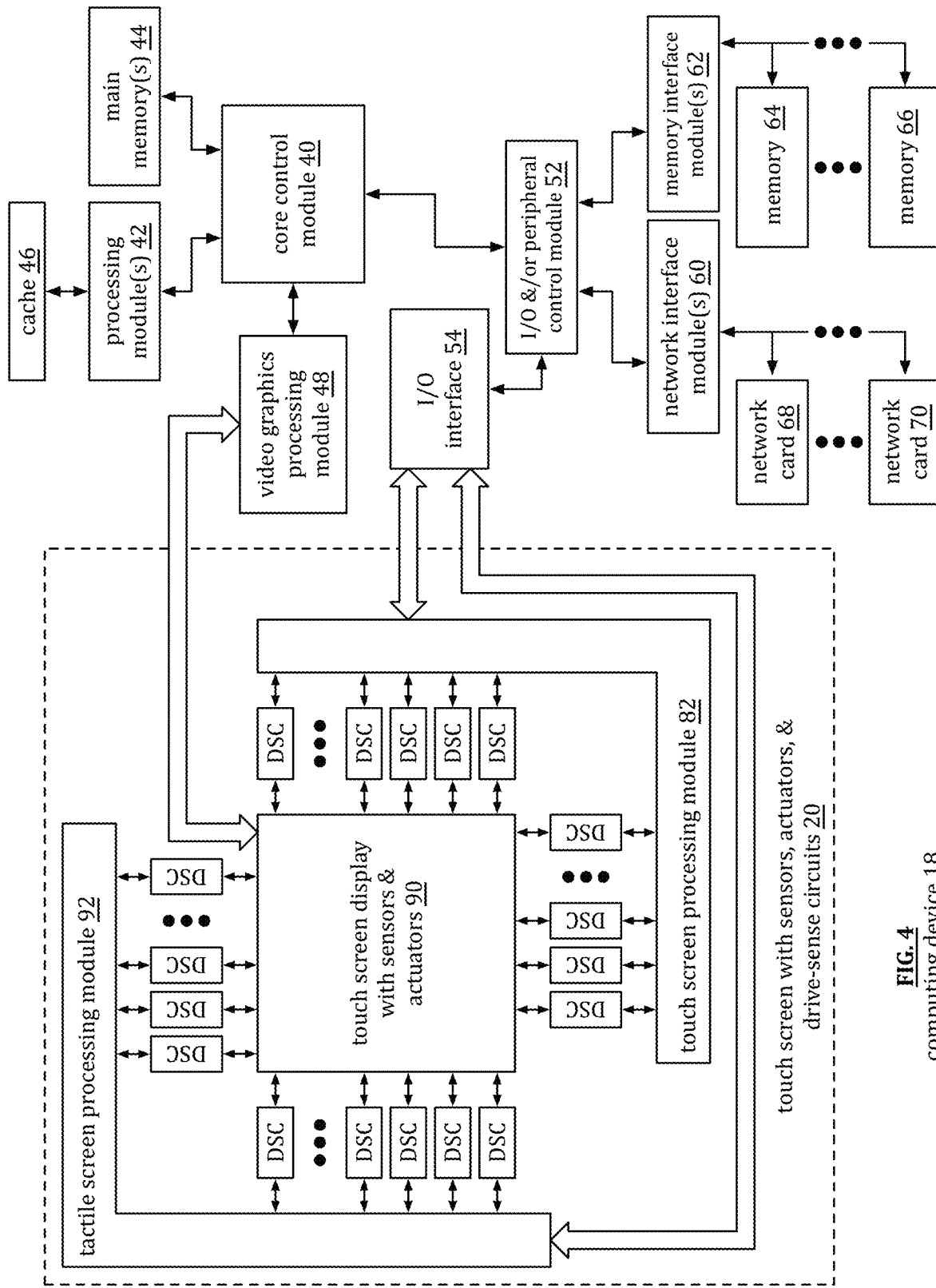
FIG. 4 is a schematic block diagram of another embodiment of a computing device in accordance with the present invention.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42 A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a stand-alone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

Figure 5B:
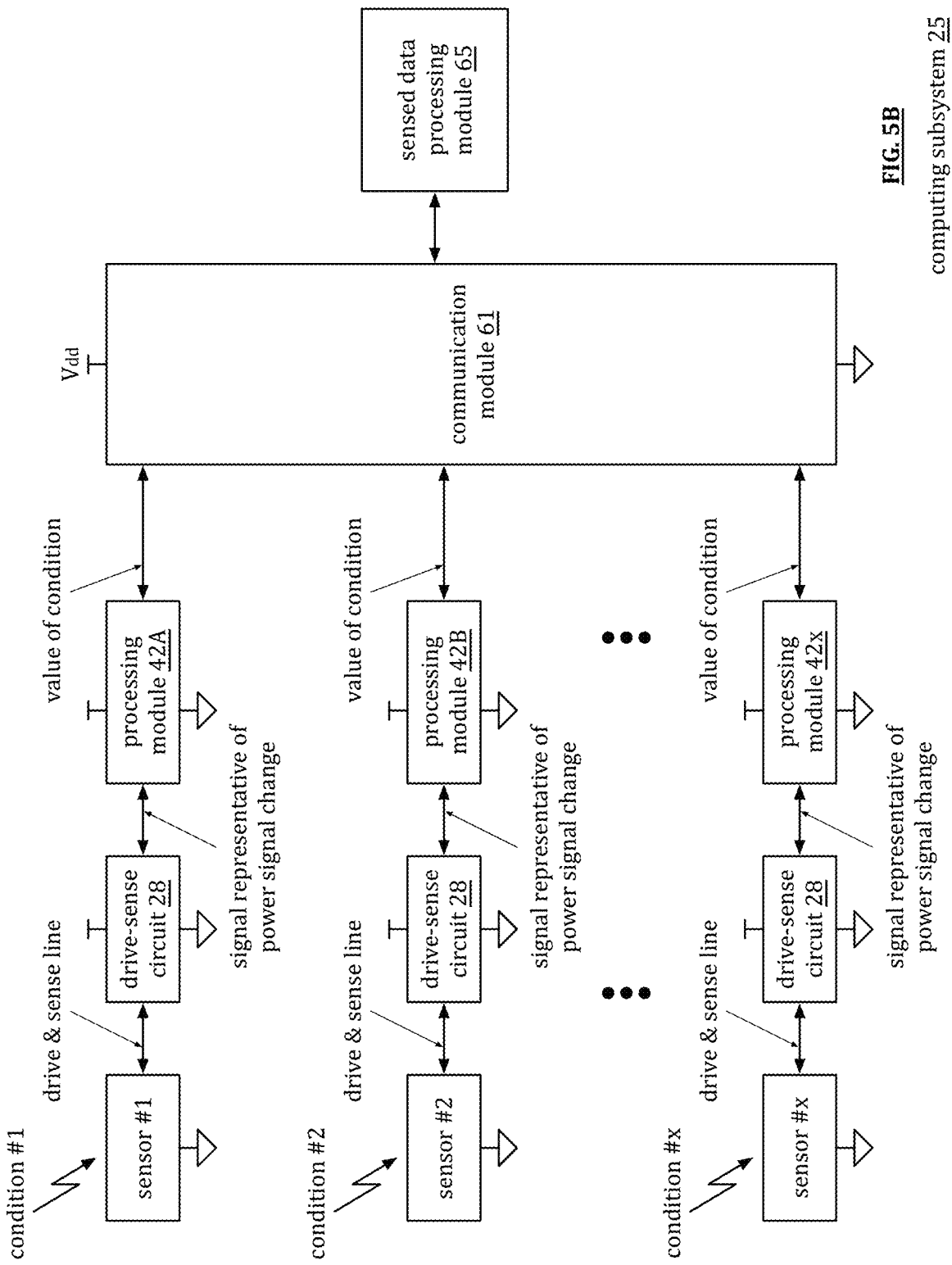
FIG. 5B is a schematic block diagram of another embodiment of a computing subsystem in accordance with the present invention.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
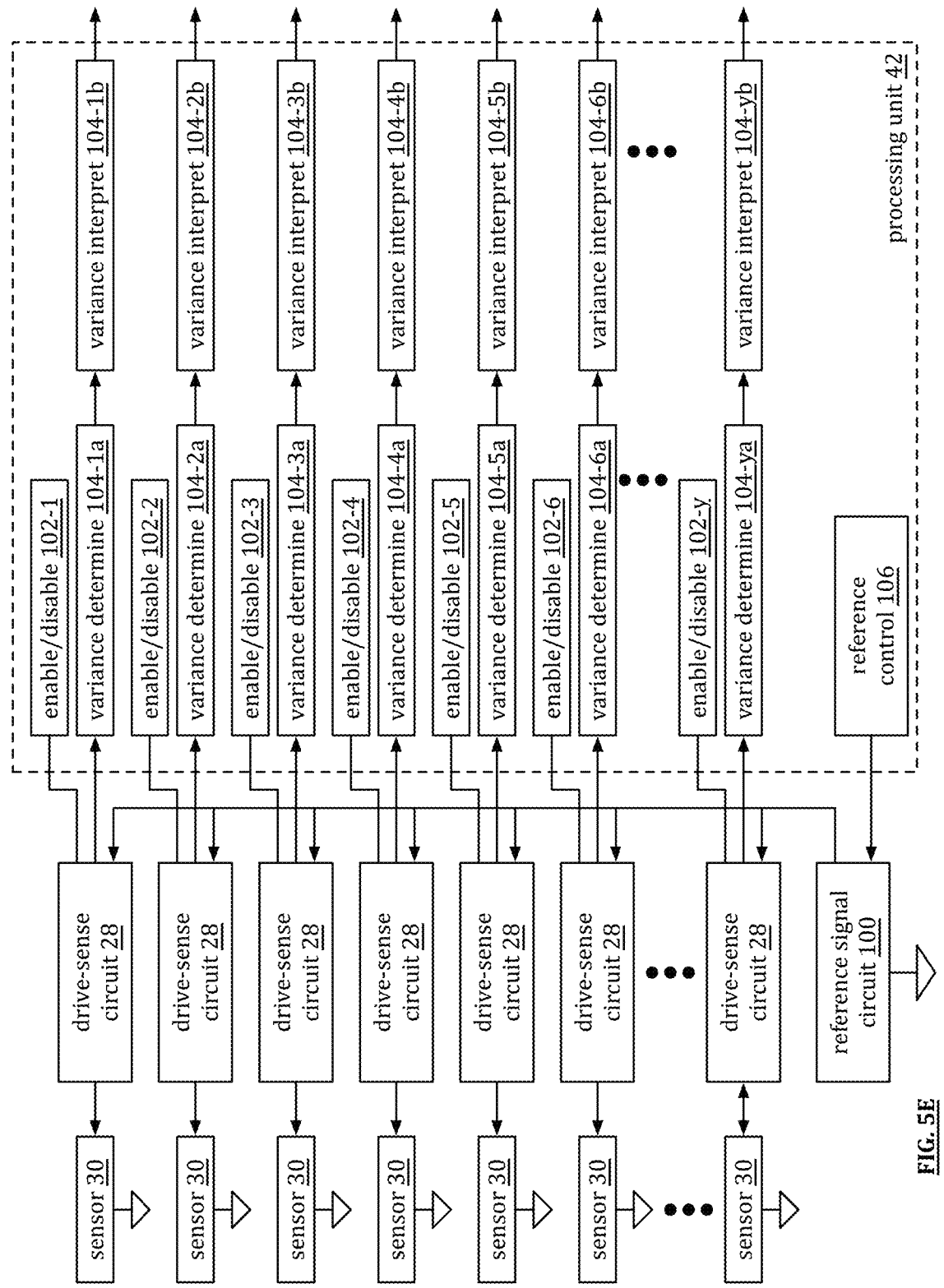
FIG. 5E is a schematic block diagram of another embodiment of a computing subsystem in accordance with the present invention.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through y and variance interpreting modules 104-2a through y. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1b interprets the difference to determine a specific value for the sensed physical condition.

As a specific example, the variance determining module 104-1a receives a digital signal of 1001 0110 (150 in decimal) that is representative of a sensed physical condition (e.g., temperature) sensed by a sensor from the corresponding drive-sense circuit 28. With 8-bits, there are $2^8$ (256) possible signals representing the sensed physical condition. Assume that the units for temperature is Celsius and a digital value of 0100 0000 (64 in decimal) represents the known value for 25 degree Celsius. The variance determining module 104-b1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-b1 then determines the sensed value based on the difference and the known value. In this example, the sensed value equals 25+86*(100/256)=25+33.6=58.6 degrees Celsius.

FIG. 6 is a schematic block diagram of a drive center circuit 28-a coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-a1 coupled to a sensor 30. The drive sense-sense circuit 28-a1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases. As an example of a second type, a capacitance touch sensor decreases in capacitance as a touch is sensed.

Figure 9:
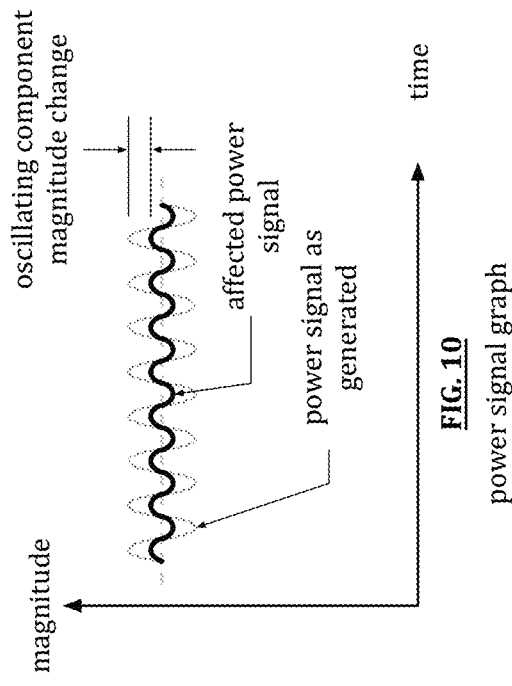
FIG. 9 is a schematic block diagram of another example of a power signal graph in accordance with the present invention.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

Figure 10:
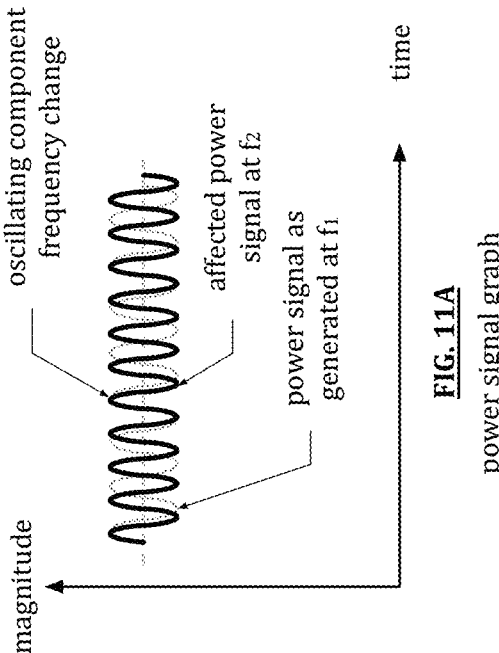
FIG. 10 is a schematic block diagram of another example of a power signal graph in accordance with the present invention.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

Figure 11:
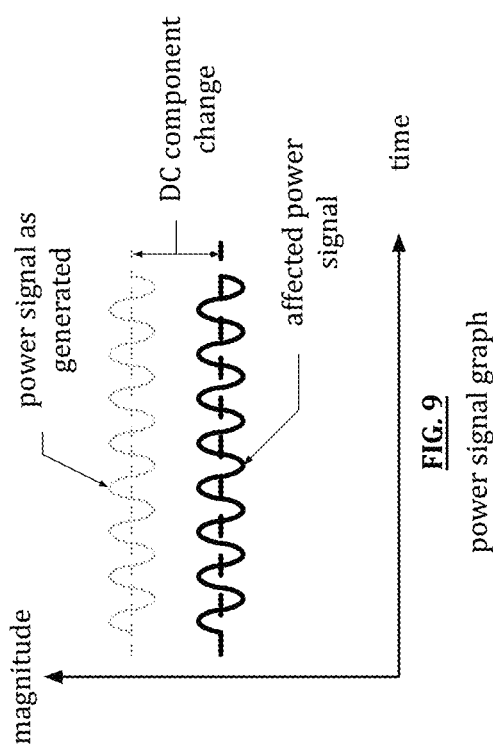
FIG. 11 is a schematic block diagram of another example of a power signal graph in accordance with the present invention.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

Figure 11A:
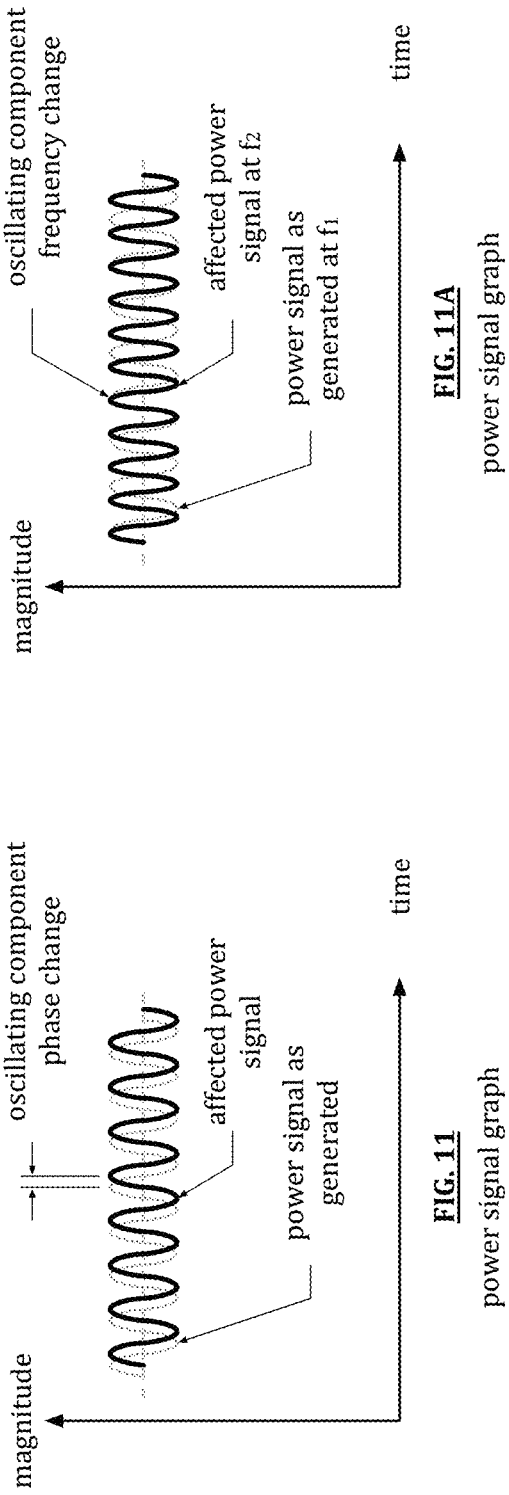
FIG. 11A is a schematic block diagram of another example of a power signal graph in accordance with the present invention.

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of f1 and converts it into a first physical condition. The second transducer is stimulated by the first physical condition to create an electrical signal at a different frequency f2. In this example, the first and second transducers of the sensor change the frequency of the oscillating signal component, which allows for more granular sensing and/or a broader range of sensing.

Figure 12:
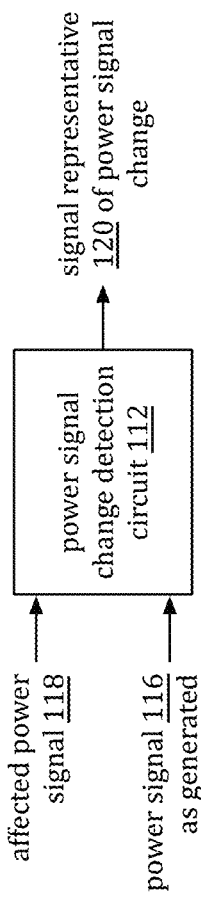
FIG. 12 is a schematic block diagram of an embodiment of a power signal change detection circuit in accordance with the present invention.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

Figure 13:
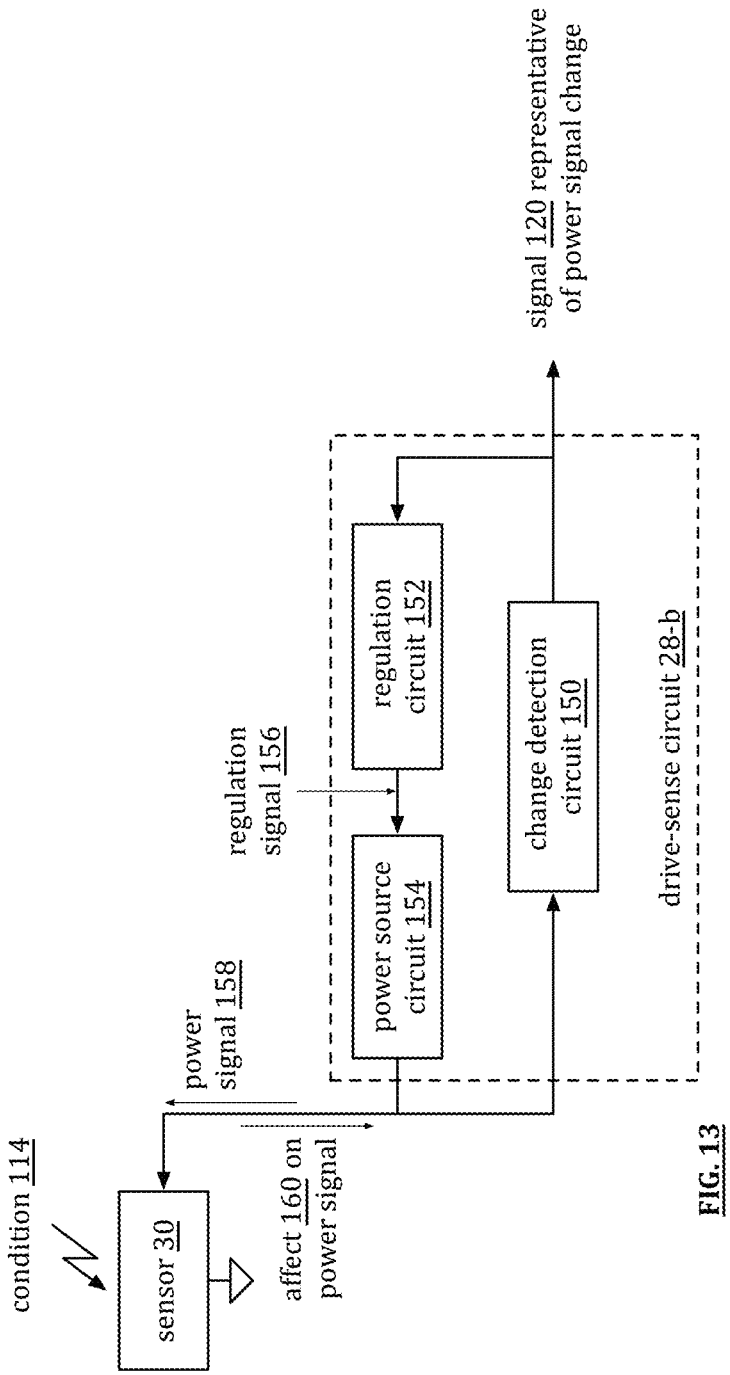
FIG. 13 is a schematic block diagram of another embodiment of a drive-sense circuit in accordance with the present invention.

FIG. 13 is a schematic block diagram of another embodiment of a drive sense circuit 28-*b* includes a change detection circuit 150, a regulation circuit 152, and a power source circuit 154. The drive-sense circuit 28-*b* is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits (DSCs) are described in U.S. Utility patent application Ser. No. 16/113,379, entitled "DRIVE SENSE CIRCUIT WITH DRIVE-SENSE LINE,", filed Aug. 27, 2018. Any instantiation of a drive-sense circuit as described herein may also be implemented using any of the various implementations of various drive-sense circuits (DSCs) described in U.S. Utility patent application Ser. No. 16/113,379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC, note that any additional signal that is coupled into a line, an electrode, a touch sensor, a bus, a communication link, a battery, a load, an electrical coupling or connection, etc. associated with that DSC is also detectable. For example, a DSC that is associated with such a line, an electrode, a touch sensor, a bus, a communication link, a battery, a load, an electrical coupling or connection, etc. is configured to detect any signal from one or more other lines, electrodes, touch sensors, buses, communication links, loads, electrical couplings or connections, etc. that get coupled into that line, electrode, touch sensor, bus, communication link, battery, load, electrical coupling or connection, etc.

Note that the different respective signals that are driven and simultaneously sensed by one or more DSCs may be are differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

Moreover, with respect to any embodiment, diagram, example, etc. that includes more than one DSC, note that the DSCs may be implemented in a variety of manners. For example, all of the DSCs may be of the same type, implementation, configuration, etc. In another example, the first DSC may be of a first type, implementation, configuration, etc., and a second DSC may be of a second type, implementation, configuration, etc. that is different than the first DSC. Considering a specific example, a first DSC may be implemented to detect change of impedance associated with a line, an electrode, a touch sensor, a bus, a communication link, an electrical coupling or connection, etc. associated with that first DSC, while a second DSC may be implemented to detect change of voltage associated with a line, an electrode, a touch sensor, a bus, a communication link, an electrical coupling or connection, etc. associated with that second DSC. In addition, note that a third DSC may be implemented to detect change of a current associated with a line, an electrode, a touch sensor, a bus, a communication link, an electrical coupling or connection, etc. associated with that DSC. In general, while a common reference may be used generally to show a DSC or multiple instantiations of a DSC within a given embodiment, diagram, example, etc., note that any particular DSC may be implemented in accordance with any manner as described herein, such as described in U.S. Utility patent application Ser. No. 16/113, 379, etc. and/or their equivalents.

Note that certain of the following diagrams show one or more processing modules. In certain instances, the one or more processing modules is configured to communicate with and interact with one or more other devices including one or more of DSCs, one or more components associated with a DSC, one or more components associated with glove (e.g., such as a capacitive imaging glove), one or more sensors associated with such a glove, etc. Note that any such implementation of one or more processing modules may include integrated memory and/or be coupled to other memory. At least some of the memory stores operational instructions to be executed by the one or more processing modules. In addition, note that the one or more processing modules may interface with one or more other devices, components, elements, etc. via one or more communication links, networks, communication pathways, channels, etc.

In addition, when a DSC is implemented to communicate with and interact with another element, the DSC is configured simultaneously to transmit and receive one or more signals with the element. For example, a DSC is configured simultaneously to sense and to drive one or more signals to the one element. During transmission of a signal from a DSC, that same DSC is configured simultaneously to sense the signal being transmitted from the DSC and any other signal may be coupled into the signal that is being transmitted from the DSC.

FIG. 14A is a schematic block diagram of an embodiment 1401 of varying capacitance between two electrodes based on change of distance between them in accordance with the present invention. Two conductive electrodes are separated by some distance, d. The capacitance between the two electrodes varies inversely with respect to the separation between the two electrodes. Generally speaking, any appropriate conductive material may be selected for the electrodes. For example, various types of metallic, conductive, etc. material may be selected for the electrodes to facilitate capacitive coupling of signals between the electrodes.

The two electrodes (e.g., identified by reference numeral 1410 in many diagrams, examples, embodiments, herein) may be viewed as operating and functioning as a capacitor and facilitating capacitive coupling between them such that one or more signals may be transmitted from one electrode and coupled into the other electrode.

For example, consider a capacitor with air as the dielectric between the two electrodes or plates, then $C=Q/V=\varepsilon_0(A/d)$ where C is the capacitance in Farads, Q is the charge in Coulombs, and V is the voltage in volts. The value $\varepsilon_0$ is the permittivity of air (e.g., $8.84 \times 10^{-12}$ F/m), the dielectric material between the electrodes or plates of the capacitor in one particular instance, A is the area of the electrodes or plates (e.g., in square meters), and d is the distance of separation between the two electrodes or plates in meters.

Consider alternatively capacitor with at least some material implemented as the dielectric between the electrodes or plates, then $C=Q/V=\varepsilon_0\varepsilon_r(A/d)$ Where $\varepsilon_r$ is the permittivity of the dielectric material between the electrodes or plates. Such electrodes may be implemented into or part of various elements or components. The capacitance between the electrodes changes as the distance between the electrodes changes. For example, consider that the distance between the electrodes increases from d to d' where d'>d, then the capacitance between electrodes will decrease from C to C', where C'<C.

One or more appropriately implemented DSCs, such as connected to and/or coupled to one or more of the electrodes, is operative to detect the impedance (such as the capacitive reactance), Xc, associated with the capacitance, C, between the electrodes. One or more appropriately implemented processing modules, operatively coupled to the one or more appropriately implemented DSCs, is configured to interpret the impedance, Xc, associated with the capacitance, C, between the electrodes and to calculate that capacitance, C, and also the distance, d, between the electrodes that is associated with that capacitance, C.

Moreover, by using appropriately selected signals having distinguishable characteristics, such as differing in frequency and/or one or more other parameters, detection of the capacitive coupling between two particular electrodes may be determined even in the presence of one or more other electrodes that may be implemented within a relatively close proximity to the two particular electrodes of interest. Generally speaking, utilization of different perspective signals having different distinguishable characteristics facilitates the discrimination and unique identification of capacitance and/or the impedance associated with the capacitance between any two electrodes.

Generally speaking, as the distance between the electrodes increases, then the capacitance between the electrodes decreases. Conversely, as the distance between the electrodes decreases, then the capacitance between the electrodes increases. In addition, while many examples provided herein described detection of capacitance and/or change of capacitance (which includes the impedance and/or change of the impedance associated with the capacitance, C), note that any alternative impedance and/or change of impedance between the electrodes that may also occur and that may not be purely capacitive in nature may be detected. For example, one or more appropriately implemented DSCs is also operative to detect any other such change of impedance as well. For example, any change of impedance between the electrodes that may not be purely capacitive and nature may also be detected. One or more appropriately implemented DSCs is configured to detect generally any change of impedance between electrodes.

In addition, note that the impedance associated with the capacitance, C, which may be referred to as capacitive reactance, Xc, varies as a function of frequency, f, in Hz.

$Xc=1/(2\pi fC)$.

Also, note that the capacitive reactance, Xc, will vary as a function of the frequency of the signal provided to it. Consider different respective signals of different respective frequencies (e.g., f1, f2, f3, etc.) being provided to a component having the same capacitance, C. For example, the different respective capacitive reactances, Xc1, Xc2, Xc3, etc. that may be detected via these different respective signals may be represented as follows:

Xc1=1/(2π(f1)C),
Xc2=1/(2π(f2)C),
Xc3=1/(2π(f3)C), and so on.

In some examples, different respective measurements of capacitance may be made with respect to a component using different respective signals (e.g., such as having different respective frequencies). Also, such signal differentiation (e.g., using different respective signals such as having different respective frequencies) may also be used to distinguish and differentiate the detection of different respective capacitive reactances, such as Xc1_2, Xc1_3, Xc1_4, etc. associated with different respective components such as different respective capacitances, C1_2, C1_3, C1_4, etc. (e.g., that may correspond to different respective capacitances such as between a first electrode 1 and a second electrode 2 (C1_2), between the first electrode 1 and a third electrode 3 (C1_3), between the first electrode 1 and a fourth electrode 4 (C1_4), etc.). For example, the different respective capacitive reactances, Xc1_2, Xc1_3, Xc1_4, etc. that may be detected via these different respective signals may be represented as follows:

Xc1_2=1/(2π(f1)(C1_2)),
Xc2_3=1/(2π(f2)(C1_3)),
Xc3_4=1/(2π(f3)(C1_4)), and so on.

One or more appropriately implemented DSCs, such as connected to and/or coupled to the electrodes, is operative to detect the different respective capacitive reactances, such as Xc1_2, Xc1_3, Xc1_4, etc., associated with the different respective capacitances, C1_2, C1_3, C1_4, etc., between the electrodes. One or more appropriately implemented processing modules, operatively coupled to the one or more appropriately implemented DSCs, is configured to interpret the different respective capacitive reactances, such as Xc1_2, Xc1_3, Xc1_4, etc., associated with those different respective capacitances, C1_2, C1_3, C1_4, etc., between the electrodes and to calculate those different respective capacitances, C1_2, C1_3, C1_4, etc., and also the different respective distances, d1_2, d1_3, d1_4, etc. between those electrodes that are associated with those different respective capacitances, C1_2, C1_3, C1_4, etc. For example, consider d1_2, d1_3, d1_4, etc. to correspond to different respective distance such as between the first electrode 1 and the second electrode 2 (d1_2), between the first electrode 1 and the third electrode 3 (d1_3), between the first electrode 1 and the fourth electrode 4 (d1_4), etc.).

FIG. 14B is a schematic block diagram of another embodiment 1402 of varying capacitance between two electrodes based on change of distance between them in accordance with the present invention. Again, the capacitance between the electrodes changes as the distance between the electrodes changes. For example, consider that the distance between the electrodes decreases from d to d' where d'<d, then the capacitance between electrodes will increase from C to C', where C'>C.

Consider an implementation which the distance between the electrodes is permitted to increase and decrease, then one or more appropriately implemented DSCs is operative to detect not only the change of that capacitance, but also to determine the associated change of distance between electrodes. Note that while certain examples show two electrodes such that at least one of the electrodes is permitted to move, generally speaking, any desired number of electrodes may be implemented in various elements, components, etc. and detection of the capacitance between any desired electrodes may be determined including any change of that capacitance between any desired electrodes.

Generally speaking, the principle of detecting the capacitance and/or change of capacitance (which includes the impedance and/or change of the impedance associated with the capacitance, C) between any desired electrodes may be used to perform capacitive imaging. For example, consider a number of different respective electrodes implemented on different respective surfaces of an object, then detection of signals between the respective electrodes via capacitive coupling facilitates generation of a capacitive image of the object. Generally speaking, consider an implementation that includes a number of electrodes, such as a glove that includes multiple electrodes therein.

A capacitive image corresponds to the measurements of the impedance Z (e.g., capacitive reactance, Xc) and/or change thereof for their respective electrodes at a particular time. For example, considering a glove that includes multiple electrodes therein, a capacitive image of the glove corresponds to measurements of the of the impedance Z (e.g., capacitive reactance, Xc) and/or change thereof for their respective electrodes at a particular time and monitoring the change of that capacitive image of the glove facilitates movement detection of any one or more portions of a user's hand when interacting with the glove. For example, one or more processing modules is configured to generate the information corresponding to the capacitive image and facilitate its storage in memory, and based on comparison of that capacitive image with one or more other capacitive images that are generated at one or more different times, the one or more processing modules is configured to perform movement detection of any one or more portions of a user's hand when interacting with the glove. In certain embodiments, the one or more processing modules is configured to monitor and track the change of capacitance of the respective electrodes over time. The one or more processing modules is configured to compare the respective capacitive images that have been generated at different respective times, and based on differences between them, to determine movement detection of any one or more portions of a user's hand when interacting with the glove Certain examples are described herein in which multiple respective electrodes are implemented in a glove to facilitate capacitive imaging of a hand of a user of the glove. In addition, by monitoring and tracking any change of the capacitive image of the electrodes associated with the glove, including any sub-portion thereof, such as the electrodes associated with a digit (e.g., any of the fingers and/or thumb), the palm of the glove, the back of the glove, any portion that may be associated with a wrist of the glove, etc., then the movement detection of any portion of the hand may also be made using one or more appropriately implemented DSCs.

Also, while many examples are described herein with respect to a glove that is implemented to include electrodes to facilitate capacitive imaging of the hand of the user of the glove, note that alternative implementations may be made using similar principles. For example, other types of articles that may be associated with the user may alternatively be constructed that include electrodes to facilitate capacitive imaging. Examples may include any one or more of a shirt, a sock, a bodysuit, an arm or leg wrap (e.g., an article implemented to wrap around at least a portion of an arm or leg), etc. and/or any other article that may be associated with the user. In addition, note that such capacitive imaging may be implemented with any type of object that may not be specifically associated with the user. For example, an article that includes electrodes to facilitate capacitive imaging may be appropriately implemented around at least a portion of any object to facilitate capacitive imaging of at least a portion of that object using the principles described herein.

FIG. 14C is a schematic block diagram of various embodiments 1403 of dielectric material implemented between two electrodes to facilitate improved capacitive coupling in accordance with the present invention. In certain examples, there is an air gap between the electrodes. However, consider an application such as electrodes being implemented within a glove to facilitate capacitive imaging of hand, then as a user interacts with the glove, there will be a non-air/solid material between the electrodes (e.g., the users hand including flash, bone, ligaments, blood vessels, etc.). Considering this material between the electrodes to have an associated permittivity, $\varepsilon_r$, may have some effect on the capacitive coupling between the electrodes.

Alternatively to and/or in combination with a dielectric material implemented between two electrodes to facilitate improved capacitive coupling, a compressible material may be place between two electrodes. For example, consider the example on the left hand side of this diagram as including a compressible type material between the electrodes (e.g., a material that may be compressed when the electrodes encounter pressure or some means that modifies the distance between the electrodes and rebounds and returns to shape when that pressure or means is removed). In some examples, the electrodes are substantially planar in construction. Also, in some other examples, the electrodes are stacked and some material is implemented between them (e.g., a dielectric material and/or compressible material).

In addition, as desired in certain applications, an appropriately selected dielectric material may be implemented between the electrodes to facilitate improved capacitive coupling between electrodes. For example, an appropriately selected insulating material may be implemented between the electrodes to facilitate an increase of the surface charge between the electrodes for a given electric field strength. For example, consider the metallic plates or electrodes of a capacitor having an appropriately selected dielectric material between the metallic plates or electrodes that will exhibit the characteristic such that the polarization of the dielectric material, when exposed to an applied electric field, will increase the surface charge of the metallic plates or electrodes of the capacitor for the applied electric field strength. This may be viewed as being a boost or gain of the capacitive coupling between the metallic plates or electrodes of the capacitor.

Note that at least some dielectric material may be implemented between any desired portion of the separation between the electrodes to facilitate improved capacitive coupling between the electrodes. This diagram shows some examples where at least some dielectric material is implemented between the electrodes. For example, the dielectric material may be implemented completely between the two electrodes. Alternatively, at least some dielectric material may be implemented in a distributed manner such that at least some of that dielectric material is implemented near both of the electrodes, or alternatively, near only one of the electrodes. Consider an implementation in which electrodes are implemented within a glove to facilitate capacitive imaging, then and appropriately selected dielectric material may be implemented within the glove to facilitate improved capacitive coupling between electrodes of the glove.

FIG. 14D is a schematic block diagram of an embodiment 1404 of drive-sense circuits (DSCs) implemented to interact with electrodes based on capacitive coupling between them and to detect the capacitance between the electrodes based on the distance between them in accordance with the present invention.

In this diagram as well as others here and, one or more processing modules 42 is configured to communicate with and interact with at least one drive-sense circuit (DSC) 28. This diagram particularly shows the one or more processing modules 42 implemented to communicate with and interact with a first DSC 28 and a second DSC 28 that are respectively connected to and/or coupled to electrodes 1410.

Note that the communication and interaction between the one or more processing modules 42 and the DSC 28 may be implemented in via any desired number of communication pathways (e.g., generally n communication pathways, where n is a positive integer greater than or equal to one). The one or more processing modules 42 is coupled to at least one DSC 28 (e.g., this diagram showing being coupled to a first DSC 28 associated with a first electrode 1410 and a second BSE 28 associated with the second electrode 1410). Note that the one or more processing modules 42 may include integrated memory and/or be coupled to other memory. At least some of the memory stores operational instructions to be executed by the one or more processing modules 42. In addition, note that the one or more processing modules 42 may interface with one or more other devices, components, elements, etc. via one or more communication links, networks, communication pathways, channels, etc.

Considering one of the DSCs 28, the DSC 28 is configured to provide a signal to an electrode. Note that the DSC 28 is configured to provide the signal to the electrode and also simultaneously to sense the signal that is provided to the electrode including detecting any change of the signal. For example, a DSC 28 is configured to provide a signal to the electrode 1410 to which it is connected or coupled and simultaneously sense that signal including any change thereof. For example, the DSC 28 is configured to sense a signal that is capacitively coupled between the electrodes 1410 including any change of the signal (e.g., such as may be effectuated based on a change of the distance between the electrodes 1410).

Generally speaking, a DSC 28 is configured to provide a signal having any of a variety of characteristics such as a signal that includes only a DC component, a signal that includes only an AC component, or a signal that includes both a DC and AC component. For example, a signal having at least some AC component is used to facilitate capacitive coupling between the electrodes in accordance with capacitive imaging as described herein.

In addition, the one or more processing modules 42 is configured to provide a reference signal to the DSC 28, facilitate communication with the DSC 28, perform interfacing and control of the operation of one or more components of the DSC 28, receive digital information from the DSC 28 that may be used for a variety of purposes facilitating capacitive imaging associated with the capacitive coupling of signals between the electrodes and determining the distance between the electrodes based on that capacitive coupling. Consider an example in which multiple respective electrodes are implemented in an article, then, the one or more processing modules 42 is configured to interpret information provided from the DSCs 28 to determine the distance between the various electrodes to generate a capacitive image of the article. In addition, the one or more processing modules 42 is also configured to interpret such information to determine any movement of an object associated with the article (e.g., such as any movement of any one or more portions of the hand of a user interacting with a glove that includes such electrodes).

Generally speaking, note that a reference signal that provided from the one or more processing modules 42 to a DSC 28 in this diagram as well as any other diagram herein may have any desired form. For example, the reference signal may be selected to have any desired magnitude, frequency, phase, etc. among other various signal characteristics. In addition, the reference signal may have any desired waveform. For example, many examples described herein are directed towards a reference signal having a DC component and/or an AC component. Note that the AC component may have any desired waveform shape including sinusoid, sawtooth wave, triangular wave, square wave, etc. among the various desired waveform shapes. In addition, note that DC component may be positive or negative. Moreover, note that some examples operate having no DC component (e.g., a DC component having a value of zero/0). In addition, note that more the AC component may include more than one component corresponding to more than one frequency. For example, the AC component may include a first AC component having a first frequency and a second AC component having a second frequency. Generally speaking, the AC component may include any number of AC components having any number of respective frequencies.

FIG. 14E is a schematic block diagram of another embodiment 1405 of a DSC implemented to interact with at least one electrode of a pair of electrodes based on capacitive coupling between them and to detect the capacitance between the electrodes based on the distance between them in accordance with the present invention. This diagram similarly includes one or more processing modules 42, which may include memory and/or be coupled to memory, that is in communication with and interacts with the DSC 28 that is coupled to or connected to an electrode 1410. In this diagram, one of the electrodes 1410 is connected to a DSC 28, and the other electrode 1410 is connected to a known voltage potential. In some examples, this known voltage potential is ground. Note that the ground may be a circuit/common and/or earth ground. Generally speaking, one of the electrodes 1410 may be connected to or coupled to a DSC 28 while the other electrode is connected to some known voltage potential. The DSC 28 is configured to provide a signal to the electrode 1410 to which it is connected or coupled and simultaneously sense that signal including any change thereof. For example, the DSC 28 is configured to sense a signal that is capacitively coupled between the electrodes including any change of the signal (e.g., such as may be effectuated based on a change of the distance between the electrodes).

Figure 15:
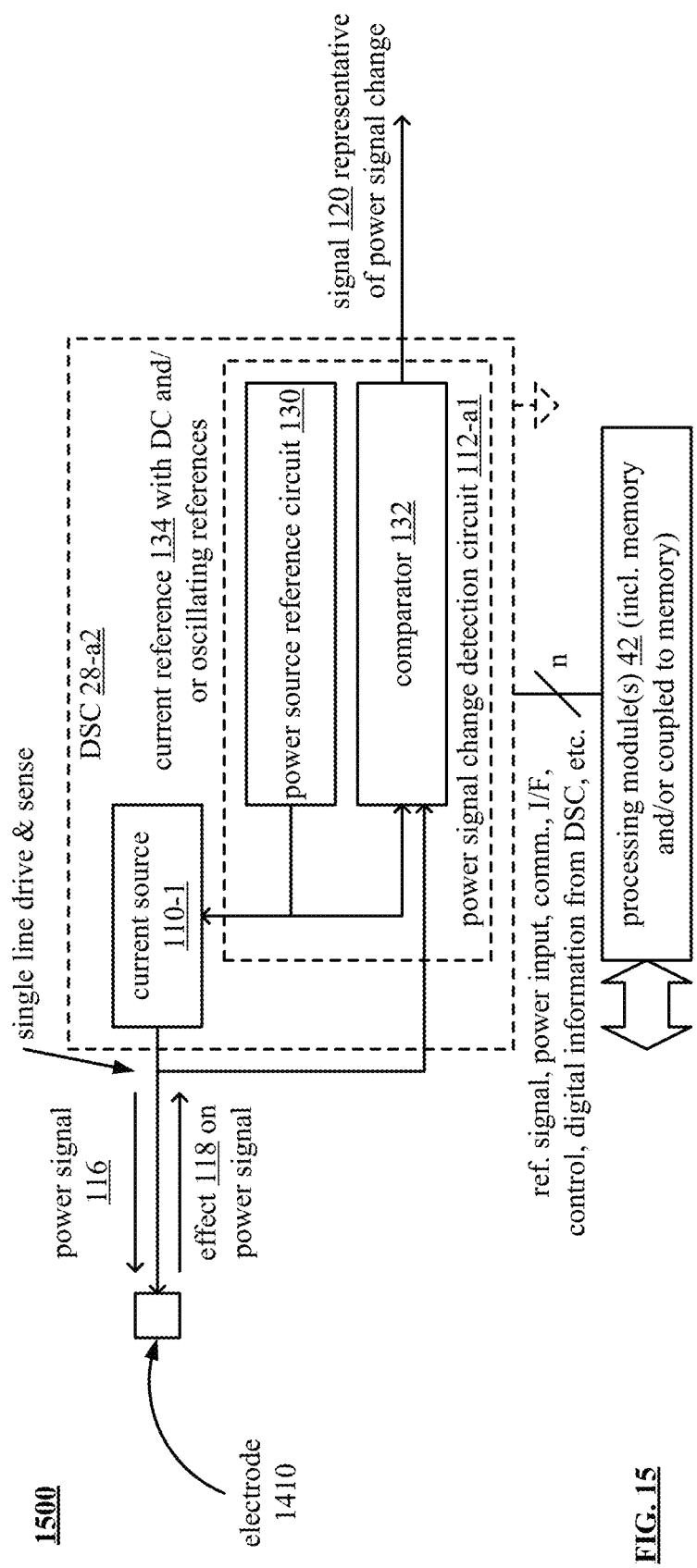
FIG. 15 is a schematic block diagram of an embodiment of a DSC that is interactive with an electrode in accordance with the present invention.

FIG. 15 is a schematic block diagram of an embodiment 1500 of a DSC that is interactive with an electrode in accordance with the present invention. Similar to other diagrams, examples, embodiments, etc. herein, the DSC 28-a2 of this diagram is in communication with one or more processing modules 42. The DSC 28-a2 is configured to provide a signal (e.g., a transmit signal, a monitoring signal, etc.) to the electrode 1410 via a single line and simultaneously to sense that signal via the single line. In some examples, sensing the signal includes detection of an electrical characteristic of the electrode that is based on a response of the electrode 1410 to that signal. Examples of such an electrical characteristic may include detection of an impedance of the electrode 1410 such as a change of capacitance of the electrode 1410, detection of one or more signals coupled into the electrode 1410 such as from one or more other electrodes, and/or other electrical characteristics. In addition, note that the electrode 1410 may be implemented in a capacitive imaging glove in certain examples.

In some examples, the DSC 28-a2 is configured to provide the signal to the electrode to perform any one or more of capacitive imaging of an element (e.g., such as a glove, sock, a bodysuit, or any portion of a capacitive imaging component associated with the user and/or operative to be worn and/or used by a user) that includes the electrode (e.g., such as a capacitive imaging glove, a capacitive imaging sock, a capacitive imaging bodysuit, or any portion of a capacitive imaging component associated with the user and/or operative to be worn and/or used by a user), digit movement detection such as based on a competitive imaging glove, inter-digit movement detection such as based on a competitive imaging glove, movement detection within a three-dimensional (3-D) space, and/or other purpose(s).

This embodiment of a DSC 28-a2 includes a current source 110-1 and a power signal change detection circuit 112-a1. The power signal change detection circuit 112-a1 includes a power source reference circuit 130 and a comparator 132. The current source 110-1 may be an independent current source, a dependent current source, a current mirror circuit, etc.

In an example of operation, the power source reference circuit 130 provides a current reference 134 with DC and oscillating components to the current source 110-1. The current source generates a current as the power signal 116 based on the current reference 134. An electrical characteristic of the electrode 1410 has an effect on the current power signal 116. For example, if the impedance of the electrode 1410 decreases and the current power signal 116 remains substantially unchanged, the voltage across the electrode 1410 is decreased.

The comparator 132 compares the current reference 134 with the affected power signal 118 to produce the signal 120 that is representative of the change to the power signal. For example, the current reference signal 134 corresponds to a given current (I) times a given impedance (Z). The current reference generates the power signal to produce the given current (I). If the impedance of the electrode 1410 substantially matches the given impedance (Z), then the comparator's output is reflective of the impedances substantially matching. If the impedance of the electrode 1410 is greater than the given impedance (Z), then the comparator's output is indicative of how much greater the impedance of the electrode 1410 is than that of the given impedance (Z). If the impedance of the electrode 1410 is less than the given impedance (Z), then the comparator's output is indicative of how much less the impedance of the electrode 1410 is than that of the given impedance (Z).

Figure 16:
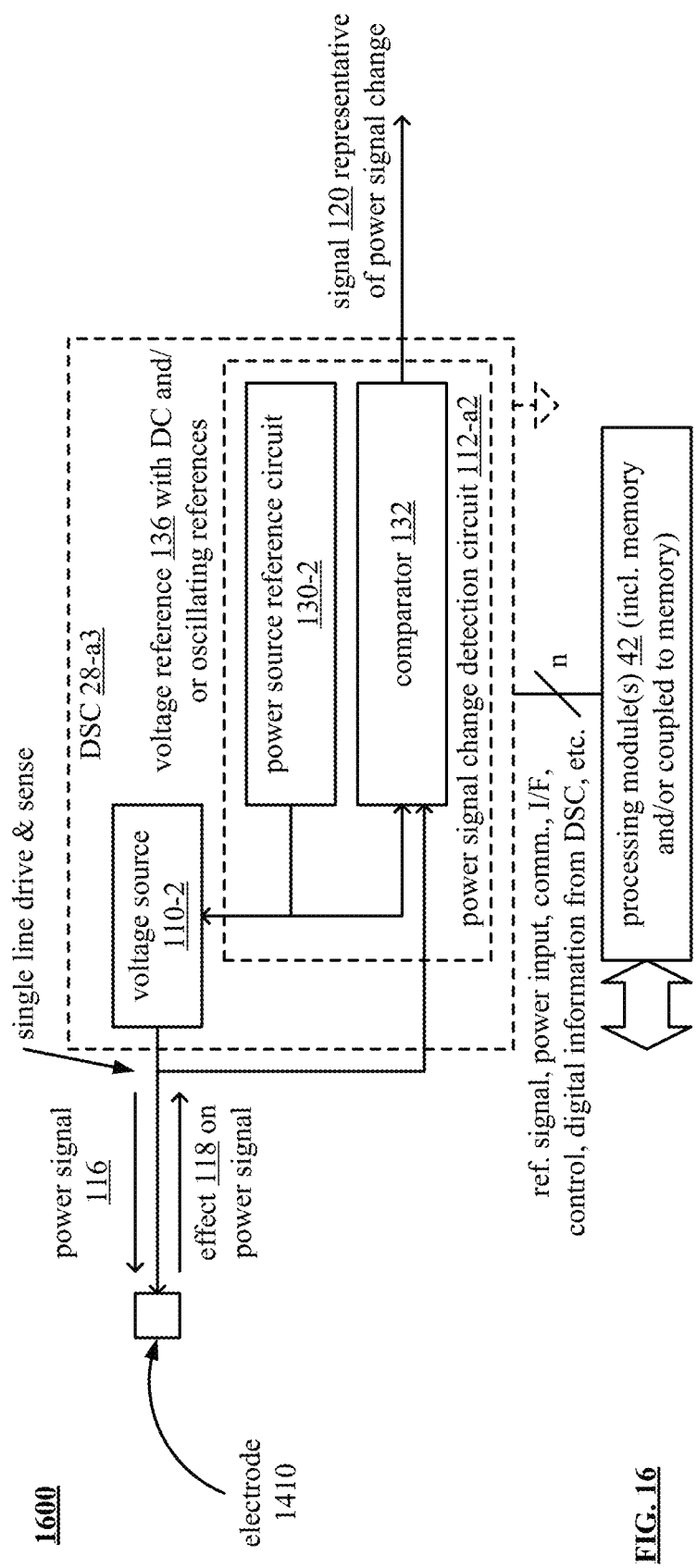
FIG. 16 is a schematic block diagram of another embodiment of a DSC that is interactive with an electrode in accordance with the present invention.

FIG. 16 is a schematic block diagram of another embodiment 1600 of a DSC that is interactive with an electrode in accordance with the present invention. Similar to other diagrams, examples, embodiments, etc. herein, the DSC 28-a3 of this diagram is in communication with one or more processing modules 42. Similar to the previous diagram, although providing a different embodiment of the DSC, the DSC 28-a3 is configured to provide a signal to the electrode 1410 via a single line and simultaneously to sense that signal via the single line. In some examples, sensing the signal includes detection of an electrical characteristic of the electrode 1410 that is based on a response of the electrode 1410 to that signal. Examples of such an electrical characteristic may include detection of an impedance of the electrode 1410 such as a change of capacitance of the electrode 1410, detection of one or more signals coupled into the electrode 1410 such as from one or more other electrodes, and/or other electrical characteristics. In addition, note that the electrode 1410 may be implemented in a capacitive imaging glove in certain examples.

This embodiment of a DSC 28-a3 includes a voltage source 110-2 and a power signal change detection circuit 112-a2. The power signal change detection circuit 112-a2 includes a power source reference circuit 130-2 and a comparator 132-2. The voltage source 110-2 may be a battery, a linear regulator, a DC-DC converter, etc.

In an example of operation, the power source reference circuit 130-2 provides a voltage reference 136 with DC and oscillating components to the voltage source 110-2. The voltage source generates a voltage as the power signal 116 based on the voltage reference 136. An electrical characteristic of the electrode 1410 has an effect on the voltage power signal 116. For example, if the impedance of the electrode 1410 decreases and the voltage power signal 116 remains substantially unchanged, the current through the electrode 1410 is increased.

The comparator 132 compares the voltage reference 136 with the affected power signal 118 to produce the signal 120 that is representative of the change to the power signal. For example, the voltage reference signal 134 corresponds to a given voltage (V) divided by a given impedance (Z). The voltage reference generates the power signal to produce the given voltage (V). If the impedance of the electrode 1410 substantially matches the given impedance (Z), then the comparator's output is reflective of the impedances substantially matching. If the impedance of the electrode 1410 is greater than the given impedance (Z), then the comparator's output is indicative of how much greater the impedance of the electrode 1410 is than that of the given impedance (Z). If the impedance of the electrode 1410 is less than the given impedance (Z), then the comparator's output is indicative of how much less the impedance of the electrode 1410 is than that of the given impedance (Z).

Figure 17A:
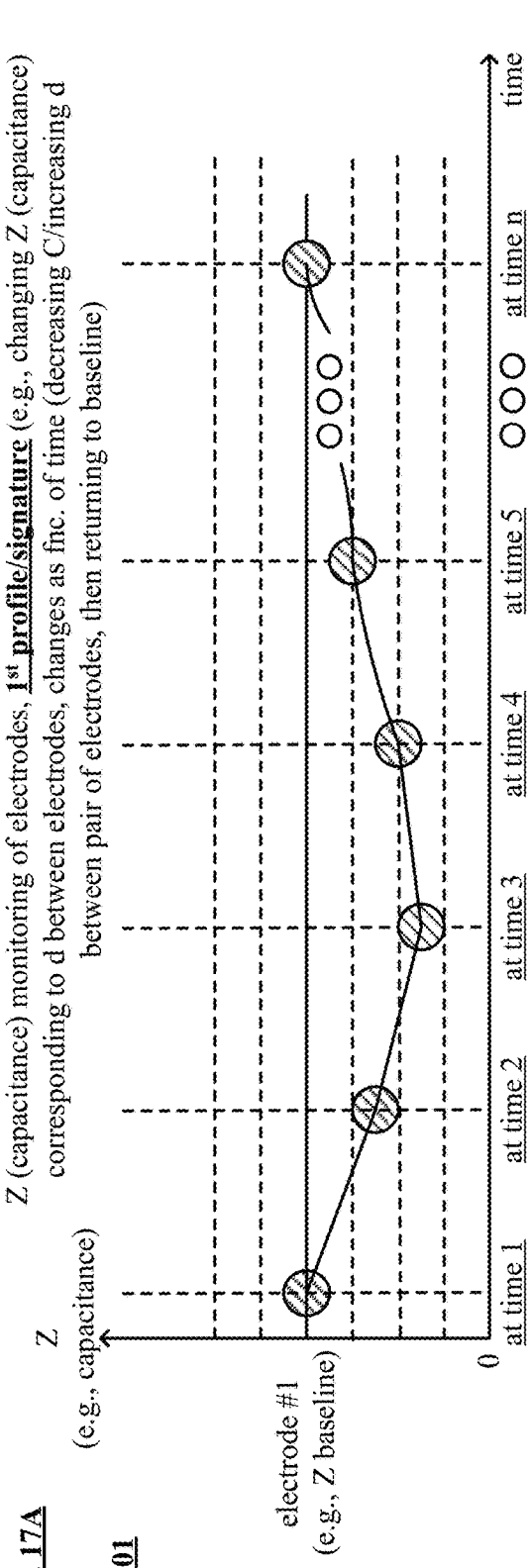
FIG. 17A is a schematic block diagram of an embodiment of a profile or signature associated with varying capacitance between electrodes in accordance with the present invention.

FIG. 17A is a schematic block diagram of an embodiment 1701 of a profile or signature associated with varying capacitance between electrodes in accordance with the present invention. This diagram shows change of impedance Z (e.g., such as associated with the change of capacitance) as detected by the DSC that is connected to her coupled to an electrode (e.g., identified as electrode #1 in the diagram). Such impedance Z (e.g., capacitive reactance, Xc) monitoring of an electrode be performed to identify a profile or signature associated with change of that impedance Z (e.g., capacitive reactance, Xc) as a function of time. For example, considering the impedance Z (e.g., capacitive reactance, Xc) to be at a baseline value at time one, then, based on change of distance between this electrode and another electrode is a function of time, so will the impedance Z (e.g., capacitive reactance, Xc) change as a function of time. As can be seen in this diagram, the impedance Z (e.g., capacitive reactance, Xc) decreases as time progresses and then returns to the baseline impedance Z (e.g., capacitive reactance, Xc) value. Such a transition corresponds to an increase of the distance between this electrode and another electrode for a certain period of time and then a decrease of the distance between this electrode and another electrode returning to the original distance by which this electrode and the other electrode were separated (e.g., corresponding to the baseline impedance Z (e.g., capacitive reactance, Xc) value).

Monitoring the particular transition of the change of the impedance Z (e.g., capacitive reactance, Xc) as a function of time may be used for a variety of purposes. For example, consider an implementation of a glove that includes electrodes that are in communication with DSCs and one or more processing modules. The particular profile or signature by which the impedance Z (e.g., capacitive reactance, Xc) changes as a function of time be used to identify a particular movement of at least a portion of the hand of a user interacting with such a glove. For example, consider the five respective digits of the hand to include little/pinky, ring, middle, index, and thumb. Movement of the thumb will effectuate a change of impedance Z (e.g., capacitive reactance, Xc) with respect to other electrodes in the glove differently than movement of one of the other four digits of the hand (e.g., little/pinky, ring, middle, and index). For example, based on the known biomechanical structure and movement of a typical hand, and based on known information regarding the location of the respective electrodes within the glove, a determination of the distance between any desired respective electrodes of the glove may be used to determine movement of any portion of the hand of the user of the glove. For example, monitoring and tracking the change of impedance Z (e.g., capacitive reactance, Xc) between an electrode and one or more other electrodes of the glove may be used to identify a particular movement or gesture of a user of the glove when performing certain actions (e.g., opening other hand, making of a fist, pointing with the index finger, etc.) based on known biomechanical structure and movement of a typical hand.

In some examples, the one or more processing modules generates data associated with such positions, movements, or gestures of the user of the glove, and facilitate storage of the data in memory or subsequent use to identify a similar position, movement, or gesture later. In other examples, the one or more processing modules is configured to compare data associated with the change of impedance Z (e.g., capacitive reactance, Xc) between an electrode and one or more other electrodes of the glove to determine whether or not the position, movement, or gesture of the user is changing over time. For example, consider an application of physical therapy in which a glove is being used by a user to generate data associated with the progress of the physical therapy (e.g., considering rehabilitation of some injury or problem with the hand of the user). The one or more processing modules is configured to analyze data associated with particular positions, movements, or gestures of a user of the glove over time to determine whether or not improvement is being made in the rehabilitation process.

For another example, consider an application of training of a user of the glove to perform a certain task (e.g., teaching a student to write in cursive, training a surgeon to perform a certain procedure using particular movements of the hand, training a dentist to perform a particular procedure on a patient, training a music student to play a particular instrument using particular movements, etc.), the one or more processing modules is configured to analyze data associated with particular movements or gestures of a user of the glove over time to determine whether or not improvement is being made in the training process of that to their individual.

Generally speaking, capacitive imaging of the hand may be performed using a glove that includes electrodes that are in communication with DSCs and one or more processing modules. Monitoring and tracking that capacitive imaging of the hand over time facilitates movement detection of any portion of the hand of the user of the glove. The data generated in accordance with such capacity imaging of the hand may be used for any of a variety of purposes including those described herein.

Other diagrams are included herein showing different profiles or signatures associated with change of impedance Z (e.g., capacitive reactance, Xc) such as may be detected by an electrode. Considering an implementation of a glove that includes electrodes that are in communication with DSCs and one or more processing modules, different profiles or signatures may be used to facilitate unique identification of particular movements or gestures of a user of the glove. In addition, different profiles or signatures may be used to facilitate unique identification of a particular user of the glove. For example, different respective people may perform a similar movement or gesture in different ways thereby generating a different profile or signature associated with change of impedance Z (e.g., capacitive reactance, Xc) between an electrode in one or more other electrodes in the glove. By monitoring and tracking the change of impedance Z (e.g., capacitive reactance, Xc) between an electrode and one or more other electrodes of the glove, unique identification of particular movements or gestures, particular users, the manner in which a particular movement or gesture is performed, etc. may be made.

Figure 17B:
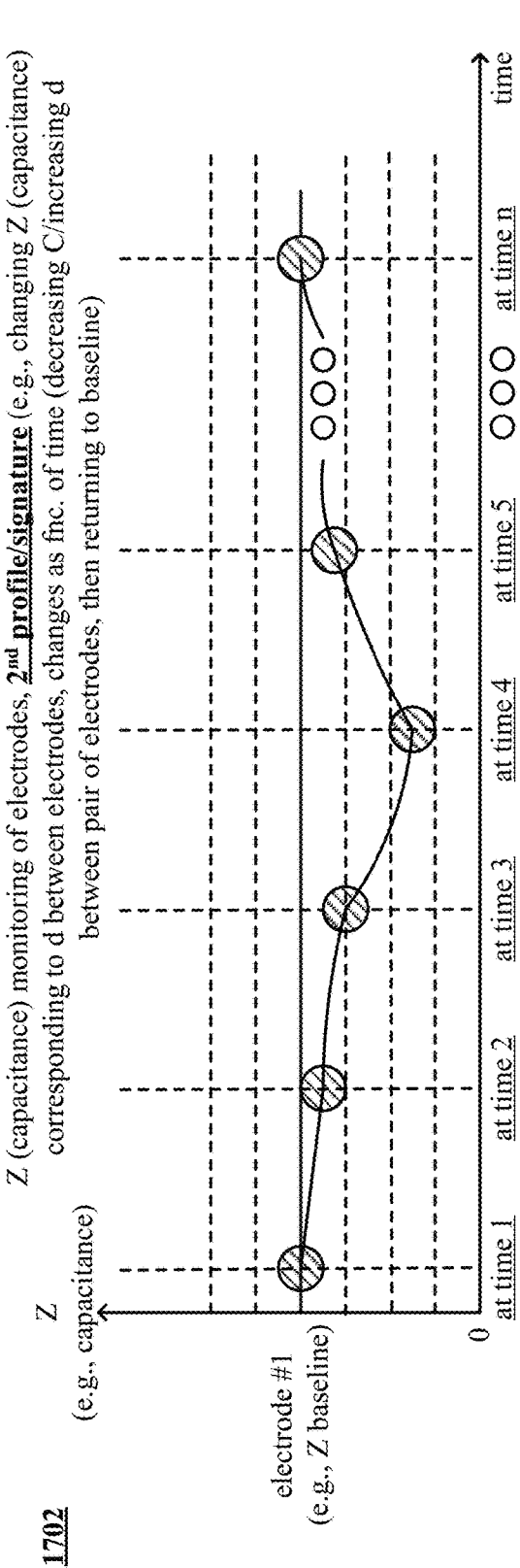
FIG. 17B is a schematic block diagram of another embodiment of a profile or signature associated with varying capacitance between electrodes in accordance with the present invention.

FIG. 17B is a schematic block diagram of another embodiment 1702 of a profile or signature associated with varying capacitance between electrodes in accordance with the present invention. This diagram shows a different profile or signature associated with change of impedance Z (e.g., capacitive reactance, Xc) between an electrode and another electrode. While this diagram is similar to FIG. 17A at least with respect to a decreasing impedance Z (e.g., capacitive reactance, Xc) for some period of time and then returning to its baseline value, note that the profile or signature of this diagram is different than the profile or signature of FIG. 17A. Differences in the profile or signature of the change of impedance Z (e.g., capacitive reactance, Xc) may be used for a variety of reasons including those described herein (e.g., unique identification of particular movements or gestures, particular users, the manner in which a particular movement or gesture is performed, etc.).

FIG. 18A is a schematic block diagram of another embodiment 1801 of a profile or signature associated with varying capacitance between electrodes in accordance with the present invention. This diagram shows a different profile or signature associated with change of impedance Z (e.g., capacitive reactance, Xc) between an electrode and another electrode. In this diagram, the profile or signature is associated with increasing impedance Z (e.g., capacitive reactance, Xc) for some period of time and then returning to its baseline value. Whereas the profiles or signatures of FIGS. 17A and 17B are associated with decreasing impedance Z (e.g., capacitive reactance, Xc)/increasing distance between an electrode and another electrode, the profile or signature of this diagram is associated with increasing impedance Z (e.g., capacitive reactance, Xc)/decreasing distance between an electrode and another electrode.

FIG. 18B is a schematic block diagram of another embodiment 1802 of a profile or signature associated with varying capacitance between electrodes in accordance with the present invention. This diagram shows a different profile or signature associated with change of impedance Z (e.g., capacitive reactance, Xc) between an electrode and another electrode. While this diagram is similar to FIG. 18A at least with respect to an increasing impedance Z (e.g., capacitive reactance, Xc) for some period of time and then returning to its baseline value, note that the profile or signature of this diagram is different than the profile or signature of FIG. 18A. By monitoring and tracking the change of impedance Z (e.g., capacitive reactance, Xc) between an electrode and one or more other electrodes of the glove, unique identification of particular movements or gestures, unique identification of particular positions, particular users, the manner in which a particular movement or gesture is performed, etc. may be made.

Considering an implementation of a glove that includes electrodes that are in communication with DSCs and one or more processing modules, monitoring and tracking the impedance Z (e.g., capacitive reactance, Xc), including any change thereof, between particular electrodes of the glove may be used to perform capacitive imaging of the hand of the user of the glove including movement detection of any portion of the hand.

Figure 19A:
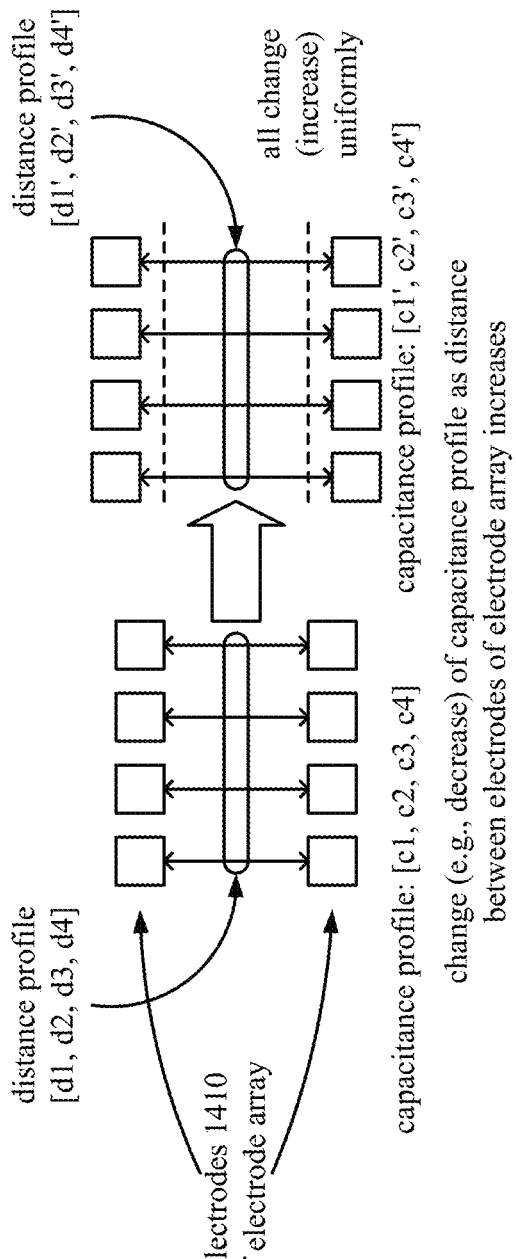
FIG. 19A is a schematic block diagram of an embodiment of varying capacitance between electrodes of an array based on change of distance between the respective electrodes of the array in accordance with the present invention.

FIG. 19A is a schematic block diagram of an embodiment 1901 of varying capacitance between electrodes of an array based on change of distance between the respective electrodes of the array in accordance with the present invention. This diagram shows multiple respective electrodes 1410 of an electrode array. On the left-hand side of the diagram, a distance profile [d1, d2, d3, d4] effectuates a corresponding capacitance profile [c1, c2, c3, c4] associated with the respective distances between particular electrodes. On the right-hand side of the diagram, as the distance between the electrodes 1410 of the electrode array increase (shown as all changing/increasing uniformly), then an updated distance profile [d1', d2', d3', d4'] effectuates a corresponding updated capacitance profile [c1', c2', c3', c4'].

Monitoring and tracking of any change of the impedance Z (e.g., capacitive reactance, Xc) between the respective electrodes 1410 of the electrode array may be used to determine any change of the distance between the respective electrodes 1410 of the electrode array. In this example, an increase of the distance between electrodes 1410 of the electrode array will effectuate a decrease in the respective values of the updated capacitance profile [c1', c2', c3', c4'] in comparison to the capacitance profile [c1, c2, c3, c4] prior to the increase of the distance between the electrodes 1410 of the electrode array.

Figure 19B:
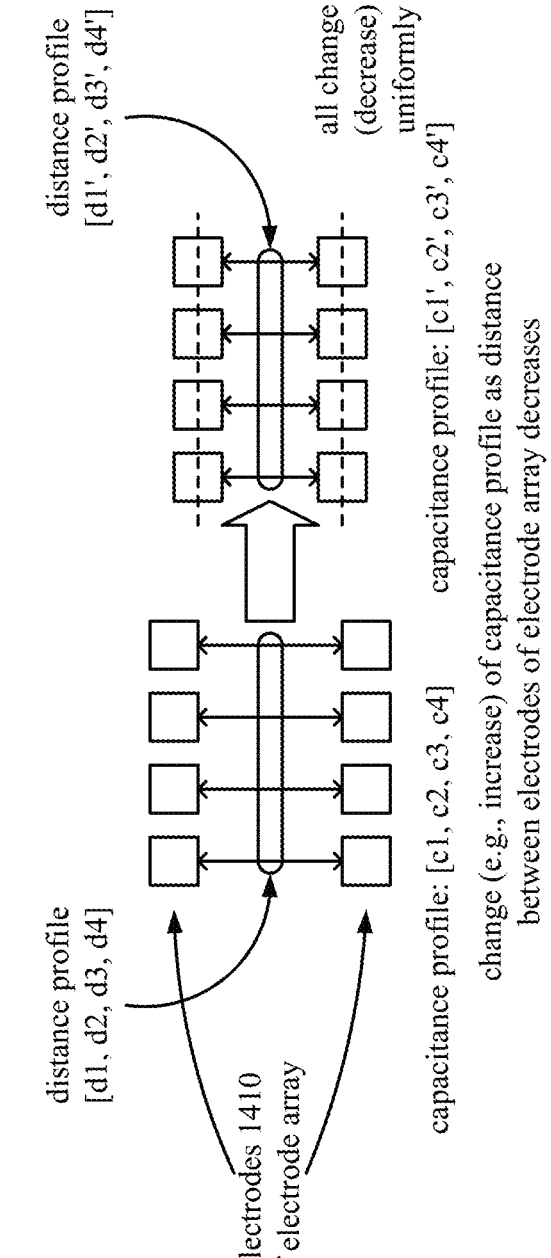
FIG. 19B is a schematic block diagram of another embodiment of varying capacitance between electrodes of an array based on change of distance between the respective electrodes of the array in accordance with the present invention.

FIG. 19B is a schematic block diagram of another embodiment 1902 of varying capacitance between electrodes of an array based on change of distance between the respective electrodes of the array in accordance with the present invention. This diagram similarly shows multiple respective electrodes 1410 of an electrode array. On the left-hand side of the diagram, a distance profile [d1, d2, d3, d4] effectuates a corresponding capacitance profile [c1, c2, c3, c4] associated with the respective distances between particular electrodes. On the right-hand side of the diagram, as the distance between the electrodes 1410 of the electrode array decreases (shown as all changing/decreasing uniformly), then an updated distance profile [d1', d2', d3', d4'] effectuates a corresponding updated capacitance profile [c1', c2', c3', c4'].

Monitoring and tracking of any change of the impedance Z (e.g., capacitive reactance, Xc) between the respective electrodes 1410 of the electrode array may be used to determine any change of the distance between the respective electrodes 1410 of the electrode array. In this example, a decrease of the distance between electrodes 1410 of the electrode array will effectuate an increase in the respective values of the updated capacitance profile [c1', c2', c3', c4'] in comparison to the capacitance profile [c1, c2, c3, c4] prior to the decrease of the distance between the electrodes 1410 of the electrode array.

FIG. 20A is a schematic block diagram of another embodiment 2001 of varying capacitance between electrodes of an array based on change of distance between the respective electrodes of the array in accordance with the present invention. This diagram also shows multiple respective electrodes 1410 of an electrode array. On the left-hand side of the diagram, a distance profile [d1, d2, d3, d4] effectuates a corresponding capacitance profile [c1, c2, c3, c4] associated with the respective distances between particular electrodes. On the right-hand side of the diagram, as the distance between the electrodes 1410 of the electrode array increases (shown as not changing/increasing uniformly), then an updated distance profile [d1', d2', d3', d4'] effectuates a corresponding updated capacitance profile [c1', c2', c3', c4'].

Monitoring and tracking of any change of the impedance Z (e.g., capacitive reactance, Xc) between the respective electrodes 1410 of the electrode array may be used to determine any change of the distance between the respective electrodes 1410 of the electrode array. In this example, the nonuniform increase of the distance between electrodes 1410 of the electrode array will effectuate the updated capacitance profile [c1', c2', c3', c4']. Comparison of the updated capacitance profile [c1', c2', c3', c4'] to the capacitance profile [c1, c2, c3, c4] prior to the nonuniform increase of the distance between the electrodes 1410 of the electrode array may be used to determine a particular movement that was made with respect to the electrodes 1410 of electrode array.

Considering an implementation of a glove that includes electrodes that are in communication with DSCs and one or more processing modules and considering electrodes 1410 of the electrode array being associated with two different fingers of the glove, such a change in the capacitance profile as depicted in this diagram may correspond to spreading of the two fingers of a user of the glove (e.g., such as making a peace symbol with using the index and middle fingers).

Generally speaking, the identification of the capacitance profile and the monitoring and tracking of any change of the capacitance profile may be used to facilitate capacitive imaging. Different respective capacitance profiles may be associated with different respective movements or positions of one or more portions of a hand of a user of the glove. In addition, in some examples, in accordance with generating of data associated with different respective capacitance profiles associated with different respective movements or positions, the one or more processing modules is configured to generate such data based on a user making known or predetermined movements or holding the hand in a known or predetermined position. Then, based on information regarding such known or predetermined movements or positions, the one or more processing modules is configured to associate such capacitance profiles with those known or predetermined movements or positions. The correspondence or association between such known or predetermined movements or positions and the corresponding capacitance profiles may be stored in memory. Such stored information may be used by the one or more processing modules subsequently identify a particular position, movement, or gesture later. In addition, such information as is generated in accordance with a capacitive imaging glove and may be provided from the one or more processing modules 42 via an interface with one or more other devices, components, elements, etc. via one or more communication links, networks, communication pathways, channels, etc. to one or more artificial intelligence (AI) learning systems. For example, such an AI learning system may be implemented to learn and associate such known or predetermined movements or positions and the corresponding capacitance profiles.

FIG. 20B is a schematic block diagram of another embodiment 2002 of varying capacitance between electrodes of an array based on change of distance between the respective electrodes of the array in accordance with the present invention. This diagram also shows multiple respective electrodes 1410 of an electrode array. On the left-hand side of the diagram, a distance profile [d1, d2, d3, d4] effectuates a corresponding capacitance profile [c1, c2, c3, c4] associated with the respective distances between particular electrodes. On the right-hand side of the diagram, as the distance between at least some the electrodes 1410 of the electrode array changes (shown as distance between some of the electrodes not changing, the distance between other electrodes increasing, and the distance between even other electrodes decreasing), then an updated distance profile [d1', d2', d3', d4'] effectuates a corresponding updated capacitance profile [c1', c2', c3', c4'].

Monitoring and tracking of any change of the impedance Z (e.g., capacitive reactance, Xc) between the respective electrodes 1410 of the electrode array may be used to determine any change of the distance between the respective electrodes 1410 of the electrode array. In this example, the nonuniform increase of the distance between electrodes 1410 of the electrode array will effectuate the updated capacitance profile [c1', c2', c3', c4']. Comparison of the updated capacitance profile [c1', c2', c3', c4'] to the capacitance profile [c1, c2, c3, c4] prior to the nonuniform increase of the distance between the electrodes 1410 of the electrode array may be used to determine a particular movement that was made with respect to the electrodes 1410 of electrode array.

Considering an implementation of a glove that includes electrodes that are in communication with DSCs and one or more processing modules and considering electrodes 1410 of the electrode array being associated with two different fingers of the glove, such a change in the capacitance profile as depicted in this diagram may correspond to a curving of an index finger of a user of the glove back towards the palm of the hand of the user of the glove.

Figure 20C:
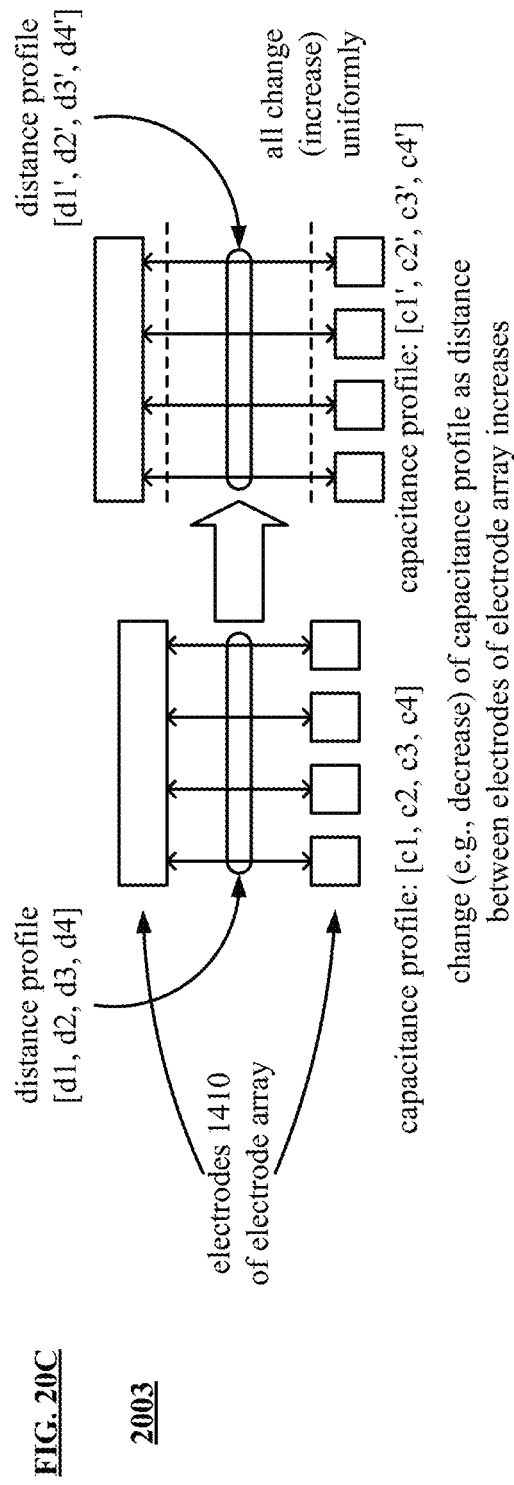
FIG. 20C is a schematic block diagram of another embodiment of varying capacitance between electrodes of an array based on change of distance between the respective electrodes of the array in accordance with the present invention.

FIG. 20C is a schematic block diagram of another embodiment 2003 of varying capacitance between electrodes of an array based on change of distance between the respective electrodes of the array in accordance with the present invention. This diagram similarly shows multiple respective electrodes 1410 of an electrode array; however, two or more electrodes (e.g., shown at the bottom) are implemented to interact with and perform capacitive coupling to a single, common electrode (e.g., shown at the top). On the left-hand side of the diagram, a distance profile [d1, d2, d3, d4] effectuates a corresponding capacitance profile [c1, c2, c3, c4] associated with the respective distances between particular electrodes. On the right-hand side of the diagram, as the distance between the electrodes 1410 of the electrode array decreases (shown as all changing/decreasing uniformly), then an updated distance profile [d1', d2', d3', d4'] effectuates a corresponding updated capacitance profile [c1', c2', c3', c4'].

Monitoring and tracking of any change of the impedance Z (e.g., capacitive reactance, Xc) between the respective electrodes 1410 of the electrode array may be used to determine any change of the distance between the respective electrodes 1410 of the electrode array. In this example, an increase of the distance between electrodes 1410 of the electrode array will effectuate a decrease in the respective values of the updated capacitance profile [c1', c2', c3', c4'] in comparison to the capacitance profile [c1, c2, c3, c4] prior to the increase of the distance between the electrodes 1410 of the electrode array.

Figure 20D:
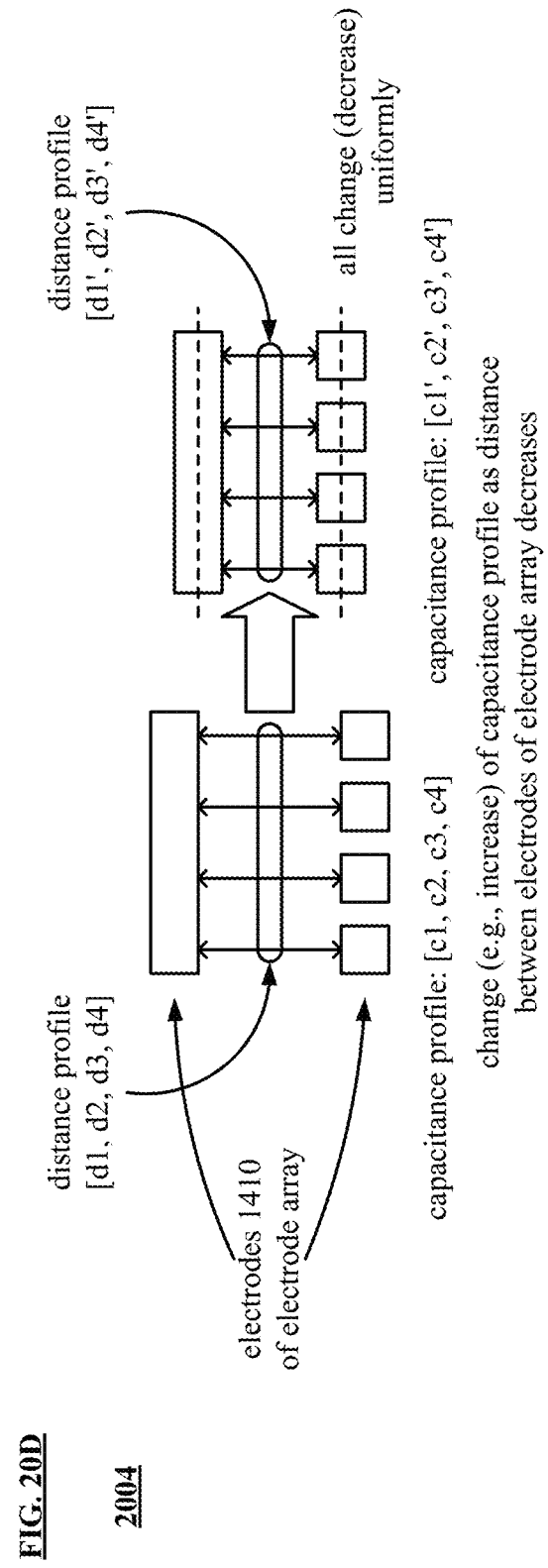
FIG. 20D is a schematic block diagram of another embodiment of varying capacitance between electrodes of an array based on change of distance between the respective electrodes of the array in accordance with the present invention.

FIG. 20D is a schematic block diagram of another embodiment 2004 of varying capacitance between electrodes of an array based on change of distance between the respective electrodes of the array in accordance with the present invention. This diagram similarly shows multiple respective electrodes 1410 of an electrode array; however, two or more electrodes (e.g., shown at the bottom) are implemented to interact with and perform capacitive coupling to a single, common electrode (e.g., shown at the top). On the left-hand side of the diagram, a distance profile [d1, d2, d3, d4] effectuates a corresponding capacitance profile [c1, c2, c3, c4] associated with the respective distances between particular electrodes. On the right-hand side of the diagram, as the distance between the electrodes 1410 of the electrode array decreases (shown as all changing/decreasing uniformly), then an updated distance profile [d1', d2', d3', d4'] effectuates a corresponding updated capacitance profile [c1', c2', c3', c4'].

Also, note that the distance between the electrodes 1410 of the electrode array may increase and/or decrease uniformly and/or non-uniformly (e.g., such as within FIG. 20A and FIG. 20B).

FIG. 21A is a schematic block diagram of another embodiment 2101 of DSCs implemented to interact with electrodes based on capacitive coupling between them and to detect the capacitance between the electrodes based on the distance between them in accordance with the present invention. This diagram shows a number of electrodes 1410 of an electrode array such that each respective electrode is in communication with a respective DSC 28. The DSCs 28 are implemented to communicate with and interact with one or more processing modules 42, which may be implemented to include memory and/or be coupled to memory. This diagram includes one or more processing modules 42, which may include memory and/or be coupled to memory, that is in communication with and interacts with the DSCs 28 that are respectively coupled to or connected to the electrode 1410 of the electrode array.

A DSC 28 is configured to provide a signal to the electrode 1410 to which it is connected or coupled and simultaneously sense that signal including any change thereof. For example, the DSC 28 is configured to sense a signal that is capacitively coupled between the electrodes including any change of the signal (e.g., such as may be effectuated based on a change of the distance between the electrodes). Cooperatively, the different respective DSCs 28 are configured to provide signals to the respective electrodes to which they are connected or coupled and taught simultaneously sense those signals including any change thereof which may include signals from other electrodes being coupled into that particular electrode.

For example, as a first DSC 28 is configured to provide a first signal to a first one of the electrodes 1410, and as a second DSC 28 is configured to provide a second signal to a second one of electrodes 1410, then, when the second signal is capacitively coupled from the second one of the electrodes 1410 to the first one of the electrodes 1410, the first DSC 28 is configured to sense and detect the second signal being coupled into the first one of the electrodes 1410 by simultaneously sensing the first signal that the first DSC 28 is providing to the first one of electrodes 1410. Similarly, the second DSC 28 is configured to detect the first signal being coupled into the second one the electrodes 1410 when the first signal is capacitively coupled from the first one of the electrodes 1410 to the second one of the electrodes 1410 by simultaneously sensing the second signal that the second DSC 28 is providing to the second one of the electrodes 1410.

The one or more processing modules 42 is configured to perform capacitive imaging based on the electrodes 1410 of the electrode array including monitoring and tracking any change of impedance Z (e.g., capacitive reactance, Xc) between the respective electrodes 1410 of the electrode array. For example, the one or more processing modules 42 is configured to generate a capacitive image based on a capacitance profile associated with the capacitances between the electrodes 1410 of the electrode array. In addition, the one or more processing modules 42 is configured to perform movement detection based on change of the capacitance profile associated with the capacitances between the electrodes 1410 of the electrode array.

FIG. 21B is a schematic block diagram of another embodiment 2102 of DSCs implemented to interact with electrodes based on capacitive coupling between them and to detect the capacitance between the electrodes based on the distance between them in accordance with the present invention. This diagram shows a number of electrodes 1410 of an electrode array such that some of the electrodes 1410 of the electrode array are respectively in communication with a respective DSC 28 and other electrodes 1410 of the electrode array are connected to a known voltage potential. In some examples, this known voltage potential is ground. Note that the ground may be a circuit/common and/or earth ground.

This diagram similarly includes one or more processing modules 42, which may include memory and/or be coupled to memory, that is in communication with and interacts with the DSCs 28, at least some of which are coupled to or connected to the electrodes 1410 of the electrode array. In this diagram, some of the electrodes 1410 are connected to a respective DSC 28, and other of the electrodes 1410 of the electrode array are connected to a known voltage potential. In some examples, this known voltage potential is ground. Note that the ground may be a circuit/common and/or earth ground. Generally speaking, considering respective electrodes as forming respective pairs, one of the electrodes 1410 of the pair may be connected to or coupled to a DSC 28 while the other electrode of the pair is connected to some known voltage potential. The DSC 28 is configured to provide a signal to the electrode 1410 to which it is connected or coupled and simultaneously sense that signal including any change thereof. For example, the DSC 28 is configured to sense a signal that is capacitively coupled between the electrodes including any change of the signal (e.g., such as may be effectuated based on a change of the distance between the electrodes).

A DSC 28 is configured to provide a signal to the electrode 1410 to which it is connected or coupled and simultaneously sense that signal including any change thereof. For example, the DSC 28 is configured to sense a signal that is capacitively coupled between the electrodes including any change of the signal (e.g., such as may be effectuated based on a change of the distance between the electrodes). Cooperatively, the different respective DSCs 28 are configured to provide signals to the respective electrodes to which they are connected or coupled and taught simultaneously sense those signals including any change thereof which may include signals from other electrodes being coupled into that particular electrode.

For example, as a first DSC 28 is configured to provide a first signal to a first one of the electrodes 1410. Consider that the first signal is capacitively coupled from the first one electrodes 1410 to a second one of the electrodes 1410 that is connected to the known voltage potential (e.g., circuit/common and/or earth ground). The first DSC 28 is configured to provide that first signal to the first one of the electrodes 1410 and simultaneously sense that first signal via the first one of the electrodes 1410 including any other signal that may be coupled into the first one of the electrodes 1410.

The one or more processing modules 42 is configured to perform capacitive imaging based on the electrodes 1410 of the electrode array including monitoring and tracking any change of impedance Z (e.g., capacitive reactance, Xc) between the respective electrodes 1410 of the electrode array. For example, the one or more processing modules 42 is configured to generate a capacitive image based on a capacitance profile associated with the capacitances between the electrodes 1410 of the electrode array that are connected respectively to DSCs 28 and the electrodes 1410 of the electrode array that are connected to the known voltage potential (e.g., circuit/common and/or earth ground). In addition, the one or more processing modules 42 is configured to perform movement detection based on change of the capacitance profile associated with the capacitances between the electrodes 1410 of the electrode array.

FIG. 21C is a schematic block diagram of another embodiment 2103 of DSCs implemented to interact with electrodes based on capacitive coupling between them and to detect the capacitance between the electrodes based on the distance between them in accordance with the present invention. This diagram has some similarity to FIG. 20A with at least one different being that the number of electrodes 1410 of an electrode array such that some of the electrodes 1410 of the electrode array are respectively in communication with a respective DSC 28 and another common/single electrode 1410 of the electrode array also is also connected to a DSC 28. Similarly as described above with respect to FIG. 20A and FIG. 20B, a DSC 28 is configured to provide a signal to the electrode 1410 to which it is connected or coupled and simultaneously sense that signal including any change thereof, the one or more processing modules 42 is configured to perform capacitive imaging based on the electrodes 1410 of the electrode array including monitoring and tracking any change of impedance Z (e.g., capacitive reactance, Xc) between the respective electrodes 1410 of the electrode array, etc.

FIG. 21D is a schematic block diagram of another embodiment 2104 of DSCs implemented to interact with electrodes based on capacitive coupling between them and to detect the capacitance between the electrodes based on the distance between them in accordance with the present invention. This diagram has some similarity to FIG. 20B with at least one different being that the number of electrodes 1410 of an electrode array such that some of the electrodes 1410 of the electrode array are respectively in communication with a respective DSC 28 and another common/single electrode 1410 of the electrode array is connected to a known voltage potential. In some examples, this known voltage potential is ground. Note that the ground may be a circuit/common and/or earth ground. Similarly as described above with respect to FIG. 20A and FIG. 20B, a DSC 28 is configured to provide a signal to the electrode 1410 to which it is connected or coupled and simultaneously sense that signal including any change thereof, the one or more processing modules 42 is configured to perform capacitive imaging based on the electrodes 1410 of the electrode array including monitoring and tracking any change of impedance Z (e.g., capacitive reactance, Xc) between the respective electrodes 1410 of the electrode array, etc.

Figure 21E:
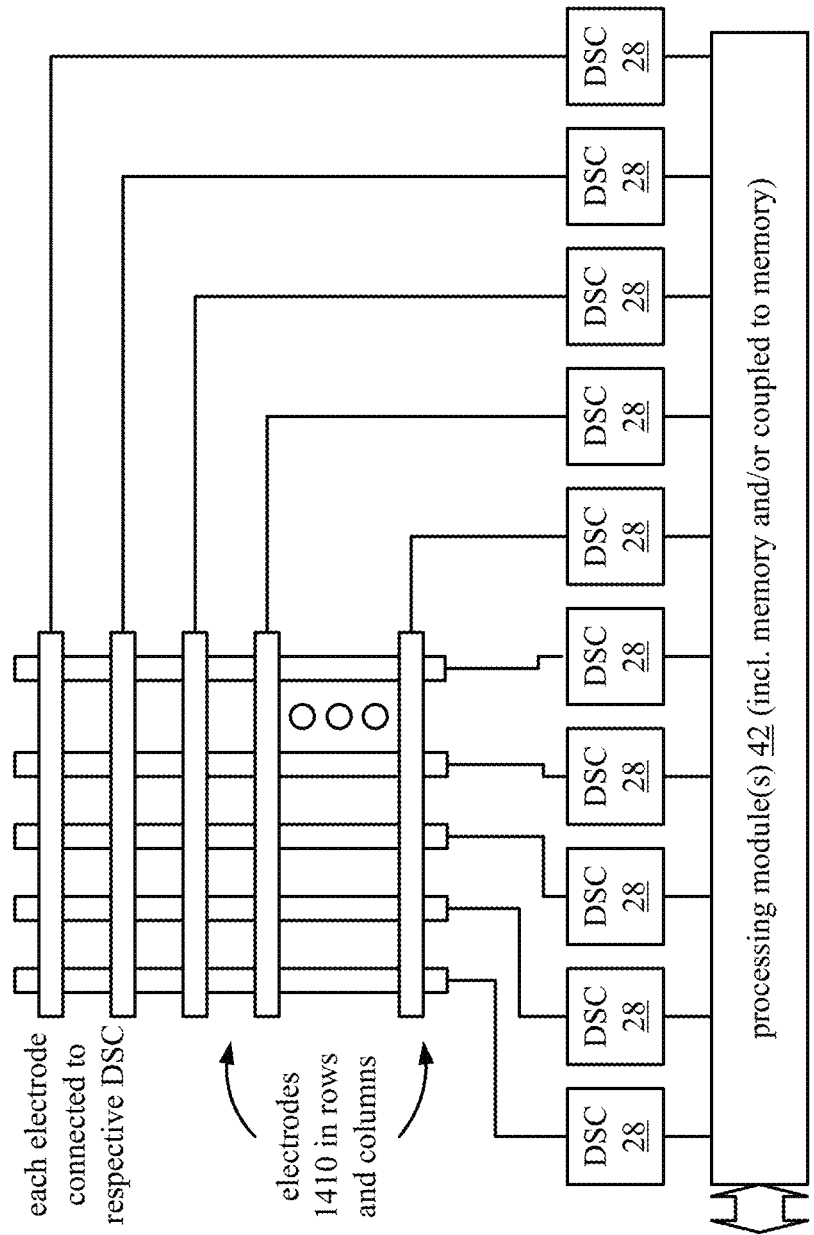
FIG. 21E is a schematic block diagram of another embodiment of DSCs implemented to interact with electrodes implemented in rows and columns, such as may be implemented in accordance with a touch sensor system based on capacitive coupling between three electrodes including to detect the capacitance between the electrodes based on the distance between them in accordance with the present invention.

FIG. 21E is a schematic block diagram of another embodiment 2105 of DSCs implemented to interact with electrodes implemented in rows and columns, such as may be implemented in accordance with a touch sensor system based on capacitive coupling between three electrodes including to detect the capacitance between the electrodes based on the distance between them in accordance with the present invention. This diagram shows a cross section portion of a number of electrodes implemented in a row and column configuration, with some separation between the rows and columns, that are implemented to facilitate capacitive coupling of signals between them.

This diagram similarly includes one or more processing modules 42, which may include memory and/or be coupled to memory, that is in communication with and interacts with the DSCs 28, at least some of which are coupled to or connected to the electrodes 1410 of the electrode array (e.g., a first DSC 28 connected to first row electrode, a second DSC 28 connected to a second row electrode, and so on, a first other DSC 28 connected to a first column electrode, a second other DSC 28 connected to a second column electrode, and so on).

In certain other alternative embodiments, one or more of the electrodes 1410 are connected to a respective DSC 28 (e.g., a first DSC 28 connected to first row electrode, a second DSC 28 connected to a second row electrode, and so on), and one or more other of the electrodes 1410 of the electrode array are connected to a known voltage potential (e.g., one or more column electrodes connected to a known voltage potential). In some examples, this known voltage potential is ground. Note that the ground may be a circuit/common and/or earth ground.

Note that the electrodes implemented in rows and columns such as in accordance with this diagram may be implemented in a material that is suitable to be wrapped around at least a portion of a person or any other object to facilitate capacitive imaging in accordance with the various aspects, embodiments, and/or examples of the invention (and/or their equivalents) as described herein. For example, such an electrode array pattern may be implemented in an appropriate material that may be wrapped around a user's hand, implemented in at least a portion of a shirt, implemented in at least a portion of a sock, implemented in at least a portion of bodysuit, implemented in at least a portion of an arm or leg wrap (e.g., an article implemented to wrap around at least a portion of an arm or leg), implemented in at least a portion of a wrapping around a chest of a user (e.g., such as to monitor breathing, respiration, body position, etc.), etc. and/or any other article that may be associated with the user. Generally, such a such an electrode array pattern may be implemented in an appropriate material that may be wrapped around any object, whether associated with a user or not.

FIG. 22A is a schematic block diagram of another embodiment to 2201 of DSCs implemented to interact with electrodes based on capacitive coupling between them and to detect the capacitance between the electrodes based on the distance between them in accordance with the present invention. This diagram shows a number of electrodes 1410 of an electrode array that are connected respectively to multiplexers that are each connected to a respective DSC 28. A first group of electrodes 1410 of the electrode array are connected to a first multiplexer that is connected to a first DSC 28 that is configured to communicate with and interact with one or more processing modules 42. A second group of electrodes 1410 of the electrode array are connected to a second multiplexer that is connected to a second DSC 28 that is configured to communicate with and interact with one or more processing modules 42. This diagram similarly includes one or more processing modules 42, which may include memory and/or be coupled to memory, that is in communication with and interacts with the DSCs 28 that are coupled to or connected to the electrode 1410 of the electrode array.

The one or more processing modules 42 is configured to direct a respective multiplexer to facilitate connectivity between the respective DSC 28 and a particular electrode 1410 of the electrode array. This implementation shows an example by which a single DSC 28 may be configured to service more than one electrode 1410 of the electrode array such as in a time-multiplexed and/or sequential manner. For example, at or during a first time, based on the select signal provided from the one or more processing modules 42 to the first multiplexer having a first value, the first DSC 28 is configured to operate with a first electrode 1410 of the electrode array. Then, at or during a second time, based on the select signal provided from the one or more processing modules 42 to the first multiplexer having a second value, the first DSC 28 is configured to operate with a second electrode 1410 of the electrode array. Such an implementation may be desirable to implement a smaller or limited number of DSCs 28 in a particular application.

FIG. 22B is a schematic block diagram of another embodiment 2202 of DSCs implemented to interact with electrodes based on capacitive coupling between them and to detect the capacitance between the electrodes based on the distance between them in accordance with the present invention. This diagram shows a number of electrodes 1410 of an electrode array that are connected respectively to multiplexers that are each connected to a respective DSC 28 and other electrodes 1410 of the electrode array are connected to a known voltage potential. In some examples, this known voltage potential is ground. Note that the ground may be a circuit/common and/or earth ground. A first group of electrodes 1410 of the electrode array are connected to a multiplexer that is connected to a DSC 28 that is configured to communicate with and interact with one or more processing modules 42. A second group of electrodes 1410 of the electrode array are connected to the known voltage potential (e.g., circuit/common and/or earth ground). This diagram similarly includes one or more processing modules 42, which may include memory and/or be coupled to memory, that is in communication with and interacts with the DSC 28, at least some of which are coupled to or connected to the electrodes 1410 of the electrode array.

The one or more processing modules 42 is configured to direct the multiplexer to facilitate connectivity between the respective DSC 28 and a particular electrode 1410 of the electrode array. This implementation shows another example by which a single DSC 28 may be configured to service more than one electrode 1410 of the electrode array such as in a time-multiplexed and/or sequential manner. For example, at or during a first time, based on the select signal provided from the one or more processing modules 42 to the first multiplexer having a first value, the first DSC 28 is configured to operate with a first electrode 1410 of the electrode array. Then, at or during a second time, based on the select signal provided from the one or more processing modules 42 to the first multiplexer having a second value, the first DSC 28 is configured to operate with a second electrode 1410 of the electrode array. Similar to the previous diagram, such an implementation may be desirable to implement a smaller or limited number of DSCs 28 in a particular application.

Figure 23:
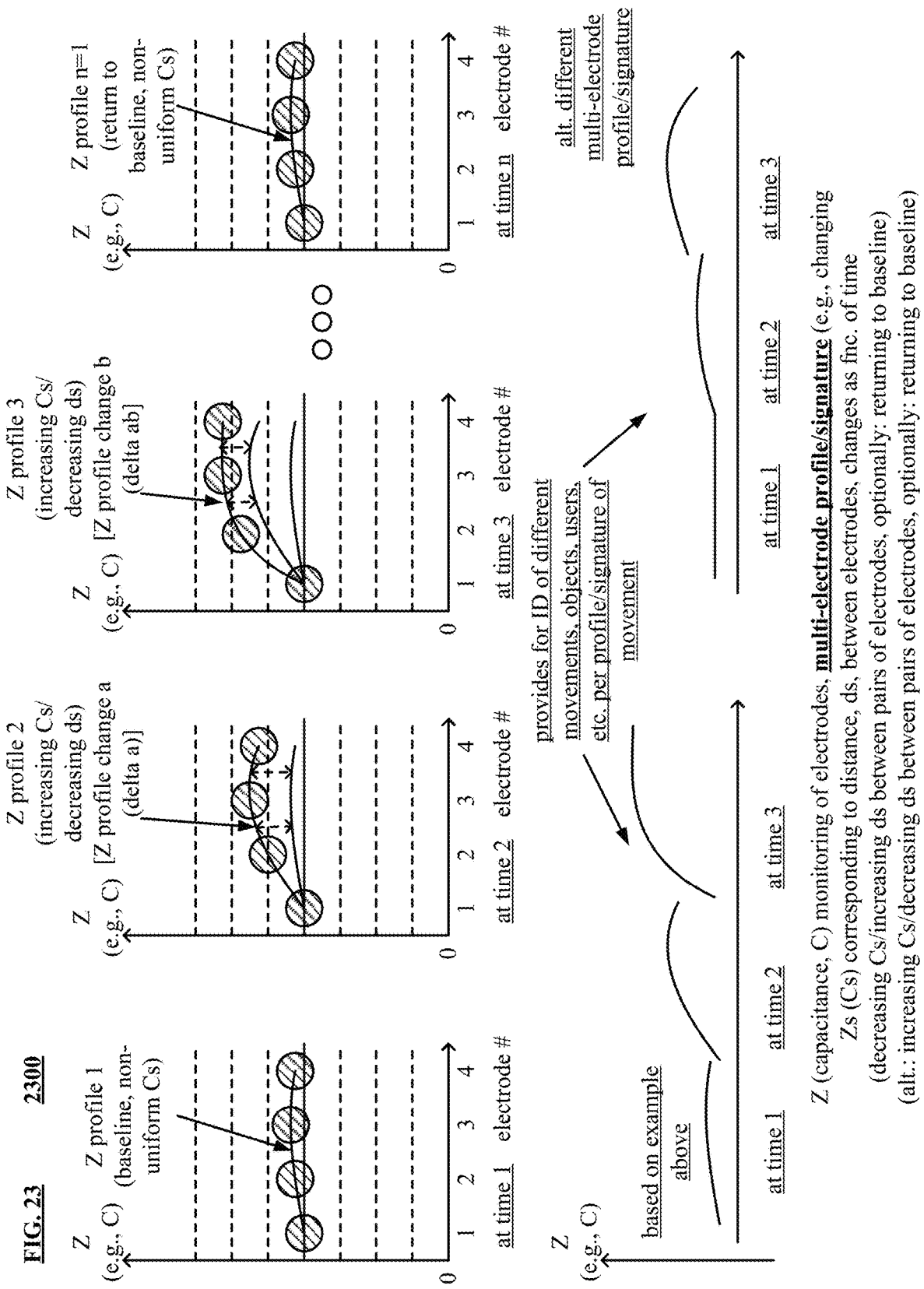
FIG. 23 is a schematic block diagram of another embodiment of a profile or signature (e.g., a multi-electrode profile or signature) associated with varying capacitance between electrodes of an electrode array in accordance with the present invention.

FIG. 23 is a schematic block diagram of another embodiment 2300 of a profile or signature (e.g., a multi-electrode profile or signature) associated with varying capacitance between electrodes of an electrode array in accordance with the present invention. This diagram shows the impedance Z (e.g., capacitive reactance, Xc) profile for a number of electrodes, shown as electrodes 1, 2, 3, 4. Moving from left to right in the diagram shows change of the impedance Z (e.g., capacitive reactance, Xc) profile as a function of time. On the left-hand side of the diagram, an impedance Z (e.g., capacitive reactance, Xc) profile 1 is shown, which may be viewed as a baseline impedance Z (e.g., capacitive reactance, Xc) profile having non-uniform impedance Z (e.g., capacitive reactance, Xc) values. Moving to the right in the diagram, an impedance Z (e.g., capacitive reactance, Xc) profile 2 is shown corresponding to increasing impedance Z (e.g., capacitive reactance, Xc) values for at least some of the electrodes corresponding to decreasing distance between those electrodes and one or more other electrodes. The impedance Z (e.g., capacitive reactance, Xc) profile change from 1 to 2 may be viewed as an impedance Z (e.g., capacitive reactance, Xc) profile change a, or delta a (or Δa).

Continuing to move right in the diagram, an impedance Z (e.g., capacitive reactance, Xc) profile 3 is shown corresponding to further increasing impedance Z (e.g., capacitive reactance, Xc) values for at least some of the electrodes corresponding to decreasing distance between those electrodes and one or more other electrodes. The impedance Z (e.g., capacitive reactance, Xc) profile change from 2 to 3 may be viewed as an impedance Z (e.g., capacitive reactance, Xc) profile change b, or delta b (or Δb). On the right-hand side of the diagram, an impedance Z (e.g., capacitive reactance, Xc) profile n, which is the same as the impedance Z (e.g., capacitive reactance, Xc) profile 1 (e.g., returned to baseline) is shown corresponding to decreasing impedance Z (e.g., capacitive reactance, Xc) values for at least some of the electrodes corresponding to increasing distance between those electrodes and one or more other electrodes as the distance between the respective electrodes of the electrode array returned to the distances they originally had that provided for the impedance Z (e.g., capacitive reactance, Xc) profile 1.

Capacitive imaging is performed over time such the difference respective impedance Z (e.g., capacitive reactance, Xc) profiles are generated. The capacitive image at any given instant in time provides a snapshot as to the distance between the respective electrodes of the electrode array. Monitoring and tracking change of the impedance Z (e.g., capacitive reactance, Xc) profiles over time, in accordance with dynamic capacitive imaging as a function of time, provides indication as to change of the distance, if any, of the distance between the respective electrodes of the electrode array.

The bottom left of the diagram shows outlines of the different respective impedance Z (e.g., capacitive reactance, Xc) profiles 1, 2, 3 at each of the respective times 1, 2, 3. The bottom left of the diagram corresponds to changes to the impedance Z (e.g., capacitive reactance, Xc) profile shown above. The bottom right of the diagram shows outlines of a different impedance Z (e.g., capacitive reactance, Xc) profile at each of respective times 1, 2, 3. Generally, different respective groups or sets of electrodes may have different respective impedance Z (e.g., capacitive reactance, Xc) profiles, and monitoring and tracking those impedance Z (e.g., capacitive reactance, Xc) profiles and any changes to them may be used for a variety of reasons including those described herein (e.g., unique identification of particular movements or gestures, particular users, the manner in which a particular movement or gesture is performed, etc.).

Monitoring and tracking of the change of an impedance Z (e.g., capacitive reactance, Xc) profile associated with electrodes of electrode array can provide for identification of different movements or gestures, positions, objects, users, etc. Similar to how a profile or signature corresponding to any change of impedance Z (e.g., capacitive reactance, Xc) corresponding to distance between two electrodes may be monitored and tracked as described elsewhere herein, this diagram shows how a profile or signature for multiple electrodes of an electrode array may be monitored and tracked. Note that different respective groups or sets of electrodes may be considered as corresponding to different respective impedance Z (e.g., capacitive reactance, Xc) profiles and may be monitored independently. For example, a first group or set electrodes may be associated with a first impedance Z (e.g., capacitive reactance, Xc) profile, and a second group or set of electrodes may be associated with a second impedance Z (e.g., capacitive reactance, Xc) profile.

Monitoring the impedance Z (e.g., capacitive reactance, Xc) profiles of the respective groups or sets of electrodes may be performed. In addition, consideration of changes of those respective Z (capacitance) profiles may also be considered together to draw various conclusions and to interpret certain movements of an article associated with the electrodes.

Considering an implementation of a glove that includes electrodes that are in communication with DSCs and one or more processing modules and considering electrodes of the electrode array being associated with two different fingers of the glove, such a change in the impedance Z (e.g., capacitive reactance, Xc) profile or signature may be used for various purposes. For example, differences in the profile or signature of the change of impedance Z (e.g., capacitive reactance, Xc) may be used for a variety of reasons including those described herein (e.g., unique identification of particular movements or gestures, particular users, the manner in which a particular movement or gesture is performed, etc.). Considering monitoring of the impedance Z (e.g., capacitive reactance, Xc) profiles of different respective groups or sets of electrodes within the glove may be performed to determine the overall movement of the hand of a user of the glove. For example, a first group or set electrodes may be associated with a first impedance Z (e.g., capacitive reactance, Xc) profile that is employed to perform capacitive imaging of the thumb of the glove including any movement thereof while a second group or set electrodes may be associated with a second impedance Z (e.g., capacitive reactance, Xc) profile that is employed to perform capacitive imaging of the little/pinky finger of the glove including any movement thereof. The one or more processing modules is configured to interpret the first impedance Z (e.g., capacitive reactance, Xc) profile and the second impedance Z (e.g., capacitive reactance, Xc) profile, including any changes to them, to determine not only information regarding the thumb and the little/pinky finger of the glove, but also their interaction with one another.

Figure 24:
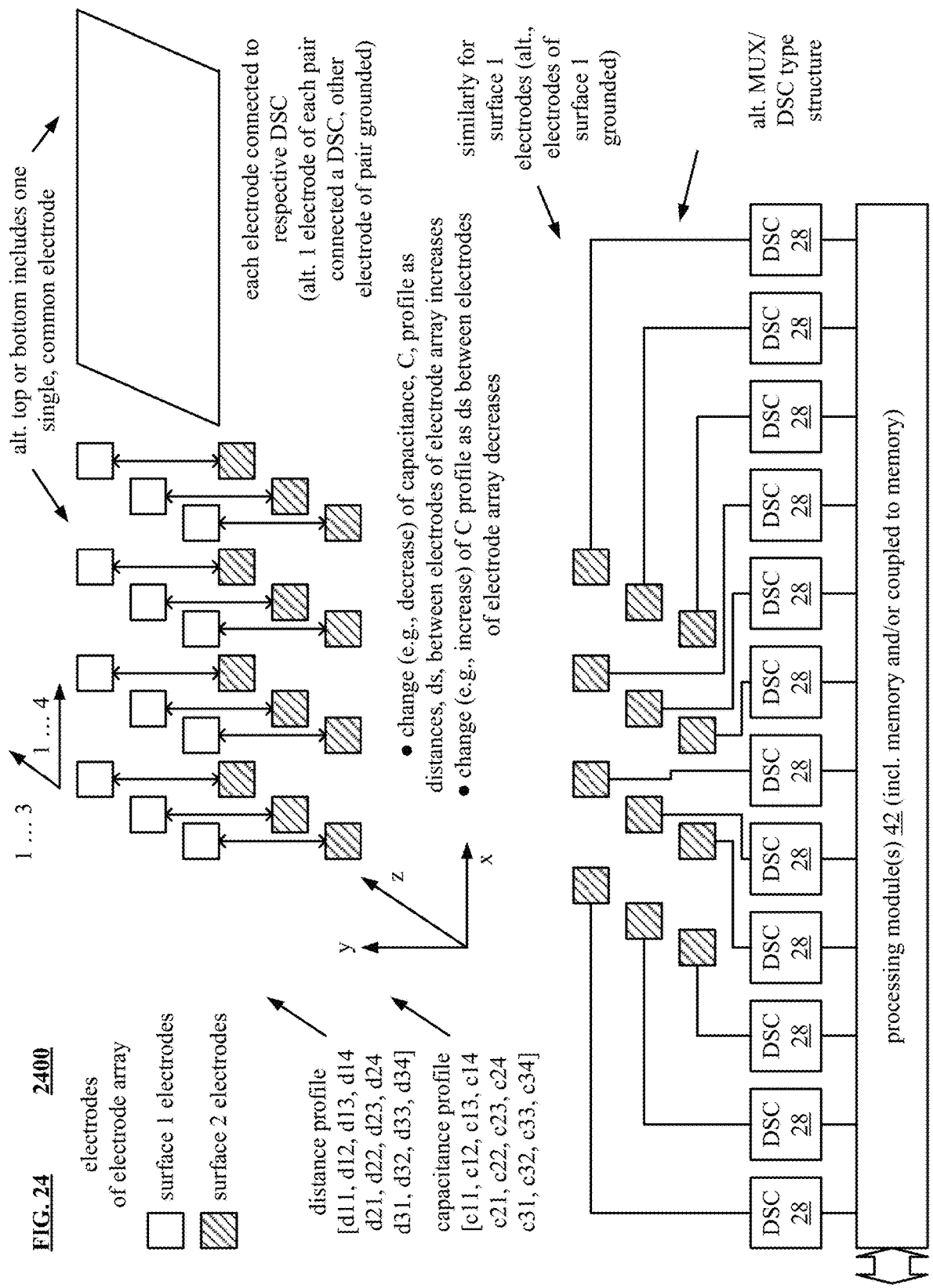
FIG. 24 is a schematic block diagram of another embodiment of varying capacitance between electrodes of an array based on change of distance between the respective electrodes of the array in accordance with the present invention.

FIG. 24 is a schematic block diagram of another embodiment 2400 of varying capacitance between electrodes of an array based on change of distance between the respective electrodes of the array in accordance with the present invention. This diagram shows multiple respective electrodes of an electrode array as being implemented on two respective surfaces (e.g., surface 1 electrodes and surface 2 electrodes). In some alternative embodiments, note that the electrodes 1410 of an electrode array implemented at the top are instead implemented using a common/single electrode 1410 of the electrode array. Such a common/single electrode 1410 of the electrode array may be in communication with a DSC 28 or alternatively is connected to a known voltage potential. In some examples, this known voltage potential is ground. Note that the ground may be a circuit/common and/or earth ground.

This diagram shows each of the surface 1 electrodes and surface 2 electrodes is in communication with a respective DSC 28. The DSCs 28 are implemented to communicate with and interact with one or more processing modules 42, which may be implemented to include memory and/or be coupled to memory. This diagram includes one or more processing modules 42, which may include memory and/or be coupled to memory, that is in communication with and interacts with the DSCs 28 that are respectively coupled to or connected to the surface 1 electrodes and surface 2 electrodes. In other embodiments, the surface 1 electrodes or the surface 2 electrodes may be connected to a known voltage potential (e.g., circuit/common and/or earth ground). In even other embodiments, the surface 1 electrodes or the surface 2 electrodes may be connected via one or more multiplexers such that a respective multiplexer is connected to more than one electrode and is operative to service their respective electrodes to which it is connected in a time-multiplexed manner (e.g., one at a time, sequentially, etc.).

A DSC 28 is configured to provide a signal to the electrode 1410 to which it is connected or coupled and simultaneously sense that signal including any change thereof. For example, the DSC 28 is configured to sense a signal that is capacitively coupled between the electrodes including any change of the signal (e.g., such as may be effectuated based on a change of the distance between the electrodes). Cooperatively, the different respective DSCs 28 are configured to provide signals to the respective electrodes to which they are connected or coupled and taught simultaneously sense those signals including any change thereof which may include signals from other electrodes being coupled into that particular electrode.

For example, considering an implementation of a glove that includes electrodes that are in communication with DSCs and one or more processing modules, the surface 1 electrodes may be associated with the back of the hand including extending down the fingers from the back of the hand and the surface 2 electrodes may be associated with the palm of the hand of the glove including extending down the fingers from the palm of the hand of the glove, or vice versa. Alternatively, such surface 1 electrodes may be associated with the one side of the digits of the hand of the glove (e.g., the top of the digits/the side corresponding to a person's fingernails) any surface 2 electrodes may be associated with another side of the digits of the hand of the glove (e.g., the bottom of the digits). In some examples, note that the surface 1 and 2 electrodes are located substantially or approximately opposite one another with respect to the digits of the hand of the glove. In other examples, note that the surface 1 and 2 electrodes need not be located directly substantially or approximately opposite one another. In addition, and even other examples, more than two electrodes are implemented around one or more of the digits of the hand of the glove.

With respect to the surface 1 and 2 electrodes, a two-dimensional distance profile effectuates a corresponding capacitance profile. For example, consider 24 respective electrodes with 12 electrodes in each of the surface 1 and 2 electrodes, and consider them implemented in a 3×4 array in each of the respective surfaces. The distance profile may be represented as follows:
[d11, d12, d13, d14
d21, d22, d23, d24
d31, d32, d33, d34]

Also, this distance profile effectuates a corresponding capacitance profile that may be represented as follows:
[c11, c12, c13, c14
c21, c22, c23, c24
c31, c32, c33, c34]

Similarly, as described above with respect to other examples, as the distance between the electrodes of the surface 1 and 2 electrodes changes (e.g., decreasing or increasing uniformly or non-uniformly), then an updated distance profile effectuates a corresponding updated capacitance profile:
[d11, d12, d13, d14 [d11', d12', d13', d14'
d21, d22, d23, d24→d21', d22', d23', d24'
d31, d32, d33, d34] d31', d32', d33', d34']
and
[c11, c12, c13, c14 [c11', c12', c13', c14'
c21, c22, c33, c24→c21', c22', c23', c24'
c31, c32, c33, c34] c31', c32', c33', c34']

Monitoring and tracking of any changes of any impedance Z (e.g., capacitive reactance, Xc) between the respective electrodes of the surface 1 and 2 electrodes may be used to determine any change of the distance between the respective electrodes of the surface 1 and 2 electrodes. Similar as described with respect to other examples, as the distances between certain of the electrodes of the surface 1 and 2 electrodes increases, the corresponding capacitance between those respective electrodes decreases, and vice versa.

Figure 25:
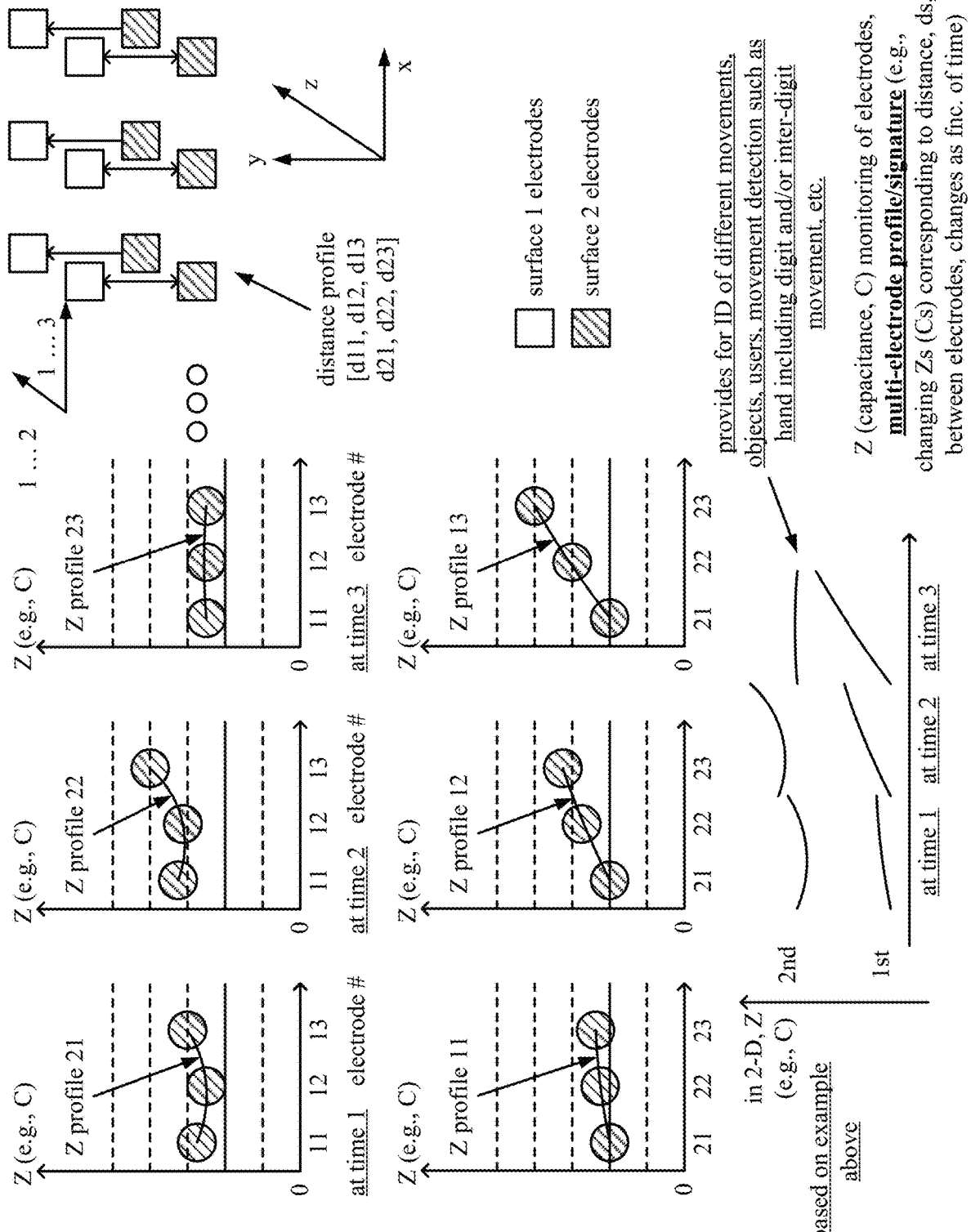
FIG. 25 is a schematic block diagram of another embodiment of a profile or signature (e.g., a multi-electrode profile or signature) associated with varying capacitance between electrodes of an electrode array in accordance with the present invention.

FIG. 25 is a schematic block diagram of another embodiment 2500 of a profile or signature (e.g., a multi-electrode profile or signature) associated with varying capacitance between electrodes of an electrode array in accordance with the present invention.

This diagram shows the impedance Z (e.g., capacitive reactance, Xc) profile for a number of electrodes such as may be associated with two respective surfaces. With respect to the surface 1 and 2 electrodes, a two-dimensional distance profile effectuates a corresponding capacitance profile. For example, consider 12 respective electrodes with 6 electrodes in each of the surface 1 and 2 electrodes, and consider them implemented in a 2×3 array in each of the respective surfaces. The distance profile may be represented as follows:

[$d11$, $d12$, $d13$
$d21$, $d22$, $d23$]

Also, this distance profile effectuates a corresponding capacitance profile that may be represented as follows:

[$c11$, $c12$, $c13$
$c21$, $c22$, $c23$]

Similarly, as described above with respect to other examples, as the distance between the electrodes of the surface 1 and 2 electrodes changes (e.g., decreasing or increasing uniformly or non-uniformly), then an updated distance profile effectuates a corresponding updated capacitance profile:

[$d11$, $d12$, $d13$→[$d11'$, $d12'$, $d13'$
$d21$, $d22$, $d23$] $d21'$, $d22'$, $d23'$]
and
[$c11$, $c12$, $c13$→[$c11'$, $c12'$, $c13'$
$c21$, $c22$, $c23$] $c21'$, $c22'$, $c23'$]

Moving from left to right in the diagram shows change of the impedance Z (e.g., capacitive reactance, Xc) profiles of respective electrodes as a function of time. On the left-hand side of the diagram, impedance Z (e.g., capacitive reactance, Xc) profiles 21 and 11 is shown. Moving to the right in the diagram, impedance Z (e.g., capacitive reactance, Xc) profiles 22 and 12 is shown corresponding to increasing impedance Z (e.g., capacitive reactance, Xc) values for at least some of the electrodes corresponding to changed distance between those electrodes and one or more other electrodes. Moving farther to the right in the diagram, impedance Z (e.g., capacitive reactance, Xc) profiles 23 and 13 is shown corresponding to increasing impedance Z (e.g., capacitive reactance, Xc) values for at least some of the electrodes corresponding to changed distance between those electrodes and one or more other electrodes.

Capacitive imaging is performed over time such the difference respective impedance Z (e.g., capacitive reactance, Xc) profiles are generated. The capacitive image at any given instant in time provides a snapshot as to the distance between the respective electrodes of the electrode array. Monitoring and tracking change of the impedance Z (e.g., capacitive reactance, Xc) profiles over time, in accordance with dynamic capacitive imaging as a function of time, provides indication as to change of the distance, if any, of the distance between the respective electrodes of the electrode array.

The bottom of the diagram shows outlines of the different respective impedance Z (e.g., capacitive reactance, Xc) profiles 21, 22, 23 and 11, 12, 13 at each of the respective times 1, 2, 3. Generally, different respective groups or sets of electrodes may have different respective impedance Z (e.g., capacitive reactance, Xc) profiles, and monitoring and tracking those impedance Z (e.g., capacitive reactance, Xc) profiles and any changes to them may be used for a variety of reasons including those described herein (e.g., unique identification of particular movements or gestures, particular users, the manner in which a particular movement or gesture is performed, etc.).

Considering an implementation that includes one or more processing modules, which may include memory and/or be coupled to memory, that is in communication with and interacts with DSCs that are respectively coupled to or connected to the surface 1 electrodes and surface 2 electrodes, the one or more processing modules is configured to perform capacitive imaging with respect to the surface 1 and 2 electrodes including monitoring and tracking any change of the impedance Z (e.g., capacitive reactance, Xc) profiles over time in accordance with dynamic capacitive imaging as a function of time.

Figure 26:
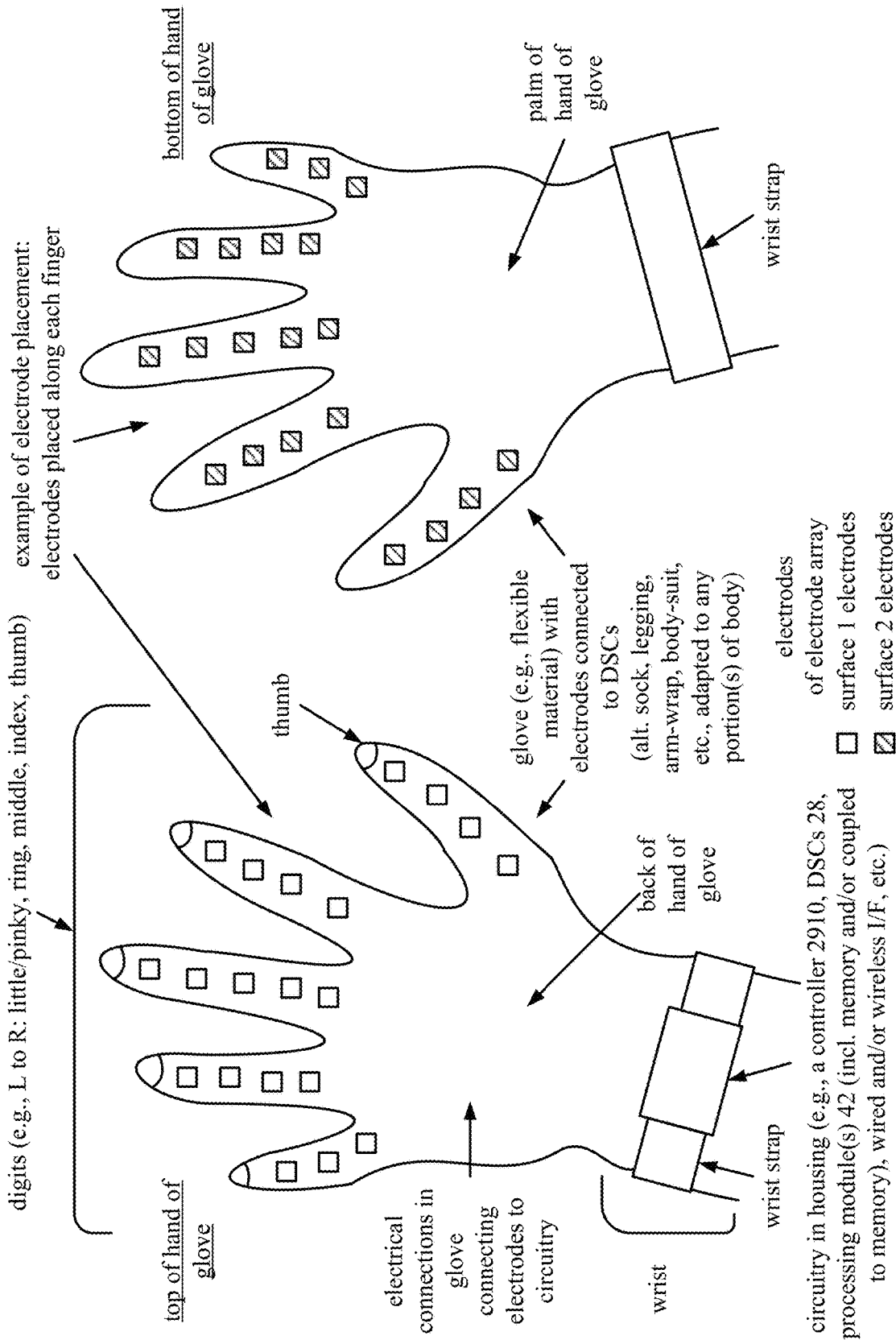
FIG. 26 is a schematic block diagram of an embodiment of a glove that includes electrodes therein to facilitate capacitive imaging in accordance with the present invention.

FIG. 26 is a schematic block diagram of an embodiment 2600 of a glove that includes electrodes therein to facilitate capacitive imaging in accordance with the present invention. This diagram shows an implementation of a glove that includes electrodes that are in communication with DSCs and one or more processing modules 42. Generally speaking, the electrodes may be of any desired shape, size, etc. as desired in various implementations. Subsequent diagrams describe some various possible implementations of electrodes as may be implemented within a glove including placement of the electrodes around digits of the glove, shapes and styles of electrodes that may be implemented within the glove, etc. Note that different respective gloves may be constructed with different respective sizes (e.g., extra-large XL, large L, medium M, small S) to accommodate users having different sized hands.

Within this diagram, the electrodes are implemented along the respective digits of the glove, respectively on the top and bottom of the digits. Considering the top of the hand of the glove on the left-hand side of the diagram, from left to right, the digits are identified as little/pinky, ring, middle, index, thumb. The electrodes associated with the top of the hand of the glove may be viewed as surface 1 electrodes, and the electrodes associated with the bottom of the hand of the glove may be viewed as surface 2 electrodes.

For example, consider surface 1 electrodes as being associated with the top of the digits of the hand of the glove and the surface 2 electrodes being associated with the bottom of the digits of the hand of the glove. The glove used implemented using a flexible material to facilitate movement of the hand of the user inside of it. The glove also includes electrical connections that provide connectivity between the electrodes of the glove and a circuitry, such as may be implemented in a housing attached to a wrist strap that is associated with the glove. In some examples, note that the DSCs 28, the one or more processing modules 42, etc. are implemented in a controller 2910.

For example, the circuitry is implemented to include one or more processing modules 42, which may include memory and/or be coupled to memory, that is in communication with and interacts with DSCs that are respectively coupled to or connected to the surface 1 electrodes and surface 2 electrodes. In some embodiments, the circuitry also includes the communication interface (e.g., a wired and/or wireless communication interface). For example, the one or more processing modules may interface via such a communication interface with one or more other devices, components, elements, etc. via one or more communication links, networks, communication pathways, channels, etc.

In some examples, the housing attached to the wrist strap that is associated with the glove includes a means to capacitive couple one or more signals directly into the user of the glove as well. For example, one or more DSCs 28 is configured to couple one or more signals to the body user of the glove (e.g., via the back of the housing, such as via an electrode tightly coupled to the skin of the user of the glove). In certain examples, the one or more other electrodes of the capacitive imaging glove, and the appropriately implemented one or more DSCs 28 coupled thereto, is configured to detect those one or more signals that are being capacitive coupled from the body (e.g., the hand) of the user of the glove. Such one or more signals directly coupled into the user of the glove may be viewed as being a common signal that may be detected by any of the other one or more DSCs 28 that are capacitive coupled to the one or more other electrodes of the capacitive imaging glove. In some examples, one or more additional materials or means may be used to facilitate improved capacitive coupling of those one or more signals directly into the user of the glove (e.g., a conductive gel, a conductive materials, etc. such as may be placed on the skin of the user of the glove at the contact point at which the one or more signals is coupled directly into the user of the glove).

In addition, note that this diagram shows an example of a glove that is implemented to include electrodes to facilitate capacitive imaging of the hand of the user of the glove, note that alternative implementations may be made using similar principles as also described above. Generally speaking, any other type of article that may be associated with the user may alternatively be constructed that include electrodes to facilitate capacitive imaging. Examples may include any one or more of a shirt, a sock, a bodysuit, an arm or leg wrap (e.g., an article implemented to wrap around at least a portion of an arm or leg), a wrapping around a chest of a user (e.g., such as to monitor breathing, respiration, body position, etc.), etc. and/or any other article that may be associated with the user. In addition, note that such capacitive imaging may be implemented with any type of object that may not be specifically associated with the user. For example, an article that includes electrodes to facilitate capacitive imaging may be appropriately implemented around at least a portion of any object to facilitate capacitive imaging of at least a portion of that object using the principles described herein. Generally speaking, such capacitive imaging functionality as described herein may be implemented to perform capacitive imaging of any object, portion of an object, a user, a portion of a user, etc.

Figure 27:
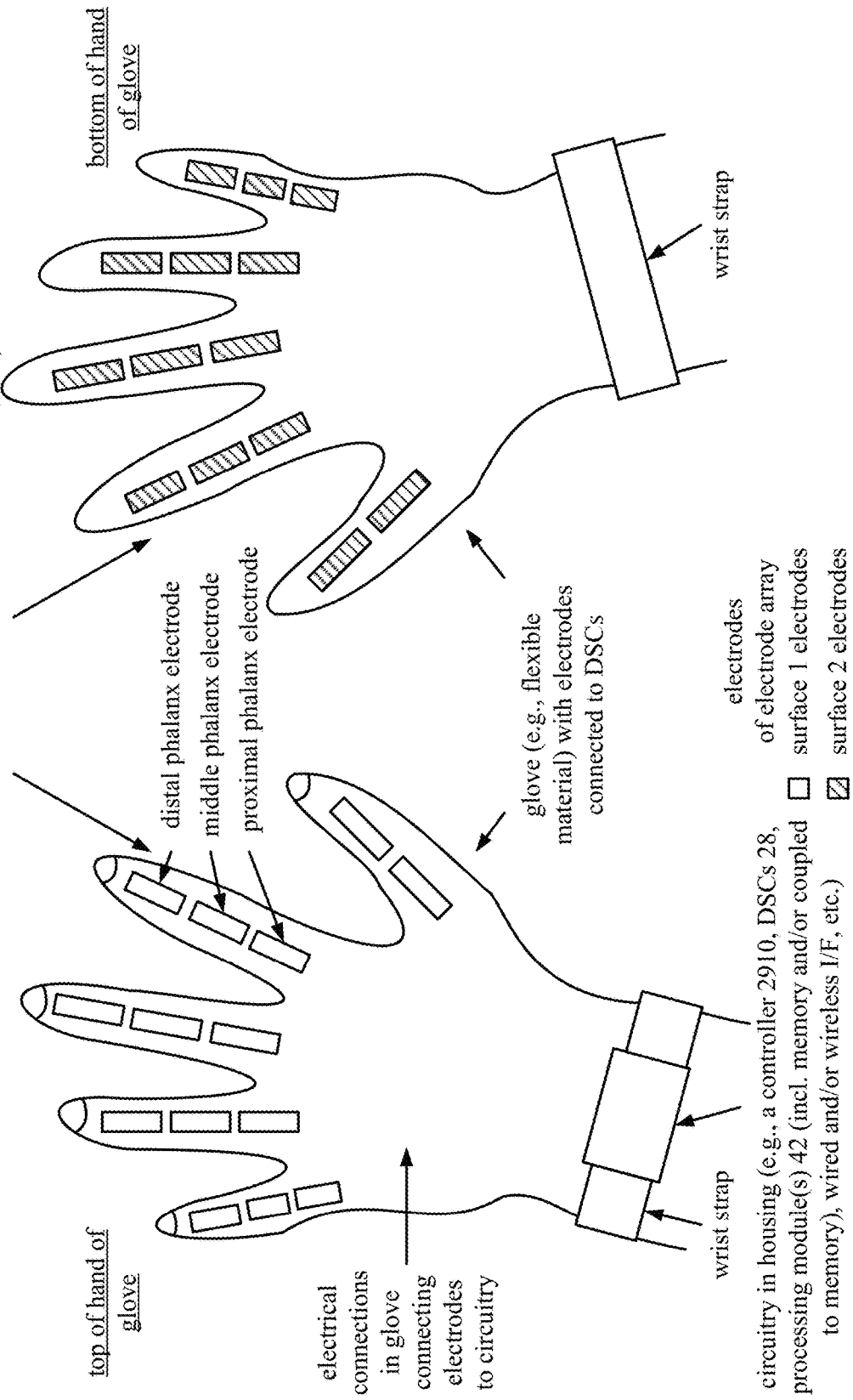
FIG. 27 is a schematic block diagram of another embodiment of a glove that includes electrodes therein to facilitate capacitive imaging in accordance with the present invention.

FIG. 27 is a schematic block diagram of another embodiment 2700 of a glove that includes electrodes therein to facilitate capacitive imaging in accordance with the present invention. This diagram shows an alternative implementation of electrodes with respect to the digits of a glove. Similar to the previous diagram, this diagram shows an implementation of a glove that includes electrodes that are in communication with DSCs and one or more processing modules 42.

Within this diagram, the electrodes are implemented along the respective digits of the glove, respectively on the top and bottom of the digits (e.g., little/pinky, ring, middle, index, thumb). The electrodes associated with the top of the hand of the glove may be viewed as surface 1 electrodes, and the electrodes associated with the bottom of the hand of the glove may be viewed as surface 2 electrodes.

In this diagram, the respective electrodes are implemented to correspond to the skeletal structure of the digits of a hand of a user of the glove. For example, considering four the digits of the hand to include three respective bones, the proximal, middle, and distal phalanx bones, and the thumb includes two respective bones, the proximal and distal phalanx bones (does not include a middle phalanx), the electrodes are designed and implemented to correspond to the respective bones of the digits. For example, with respect to each surface of the glove (e.g., corresponding to the top of the hand in the bottom of the hand) three respective electrodes are implemented for the three respective bones, the proximal, middle, and distal phalanx bones for four of the digits of the hand, and two respective electrodes are implemented for the two respective bones, the proximal distal phalanx bones, for the thumb.

Note that different respective gloves may be constructed with different respective sizes (e.g., extra-large XL, large L, medium M, small S) to accommodate users having different sized hands and the corresponding sizes of the electrodes associated with the respective bones of the digits may also be appropriately sized (e.g., extra-large XL, large L, medium M, small S).

Figure 28:
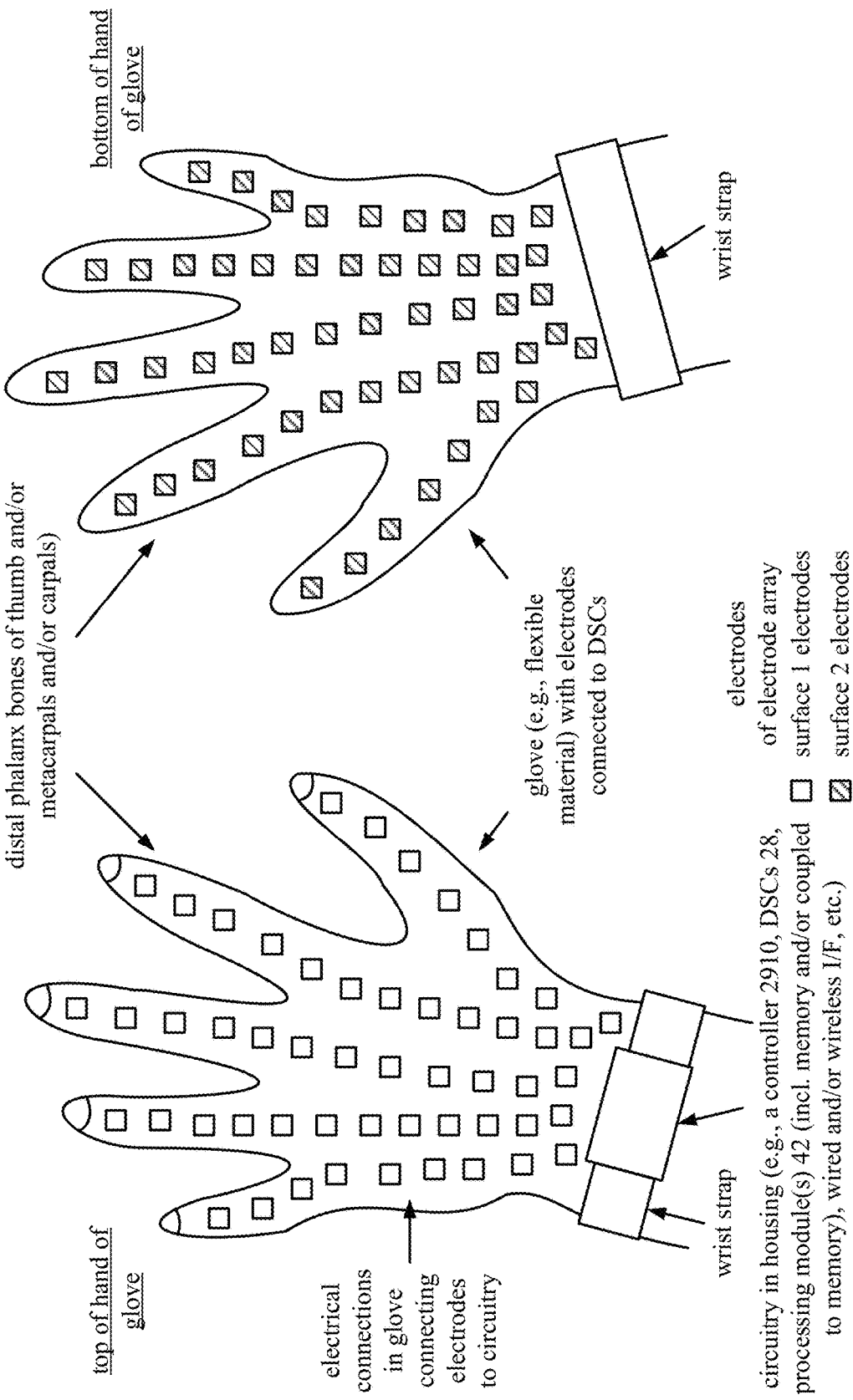
FIG. 28 is a schematic block diagram of another embodiment of a glove that includes electrodes therein to facilitate capacitive imaging in accordance with the present invention.

FIG. 28 is a schematic block diagram of another embodiment 2800 of a glove that includes electrodes therein to facilitate capacitive imaging in accordance with the present invention. This diagram shows an alternative implementation of electrodes with respect to the a glove. This diagram also shows an implementation of a glove that includes electrodes that are in communication with DSCs and one or more processing modules 42.

Within this diagram, the electrodes are implemented on the back of the hand of the glove and the palm of the hand of the glove and also along the digits of the glove. In some examples, the electrodes associated with the top of the hand of the glove may be viewed as surface 1 electrodes, and the electrodes associated with the bottom of the hand of the glove may be viewed as surface 2 electrodes.

Figure 29:
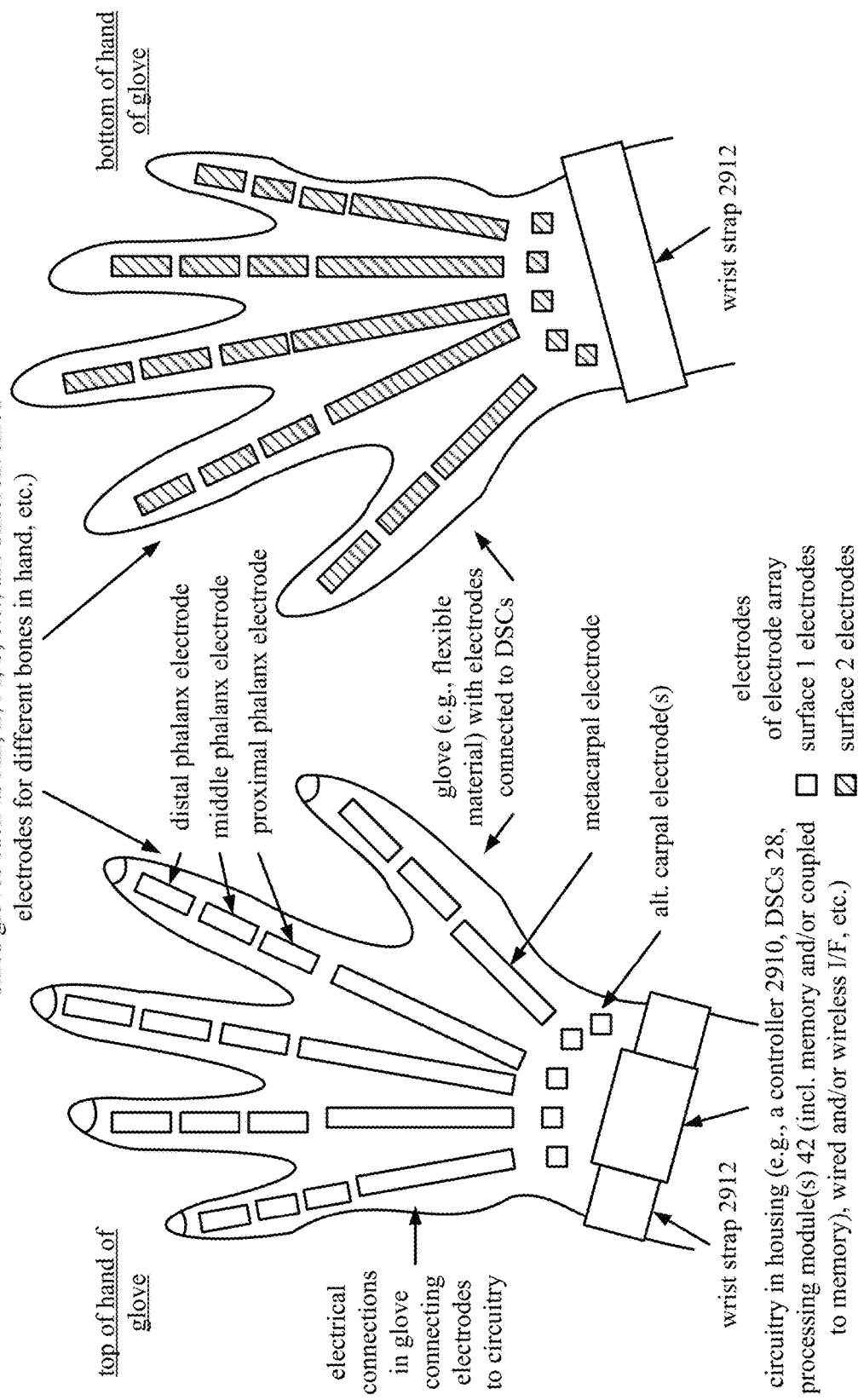
FIG. 29 is a schematic block diagram of another embodiment of a glove that includes electrodes therein to facilitate capacitive imaging in accordance with the present invention.

The electrodes are implemented generally along the skeletal structure of the bones of a hand of a user of the glove, though not necessarily sized to correspond to each respective bones of the hand. For example, electrodes may be implemented to be smaller than the actual bones of the hand such that more than one electrodes is implemented along a bone of a hand of a user of the glove. In an example, electrodes are implemented generally along the skeletal structure of the bones of a hand of a user of the glove along the metacarpals, proximal, middle, and distal phalanx bones for four of the digits of the hand, and electrodes are implemented for the metacarpal and two other respective bones, the proximal distal phalanx bones, for the thumb. In certain other examples, electrodes are also implemented to be associated with the carpals of a hand of a user of the glove near the wrist FIG. 29 is a schematic block diagram of another embodiment 2900 of a glove that includes electrodes therein to facilitate capacitive imaging in accordance with the present invention. This diagram shows an alternative implementation of electrodes with respect to the a glove. This diagram also shows an implementation of a glove that includes electrodes that are in communication with DSCs and one or more processing modules 42.

Within this diagram, the electrodes are implemented on the back of the hand of the glove and the palm of the hand of the glove and also along the digits of the glove. In some examples, the electrodes associated with the top of the hand of the glove may be viewed as surface 1 electrodes, and the electrodes associated with the bottom of the hand of the glove may be viewed as surface 2 electrodes.

The electrodes are implemented generally along the skeletal structure of the bones of a hand of a user of the glove, and are sized to correspond to each respective bones of the hand. Note that different respective gloves may be constructed with different respective sizes (e.g., extra-large XL, large L, medium M, small S) to accommodate users having different sized hands and the corresponding sizes of the electrodes associated with the respective bones of the digits may also be appropriately sized (e.g., extra-large XL, large L, medium M, small S).

The electrodes are implemented generally along the skeletal structure of the bones of a hand of a user of the glove along the metacarpals, proximal, middle, and distal phalanx bones for four of the digits of the hand, and electrodes are implemented for the metacarpal and two other respective bones, the proximal distal phalanx bones, for the thumb. In certain other examples, electrodes are also implemented to be associated with the carpals of a hand of a user of the glove near the wrist.

With respect to any of the various embodiments, examples, etc. described herein within which electrodes may be implemented within a glove, note that the electrodes may be of any desired shape, style, etc. Generally speaking, note that the electrodes may be implemented within a glove in accordance with any desired arrangement, pattern, etc. (e.g., with respect to the top and bottom of the hand, including on the back of the hand and the palm of the hand, etc.). In even other alternative examples, some electrodes are implemented on the sides of the respective digits, on the top and bottom of the respective digits, and/or the outer sides of the metacarpals, respectively, of the little/pinky digit and the thumb.

In an example of operation and implementation, a capacitive imaging glove (e.g., implemented in accordance with any of the various aspects, embodiments, and/or examples of the invention (and/or their equivalents) as described herein) includes electrodes, DSCs 28, one or more processing modules operably coupled to the DSCs 28 and the memory, which may include memory and/or be coupled to memory that stores operational instructions. The one or more processing modules 42, when enabled, is configured to execute the operational instructions to perform various operations. The electrodes are implemented throughout the capacitive imaging glove and include a first electrode and a second electrode. Note that while the capacitive imaging glove may include many electrodes as well in certain embodiments. In some examples, note that the DSCs 28, the one or more processing modules 42, etc. are implemented in a controller 2910.

A DSC 28, when enabled, is configured to receive a reference signal and to generate a signal based on the reference signal. In some examples, the DSC 28 receives the reference signal from the one or more processing modules 42. In other examples, the DSC includes circuitry to generate the reference signal. in certain specific examples, the DSC is configured to generate the reference signal based on information provided from the one or more processing modules 42.

The DSC 28 is configured to provide the signal to the first electrode via a single line and simultaneously to sense the signal via the single line. Note that sensing of the signal includes detection of an electrical characteristic of the first electrode. Also, note that the signal is configured to be coupled from the first electrode to the second electrode via a gap between the first electrode and the second electrode within the capacitive imaging glove. Also, the DSC 28 is configured to generate a digital signal representative of the electrical characteristic of the first electrode.

The one or more processing modules 42 is operably coupled to the DSCs. The one or more processing modules 42 is configured to execute the operational instructions to perform various operations. For example, the one or more processing modules 42 is configured to generate the reference signal and to provide it to the DSC 28. The one or more processing modules 42 is configured to process the digital signal representative of the electrical characteristic of the first electrode to determine the electrical characteristic of the first electrode and to process the electrical characteristic of the first electrode to determine a distance between the first electrode and the second electrode. The one or more processing modules 42 is also configured to generate capacitive image data representative of a shape of the capacitive imaging glove based on the distance between the first electrode and the second electrode.

In some examples, the one or more processing modules 42 is also configured to generate the capacitive image data associated with the shape of the capacitive imaging glove based on the distance between the first electrode and the second electrode and also based on a plurality of other distances between other respective electrodes of the plurality of electrodes. For example, the one or more processing modules 42 is configured to employ respective distances between multiple respective electrodes to generate the capacitive image data representative of a shape of the capacitive imaging glove. For example, when a user is interacting with the capacitive imaging glove, the capacitive image data is representative of a shape of the capacitive imaging glove that is based on the hand of a user interacting with the capacitive imaging glove. In some examples, the one or more processing modules 42 is configured to process the capacitive image data generate image and/or video data that provides 3-D image rendering of the shape of the capacitive imaging glove.

Figure 31:
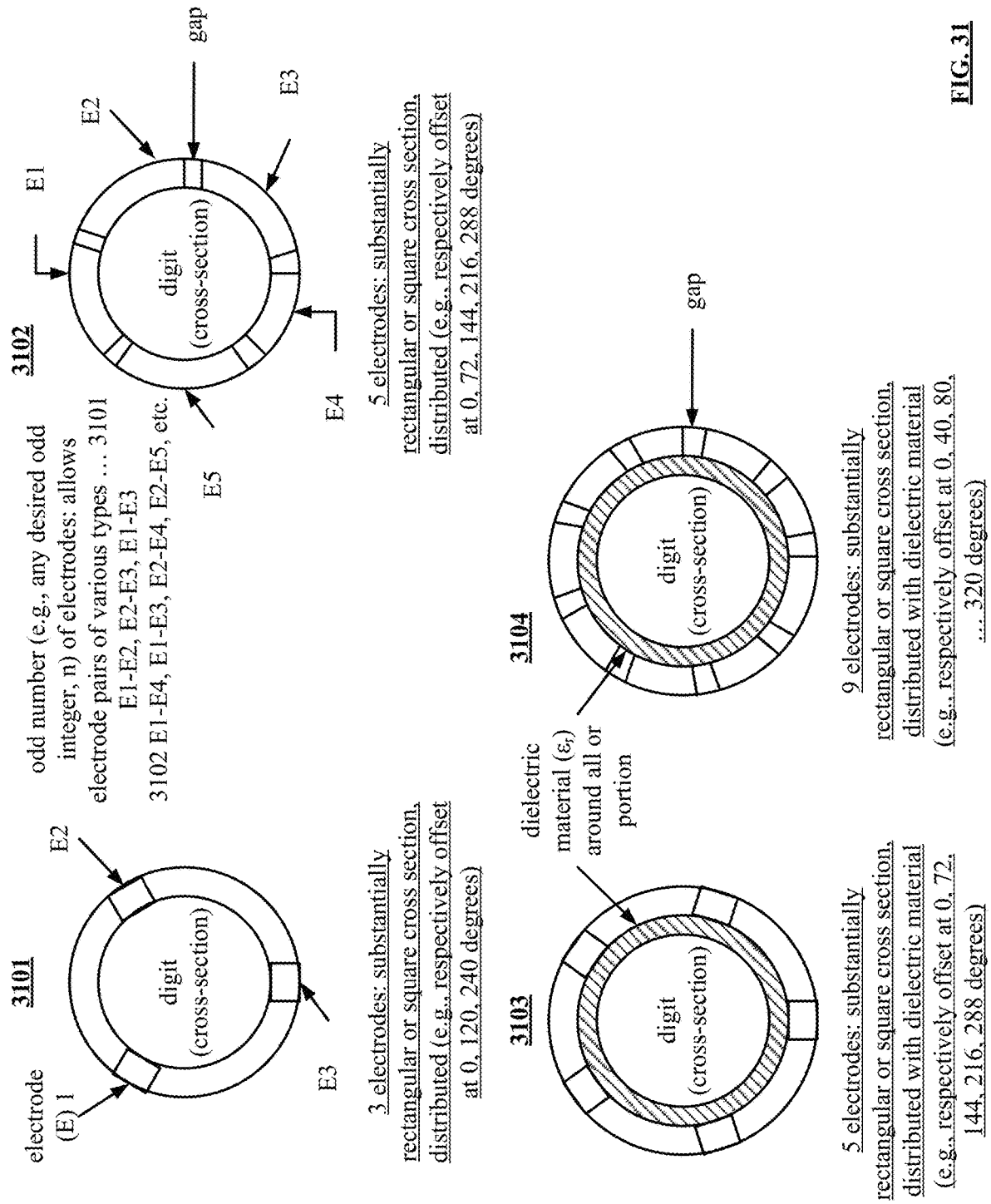
FIG. 31 is a schematic block diagram of other various embodiments of electrodes operative to be implemented in a glove to facilitate capacitive imaging in accordance with the present invention.
Figure 32:
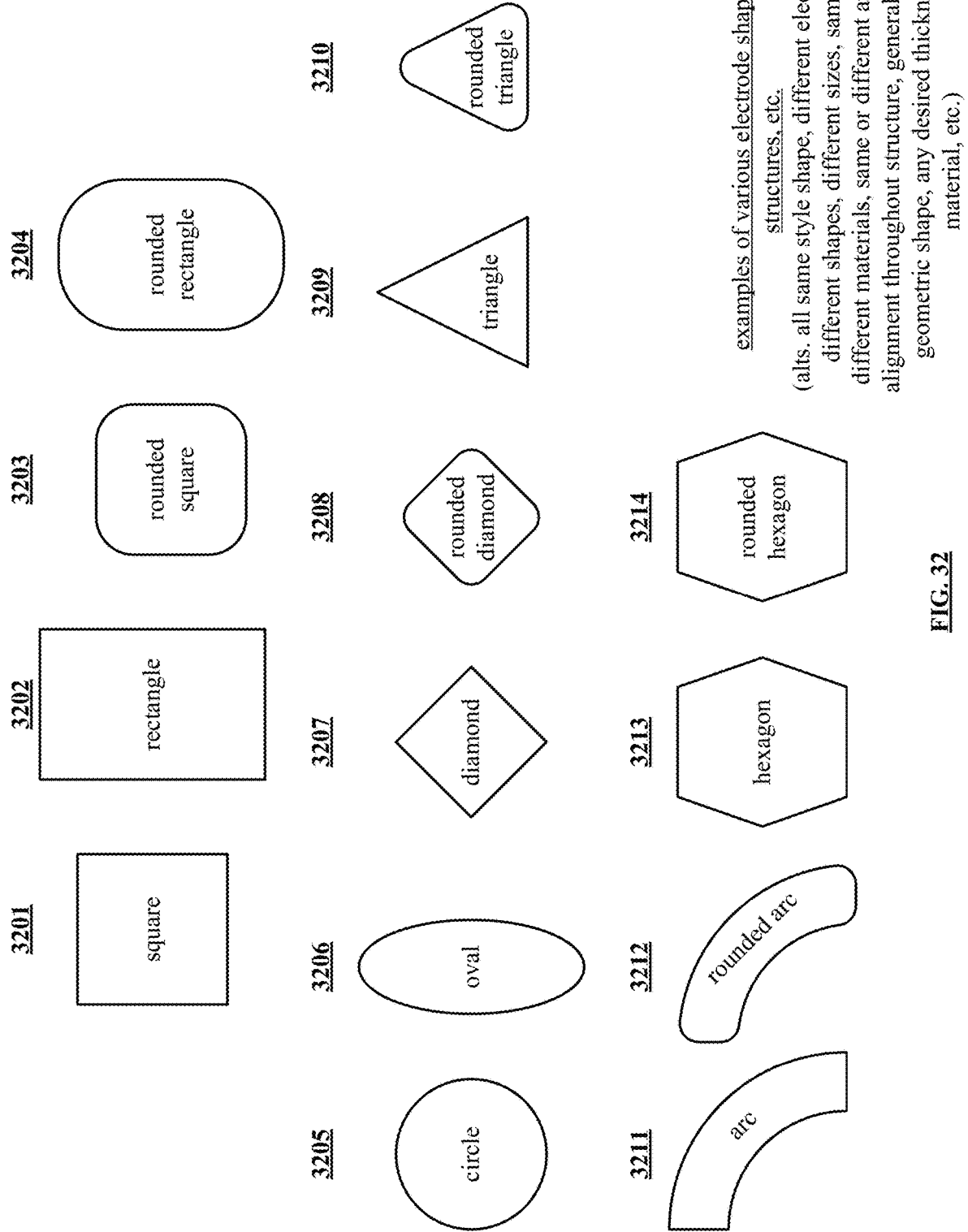
FIG. 32 is a schematic block diagram of various embodiments of shapes of electrodes operative to be implemented in a glove to facilitate capacitive imaging in accordance with the present invention.

Note that any of the electrodes of the capacitive imaging glove may include any of a number of different shapes include any one of a square, a rectangle, a circle, an oval, a diamond, a triangle, an arc, a hexagon, or any other type of shape, etc. including those described with respect to FIG. 32. Also, note that any of the electrodes of the capacitive imaging glove may be implemented to curve around a portion of a digit of the capacitive imaging glove in including those described with respect to FIG. 30 and FIG. 31.

Also, in some examples, the one or more processing modules 42 is configured to process the digital signal representative of the electrical characteristic of the first electrode to determine a capacitance associated with the distance between the first electrode and the second electrode. Note that the electrical characteristic of the first electrode may correspond to any one or more of an impedance, a capacitive reactance, or the capacitance of the first electrode. Also, the one or more processing modules 42 is configured to calculate the distance between the first electrode and the second electrode based on the capacitance associated with the distance between the first electrode and the second electrode.

In addition, in some examples, another DSC 28, when enabled, is configured to receive another reference signal and to generate another signal based on the other reference signal. This other DSC 28 is also configured to provide the other signal to the second electrode via another single line and simultaneously to sense the other signal via the other single line. Note that sensing of the other signal includes detection of another electrical characteristic of the second electrode. Also, note that the other signal is configured to be coupled from the second electrode to the first electrode via the gap between the first electrode and the second electrode within the capacitive imaging glove. This other DSC 28 is also configured to generate another digital signal representative of the other electrical characteristic of the second electrode.

Also, the one or more processing modules 42, is further configured to generate the other reference signal, process the other digital signal representative of the other electrical characteristic of the second electrode to determine the other electrical characteristic of the second electrode, process the other electrical characteristic of the second electrode to determine the distance between the first electrode and the second electrode. Also, the one or more processing modules 42, is further configured to generate other capacitive image data representative of the shape of the capacitive imaging glove based on the distance between the first electrode and the second electrode that is determined based on the other electrical characteristic of the second electrode.

In some specific examples, the signal includes a first one or more characteristics including a first frequency, and the other signal includes a second one or more characteristics including a second frequency that is different than the first frequency.

In yet other examples, another DSC 28, when enabled, is configured to receive another reference signal and to generate another signal based on the other reference signal. This other DSC 28 is configured to provide the other signal to a third electrode via another single line and simultaneously to sense the other signal via the other single line. Note that the sensing of the other signal includes detection of another electrical characteristic of the third electrode. The other signal is configured to be coupled from the third electrode to a fourth electrode via another gap between the third electrode and the fourth electrode within the capacitive imaging glove. This other DSC 28 is also configured to generate another digital signal representative of the other electrical characteristic of the third electrode.

Also, the one or more processing modules 42 is further configured to generate the other reference signal, process the other digital signal representative of the other electrical characteristic of the third electrode to determine the other electrical characteristic of the third electrode, and process the other electrical characteristic of the third electrode to determine another distance between the third electrode and the fourth electrode. Also, the one or more processing modules 42 is further configured to generate other capacitive image data representative of the shape of the capacitive imaging glove based on the other distance between the third electrode and the fourth electrode. Here as well with respect to this implementation, in some specific examples, the signal includes a first one or more characteristics including a first frequency, and the other signal includes a second one or more characteristics including a second frequency that is different than the first frequency.

Note that the various DSCs 28 may be implemented in a variety of ways including any of the various aspects, embodiments, and/or examples of a DSC 28 (and/or their equivalents) including those described herein. For example, FIG. 15 and FIG. 16 show and describe some possible examples.

In some examples, the DSC 28 includes a power source circuit operably coupled to the first electrode via the single line. When enabled, the power source circuit is configured to provide the signal that includes an alternating current (AC) component via the single line coupling to the first electrode. The DSC 28 also includes a power source change detection circuit operably coupled to the power source circuit. When enabled, the power source change detection circuit is configured to detect an effect on the signal that is based on the electrical characteristic of the first electrode and to generate the digital signal representative of the electrical characteristic of the first electrode that corresponds to the distance between the first electrode and the second electrode.

In some specific examples, the power source circuit is implemented to include a power source to source at least one of a voltage or a current to the first electrode via the single line. Also, the power source change detection circuit is implemented to include a power source reference circuit configured to provide at least one of a voltage reference or a current reference based on the reference signal, and a comparator configured to compare the at least one of the voltage and the current provided to the first electrode via the single line to the at least one of the voltage reference and the current reference to produce the signal.

Also, in alternative examples of a capacitive imaging glove, the capacitive imaging glove, a DSC 28 is configured to provide a signal that is based on a reference signal to the first electrode via a single line and simultaneously to sense the signal via the single line. Note that sensing of the signal includes detection of an impedance of the first electrode. Also, the signal is configured to be coupled from the first electrode to the second electrode via a gap between the first electrode and the second electrode within the capacitive imaging glove. The DSC 28 is also configured to generate a digital signal representative of the impedance of the first electrode.

The one or more processing modules 42 when enabled, is configured to execute the operational instructions to process the digital signal representative of the impedance of the first electrode to determine a capacitance associated with a distance between the first electrode and the second electrode and to process the capacitance associated with the distance between the first electrode and the second electrode to determine the distance between the first electrode and the second electrode. Also, the one or more processing modules 42 is configured to generate capacitive image data representative of a shape of the capacitive imaging glove based on the distance between the first electrode and the second electrode.

Also, in certain examples, the one or more processing modules 42 is configured to generate the capacitive image data representative of the shape of the capacitive imaging glove based on the distance between the first electrode and the second electrode and also based on a plurality of other distances between other respective electrodes of the plurality of electrodes.

Figure 30:
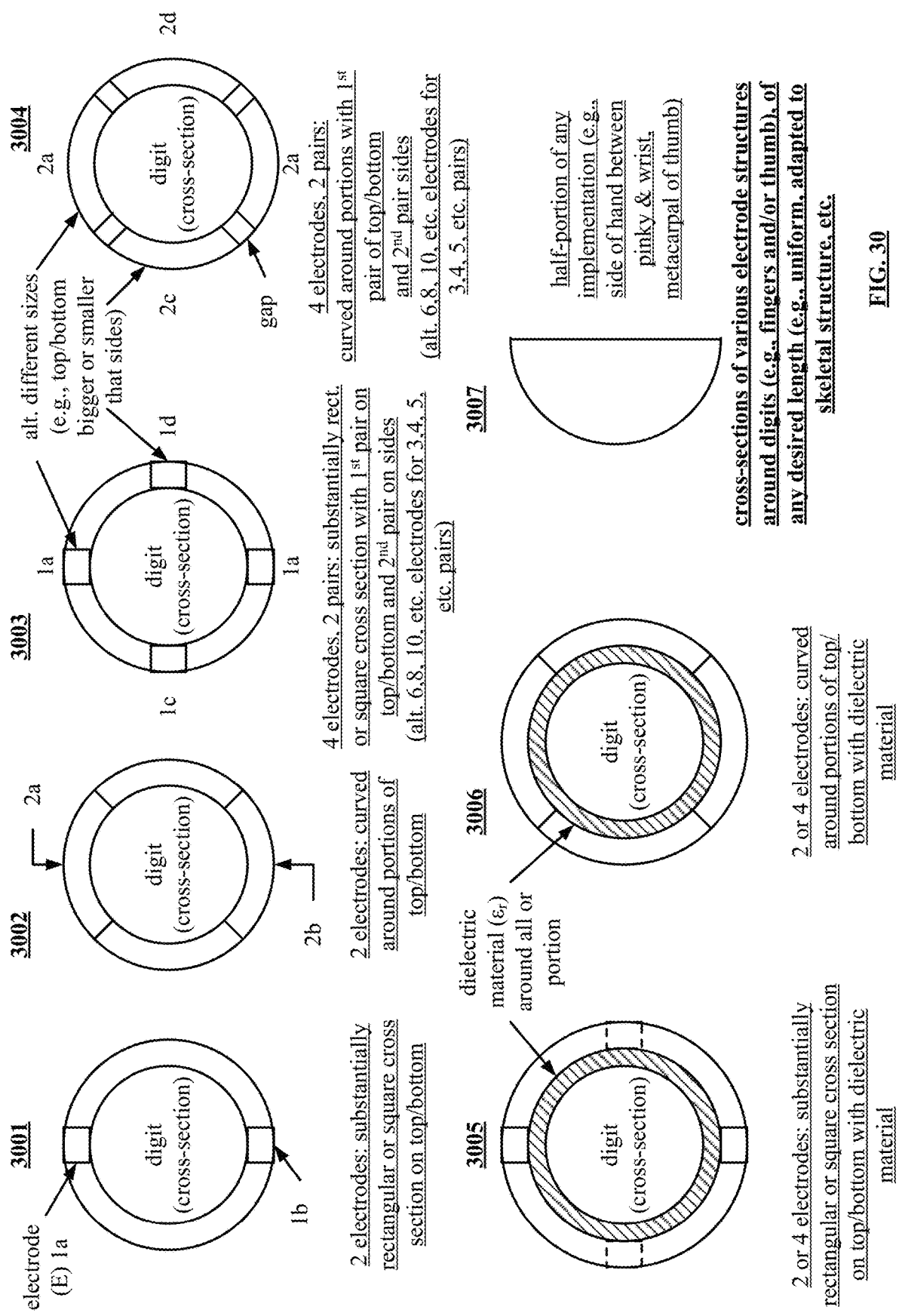
FIG. 30 is a schematic block diagram of various embodiments of electrodes operative to be implemented in a glove to facilitate capacitive imaging in accordance with the present invention.

FIG. 30 is a schematic block diagram of various embodiments 3001, 3002, 3003, 3004, 3005, 3006, 3007 of electrodes operative to be implemented in a glove to facilitate capacitive imaging in accordance with the present invention. This diagram shows several ways in which electrodes may be implemented around the digits of the glove is shown from the perspective of a cross-section of a digit (e.g., which can be any of five respective digits of the hand to include little/pinky, ring, middle, index, and thumb).

The electrodes are connected to or coupled to one or more DSCs. One or more processing modules in communication with the one or more DSCs is operative to interpret information provided from the one or more DSCs to determine impedance Z (e.g., capacitive reactance, Xc) between the any desired electrodes (e.g., between any 2 electrodes) and the corresponding distance between those electrodes.

Reference 3001 shows two electrodes implemented across from one another with respect to the cross-section of the digit of the glove. Electrodes (e.g., shown as electrodes 1a and 1b) may be viewed as forming a pair such that the capacitance between the electrodes may be detected by one or more DSCs connected to or coupled to the electrodes. One or more processing modules in communication with the one or more DSCs is operative to interpret information provided from the one or more DSCs to determine impedance Z (e.g., capacitive reactance, Xc) between the two electrodes and the corresponding distance between the two electrodes. In this diagram, the electrodes are relatively small with respect to the digit and have a substantially rectangular or square cross-section/shape.

Reference 3002 also shows two electrodes implemented across from one another with respect to the cross-section of the digit of the glove. Electrodes (e.g., shown as electrodes 2a and 2b) may be viewed as forming a pair such that the capacitance between the electrodes may be detected by one or more DSCs connected to or coupled to the electrodes. One or more processing modules in communication with the one or more DSCs is operative to interpret information provided from the one or more DSCs to determine impedance Z (e.g., capacitive reactance, Xc) between the two electrodes and the corresponding distance between the two electrodes. In this diagram, the electrodes are curved shaped and implemented to wrap around a portion of the digits. From certain perspectives, the shape of these electrodes corresponds to the curvature of the digit.

Reference 3003 shows four electrodes implemented at various points along the perimeter of the cross-section of the digit of the glove. The electrodes are implemented across from one another with respect to the cross-section of the digit such that electrodes (e.g., shown as electrodes 1a, 1b, 1c, and 1d). From certain perspectives, the electrodes may be viewed as forming respective pairs (e.g., a first pair including electrodes 1a and 1b and a second. Including electrodes 1c and 1d). The capacitance between the electrodes may be detected by one or more DSCs connected to or coupled to the electrodes. One or more processing modules in communication with the one or more DSCs is operative to interpret information provided from the one or more DSCs to determine impedance Z (e.g., capacitive reactance, Xc) between the two electrodes and the corresponding distance between the two electrodes. In this diagram, the electrodes are relatively small with respect to the digit and have a substantially rectangular or square cross-section/shape. In addition, note that capacitive coupling may be effectuated between electrode 1a and any of the other three electrodes. 1b, 1c, and 1d. Similarly, note that capacitive coupling may be effectuated between any one of the other electrodes in the of remaining three. The impedance Z (e.g., capacitive reactance, Xc) between any two electrodes in the group may be detected by one or more DSCs connected to or coupled to the electrodes.

Reference 3004 shows four electrodes implemented at various points around the perimeter of the cross-section of the digit of the glove. The electrodes are implemented across from one another with respect to the cross-section of the digit such that electrodes (e.g., shown as electrodes 2a, 2b, 2c, and 2d). From certain perspectives, the electrodes may be viewed as forming respective pairs (e.g., a first pair including electrodes 2a and 2b and a second. Including electrodes 2c and 2d). The capacitance between the electrodes may be detected by one or more DSCs connected to or coupled to the electrodes. One or more processing modules in communication with the one or more DSCs is operative to interpret information provided from the one or more DSCs to determine impedance Z (e.g., capacitive reactance, Xc) between the two electrodes and the corresponding distance between the two electrodes. In this diagram, the electrodes are curved shaped and implemented to wrap around a portion of the digits. From certain perspectives, the shape of these electrodes corresponds to the curvature of the digit. In addition, note that capacitive coupling may be effectuated between electrode 2a and any of the other three electrodes. 2b, 2c, and 2d. Similarly, note that capacitive coupling may be effectuated between any one of the other electrodes in the of remaining three. The impedance Z (e.g., capacitive reactance, Xc) between any two electrodes in the group may be detected by one or more DSCs connected to or coupled to the electrodes.

Reference 3005 shows an implementation that may include two or four electrodes implemented at various points around the perimeter such that a substantially rectangular or square cross-section/shape.

Reference 3006 shows an implementation that may include two or four electrodes implemented at various points around the perimeter such that the electrodes are curved shaped and implemented to wrap around a portion of the digits (e.g., the shape of these electrodes corresponds to the curvature of the digit).

With respect to the examples of reference numerals 3005 and 3006, a dielectric material is also implemented within the glove, between the inside of the glove where the digit of the user would be, and the respective electrodes of the glove. Considering this dielectric material between the electrodes to have an associated permittivity, $\varepsilon_r$, may have some effect on the capacitive coupling between the electrodes. For example, an appropriately selected dielectric material may be implemented between the electrodes to facilitate improved capacitive coupling between electrodes. Note that the dielectric material may be implemented around the entirety of the digit of the glove. Alternatively, note that the dielectric material may be implemented around only one or more portions of the digit of the glove. For example, the dielectric material may be implemented around the perimeter of the digit of the glove only in locations where any electrode is implemented in certain applications. Note that any desired implementation of such a dielectric material may be made in combination with any desired implementation of electrodes.

Reference 3007 shows an implementation of a half portion of a cross-section, such as may be associated with the sides of a digit, such as on the sides of the metacarpal of the thumb or little/pinky digit. For example, consider the metacarpal of the little/pinky digit, from the viewpoint of the back of the hand, any desired electrode implementation may be made to the left of metacarpal of the little/pinky digit (e.g., around the half portion of the cross-section of the metacarpal of the little/pinky digit). Similarly, consider the metacarpal of the thumb, from the viewpoint of the back of the hand, any desired electrode implementation may be made to the right of the metacarpal of the thumb (e.g., around the half portion of the cross-section of the metacarpal of the thumb). Generally speaking, electrodes may be implemented anywhere that is desired within the glove.

FIG. 31 is a schematic block diagram of other various embodiments 3101, 3102, 3103, 3104 of electrodes operative to be implemented in a glove to facilitate capacitive imaging in accordance with the present invention.

Reference 3101 shows 3 electrodes implemented at various points around the perimeter of the cross-section of the digit of the glove. The electrodes are implemented across from one another with respect to the cross-section of the digit such that electrodes (e.g., shown as electrodes electrode (1) E1, E2, and E3) may be viewed as forming respective pairs such that the capacitance between the electrodes may be detected by one or more DSCs connected to or coupled to the electrodes (e.g., capacitance between electrodes E1 and E2, capacitance between electrodes E1 and E3, and capacitance between electrodes E2 and E3). One or more processing modules in communication with the one or more DSCs is operative to interpret information provided from the one or more DSCs to determine impedance Z (e.g., capacitive reactance, Xc) between the two electrodes and the corresponding distance between the two electrodes. In this diagram, the electrodes are relatively small with respect to the digit and have a substantially rectangular or square cross-section/shape. In some implementations, these three respective electrodes are offset at 0°, 120°, and 240° around the perimeter of the digit of the glove.

Reference 3102 shows 5 electrodes implemented at various points around the perimeter of the cross-section of the digit of the glove. The electrodes are implemented across from one another with respect to the cross-section of the digit such that electrodes (e.g., shown as electrodes electrode (1) E1, E2, and E3, E4 and E5) may be viewed as forming respective pairs such that the capacitance between the electrodes may be detected by one or more DSCs connected to or coupled to the electrodes (e.g., capacitance between electrodes E1 and E2, capacitance between electrodes E1 and E3, capacitance between electrodes E1 and E4, and capacitance between electrodes E1 and E5, and so on). One or more processing modules in communication with the one or more DSCs is operative to interpret information provided from the one or more DSCs to determine impedance Z (e.g., capacitive reactance, Xc) between the two electrodes and the corresponding distance between the two electrodes. In this diagram, the electrodes are curved shaped and implemented to wrap around a portion of the digits (e.g., the shape of these electrodes corresponds to the curvature of the digit). In some implementations, these five respective electrodes are offset at 0°, 72°, 144°, 216°, and 288° around the perimeter of the digit of the glove.

Reference 3103 shows an implementation that includes five electrodes implemented at various points around the perimeter such that a substantially rectangular or square cross-section/shape. In some implementations, these five respective electrodes are offset at 0°, 72°, 144°, 216°, and 288° around the perimeter of the digit of the glove. In this diagram, the electrodes are relatively small with respect to the digit and have a substantially rectangular or square cross-section/shape.

Reference 3104 shows an implementation that may include nine electrodes implemented at various points around the perimeter such that the electrodes are curved shaped and implemented to wrap around a portion of the digits (e.g., the shape of these electrodes corresponds to the curvature of the digit). In some implementations, these nine respective electrodes are offset at 0°, 40°, 80°, and so on up to 320° around the perimeter of the digit of the glove.

With respect to the examples of reference numerals 3103 and 3104, a dielectric material is also implemented within the glove, between the inside of the glove where the digit of the user would be, and the respective electrodes of the glove. Considering this dielectric material between the electrodes to have an associated permittivity, $\varepsilon_r$, may have some effect on the capacitive coupling between the electrodes. For example, an appropriately selected dielectric material may be implemented between the electrodes to facilitate improved capacitive coupling between electrodes. Note that the dielectric material may be implemented around the entirety of the digit of the glove. Alternatively, note that the dielectric material may be implemented around only one or more portions of the digit of the glove. For example, the dielectric material may be implemented around the perimeter of the digit of the glove only in locations where any electrode is implemented in certain applications. Note that any desired implementation of such a dielectric material may be made in combination with any desired implementation of electrodes.

FIG. 32 is a schematic block diagram of various embodiments of shapes 3201, 3202, 3203, 3204, 3205, 3206, 3207, 3208, 3209, 3210, 3211, 3212, 3213, 3214 of electrodes operative to be implemented in a glove to facilitate capacitive imaging in accordance with the present invention. As shown by the different respective reference numerals, electrodes may be implemented using any of a variety of desired shapes, structures, etc. Note that the electrodes may be implemented to have any desired thickness.

Reference numeral 3201 shows the square, reference numeral 3202 shows a rectangle, reference numeral 3203 shows a rounded square with rounded corners, reference numeral 3204 shows a rounded rectangular with rounded corners, reference numeral 3205 shows a circle, reference numeral 3206 shows a noble, reference numeral 3207 shows a diamond, reference numeral 3208 shows a rounded diamond with rounded corners, reference numeral 3209 shows a triangle, reference numeral 3210 shows a rounded triangle with rounded corners, reference numeral 3211 shows an arc, reference numeral 3212 shows a rounded arc with rounded corners, reference numeral 3213 shows a hexagon, reference numeral 3214 shows a hexagon with rounded corners.

Generally speaking, any desired number of electrodes may be implemented around a digit of the glove, and the electrodes may have any desired shape. The electrodes may all have a similar or same style and shape. In alternative examples, different electrodes may alternatively have different styles and shapes, sizes, angular alignment throughout the glove, etc. Generally speaking, the electrodes may be of any desired geometric shape, any desired thickness, any desired material that is operative to facilitate capacitive coupling with one or more other electrodes such as being conductive material, etc.

FIG. 33 is a schematic block diagram of an embodiment 3300 of circuitry implemented to drive and simultaneously sense signals having particular characteristics provided to electrodes in a capacitive imaging glove in accordance with the present invention. The top of the diagram shows a glove with multiple electrodes implemented and integrated within the glove (e.g., surface 1 electrodes and surface 2 electrodes), and the bottom of the diagram shows the electrodes of the glove in communication with DSCs 28 that are configured to provide respective signals to the electrodes of the glove (e.g., shown at signal #1, signal #2, and so on up to signal #n, considering n separate and distinct signals being provided to the respective electrodes, where n is a positive integer). The DSCs 28 are implemented to communicate with and interact with one or more processing modules 42, which may be implemented to include memory and/or be coupled to memory. This diagram includes one or more processing modules 42, which may include memory and/or be coupled to memory, that is in communication with and interacts with the DSCs 28 that are respectively coupled to or connected to the surface 1 electrodes and surface 2 electrodes.

Note that the one or more processing modules 42 may include integrated memory and/or be coupled to other memory. At least some of the memory stores operational instructions to be executed by the one or more processing modules 42. In addition, note that the one or more processing modules 42 may interface with one or more other devices, components, elements, etc. via one or more communication links, networks, communication pathways, channels, etc.

In an example of operation and implementation, the one or more processing modules 42 is configured to provide respective reference signals to the DSCs 28 to facilitate their respective driving and sensing of signals via the respective electrodes. For example, a first DSC 28 is configured to receive a first reference signal from the one or more processing modules 42 and is configured to generate a first signal that is transmitted via a first electrode (electrode 1) and simultaneously to sense that signal via the first electrode. The sensing of the signal includes detecting any one or more other signals that are coupled into that first signal (e.g., from one or more other electrodes) in accordance with facilitating capacitive imaging of a glove including them electrodes implemented therein in accordance with the various aspects, embodiments, and/or examples of the invention (and/or their equivalents) described herein. A second DSC 28 is configured to receive a second reference signal from the one or more processing modules 42 and is configured to generate a second signal that is transmitted via a second electrode (electrode 2) and simultaneously to sense that signal via the second electrode. Similarly, the sensing of the signal includes detecting any one or more other signals that are coupled into that second signal (e.g., from one or more other electrodes) in accordance with facilitating capacitive imaging of a glove including them electrodes implemented therein in accordance with the various aspects, embodiments, and/or examples of the invention (and/or their equivalents) described herein.

In some examples, each of the respective signals that are provided from the DSCs 28 to the respective electrodes of the glove via the electrical connections of the glove are differentiated by one or more characteristics. For example, in some examples, each respective signal provided from the respective DSCs 28 to the respective electrodes of the glove may be of differentiated based on one or more properties and/or characteristic that may include any one or more of frequency, amplitude, DC offset, modulation, forward error correction (FEC)/error checking and correction (ECC) type, type, waveform shape, phase, etc. among other signal properties and/or characteristic by which signals may be differentiated.

In some alternative examples, the signals provided from the respective DSCs 28 to the respective electrodes of the glove via the electrical connections of the glove include one or more common property and/or characteristic (e.g., at least one of a same frequency, amplitude, DC offset, modulation, FEC/ECC type, type, waveform shape, phase, etc., among other signal properties and/or characteristic). In such examples, note that the signals may also be differentiated based on one or more other of such properties and/or characteristic. For example, more than one of the signals may have a common frequency, yet be of different modulation type. Generally speaking, any combination of one or more common properties and/or characteristic and one or more different property properties and/or characteristic may be used with respect to the different signals provided from the DSCs 28 to electrodes of the glove.

An even other alternative examples, different respective sets of signals that are provided from the respective DSCs 28 to the respective electrodes of the glove via the electrical connections of the glove include one or more common property and/or characteristic (e.g., at least one of a same frequency, amplitude, DC offset, modulation, FEC/ECC type, type, waveform shape, phase, etc., among other signal properties and/or characteristic). For example, consider a first set of signals provided from a first one or more of the DSCs 28 having the at least one of a same first at least one property or characteristic (e.g., a first frequency and/or first amplitude, etc.). Also, consider a second set of signals provided from a second one or more of the DSCs 28 having the at least one of a same second at least one property or characteristic (e.g., a first frequency and/or first amplitude, etc. that is different from a second frequency and/or second amplitude, etc.).

In some examples, different signals provided to different respective electrodes in different respective areas of the glove may include one or more common property and/or characteristic without deleteriously affecting the performance of one another. For example, consider the electrodes of the glove to which certain signals are provided being of sufficiently far distance away from one another that they may be appropriately differentiated from one another (e.g., sufficiently far away from one another, such as when using sufficiently low power that both of the signals having one or more common property and/or characteristic could not be coupled into an electorate of interest). For example, consider an electrode on the little/pinky digit of the glove and an electrode on the thumb of the glove both using respective signals that each include one or more common property and/or characteristic. If the power of those respective signals is kept sufficiently low such that a first signal from the electrode on the little/pinky digit of the glove would not be coupled into electrodes that are of interest to detect a second signal from the electrode on the thumb of the glove, and vice versa (the second signal from the electrode on the thumb of the glove would not be coupled into electrodes that are of interest to detect the first signal from the electrode on the little/pinky digit of the glove), then the first and second signal may have one or more common property and/or characteristic while still facilitating the proper function and operation of the glove such that the first signal would not be improperly identified as the second signal by any electrode of interest, and vice versa.

In examples in which signals are differentiated, and based on coupling of signals between electrodes of the glove via capacitive coupling, straightforward identification of which particular one or more signals is being coupled into an electrode of the glove may be made based on the differentiation will not be. Based on the particular implementation, structure, etc. by which the electrodes of the glove were implemented, and also based on identification of which one or more signals is being coupled into an electrode of the glove allows the one or more processing modules 42 to process information provided from the DSCs 28 to determine the location of the various electrodes of the glove with respect to another thereby facilitating capacitive imaging of a hand of the user of the glove. In addition, by performing such capacitive imaging of the hand of the user of the glove over time, movement detection may be performed based on comparison of different respective snapshots of the capacitive imaging of the hand of the user the glove.

For example, a first DSC 28 that simultaneously transmits and senses a first signal via electrode 1 may detect a second signal that is coupled into electrode 1, and when that second signal is identified as being associated with electrode 2 (or another electrode), then determination may be made with respect to not only any change in capacitance between the electrodes 1 and 2, but also further granularity based on specifically which signal is being coupled into electrode 1 may be made.

As described elsewhere herein, generally speaking, as the distance between any two particular electrodes of interest changes, then so will the capacitance between those particular electrodes of interest change. For example, consider an instance during which a user of the glove is spreading the digits of the hand apart, then the capacitance between at least some of the electrodes of the glove will decrease. Alternatively, consider an instance during which a user of the glove is making a first with the hand, then the capacitance between at least some of the electrodes of the glove will increase.

Elsewhere herein, various examples of detection of signals being coupled into one or more electrodes from one or more other electrodes of interest are described including with respect to capacitive imaging using a glove, digit movement detection based on capacitive imaging, inter-digit movement detection based on capacitive imaging, and movement detection, etc.

Some examples by which respective DSCs 28 are in communication with respect to electrodes associated with a digit of the glove are described below. Note that any alternative design, construction, implementation, etc. of electrodes with respect to a digit of the glove may alternatively be used in accordance with the principles described below including providing electrode mapping and signal orthogonality to the different respective electrodes of the glove.

Figure 34B:
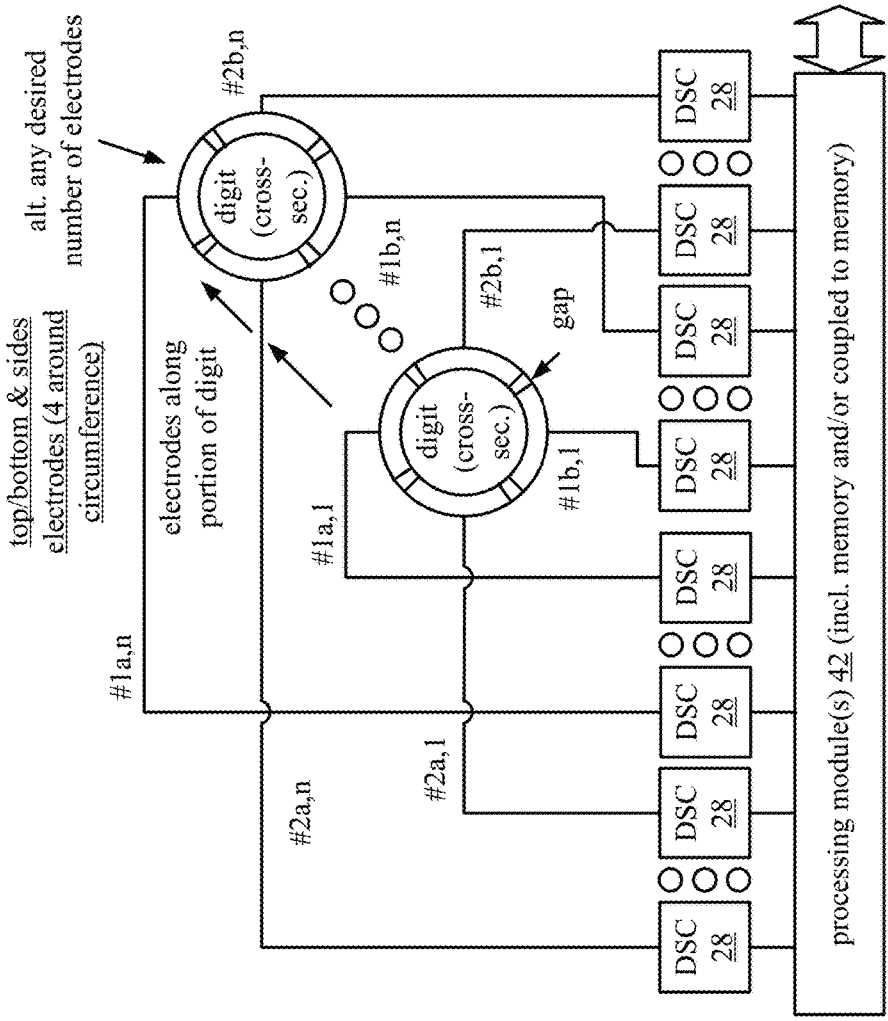
FIG. 34B is a schematic block diagram of another embodiment of connectivity between DSCs implemented to drive and simultaneously sense signals having particular characteristics provided to electrodes in a capacitive imaging glove in accordance with the present invention.
Figure 34A:
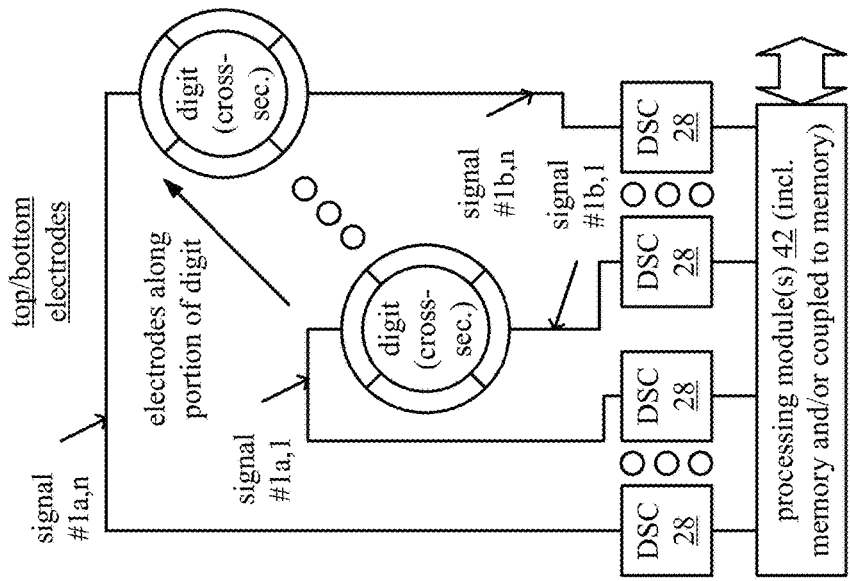
FIG. 34A is a schematic block diagram of an embodiment of connectivity between DSCs implemented to drive and simultaneously sense signals having particular characteristics provided to electrodes in a capacitive imaging glove in accordance with the present invention.

FIG. 34A is a schematic block diagram of an embodiment 3401 of connectivity between DSCs implemented to drive and simultaneously sense signals having particular characteristics provided to electrodes in a capacitive imaging glove in accordance with the present invention. This diagram shows a number of electrodes of a glove (e.g., specifically the electrodes implemented along the digit of the glove) such that each of the electrodes of the glove is respectively in communication with a respective DSC 28. This diagram also includes one or more processing modules 42, which may include memory and/or be coupled to memory, that is in communication with and interacts with the DSCs 28, some of which are coupled to or connected to the electrodes of the glove.

In this particular diagram, considering a cross-section of a digit of the glove, two electrodes are included respectively on the top and bottom of the digit of the glove (or alternatively, substantially or approximately on opposing sides of the digit glove, generally speaking, such as may be substantially or approximately oppositely located around the perimeter of a cross-section of the digit of the glove). A first DSC 28 is configured to provide a signal #1a,1 to a first electrode, and a second DSC 28 is configured to provide a signal #1b,1 to a second electrode that is also implemented with respect to a first cross-section of the digit of the glove (e.g., consider that the first electrode and a second electrode are implemented substantially or approximately oppositely around the perimeter of the first cross-section of the digit of the glove). A similar implementation is provided with respect to other electrodes along the portion of the digit of the glove until an additional two DSCs 28 are configured, respectively, to provide a signal #1a,n and a signal #1b,n to electrodes that is implemented with respect to another cross-section of the digit of the glove (e.g., consider these electrodes being implemented substantially or approximately oppositely around the perimeter of the other cross-section of the digit of the glove, such as at the opposite end of the digit of the glove from the first electrode and the second electrode).

In this diagram as well as others included herein, note that each respective DSC 28 is configured not only to provide the signal to the respective electrode to which it is coupled, but that respective DSC 28 is also configured simultaneously to sense that signal including any change there to which may include the coupling of one or more other signals into that electrode from one or more other electrodes.

FIG. 34B is a schematic block diagram of another embodiment 3402 of connectivity between DSCs implemented to drive and simultaneously sense signals having particular characteristics provided to electrodes in a capacitive imaging glove in accordance with the present invention. In this particular diagram, considering a cross-section of a digit of the glove, four electrodes are included respectively located around the perimeter of a cross-section of the digit of the glove. In some examples, the four electrodes located around the perimeter of the cross-section of the dish of the glove are located at 0°, 90°, 180°, and 270°. A first DSC 28 is configured to provide a signal #1a,1 to a first electrode, a second DSC 28 is configured to provide a signal #1b,1 to a second electrode, a third DSC 28 is configured to provide a signal #2a,1 to a third electrode, and a fourth DSC 28 is configured to provide a signal #2b,1 to a fourth electrode that are all associated with the cross-section of the digit of the glove. Similarly, continuing along the portion of the digit of the glove, four additional DSCs 28 also configured to provide signals #1a,n #1b,n #2a,n and #2b,n to four other electrodes that are respectively located around the perimeter of a cross-section of the digit of the glove (e.g., such as at the opposite end of the digit of the glove from the first electrode, the second electrode, third electrode, and fourth electrode). Generally, a similar implementation is provided with respect to other electrodes along the portion of the digit of the glove (e.g., four respective DSCs 28 respectively provide signals #1a,n #1b,n #2a,n and #2b,n to four other electrodes).

Figure 35B:
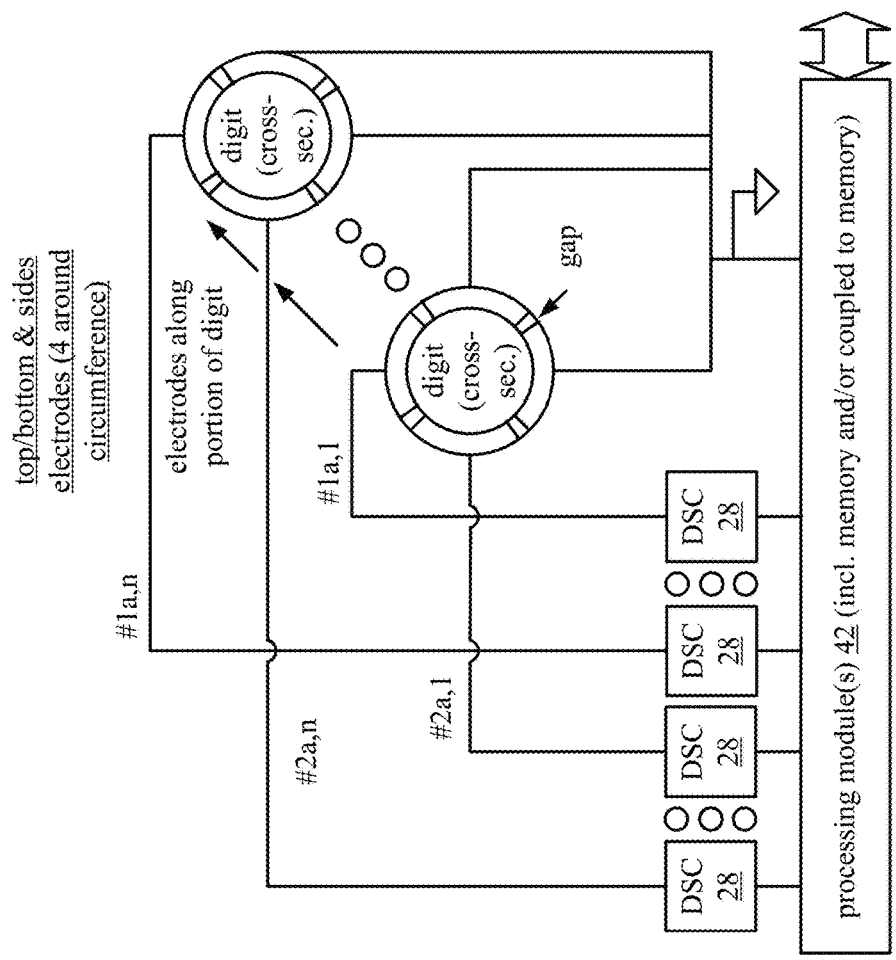
FIG. 35B is a schematic block diagram of another embodiment of connectivity between DSCs implemented to drive and simultaneously sense signals having particular characteristics provided to electrodes in a capacitive imaging glove in accordance with the present invention.
Figure 35A:
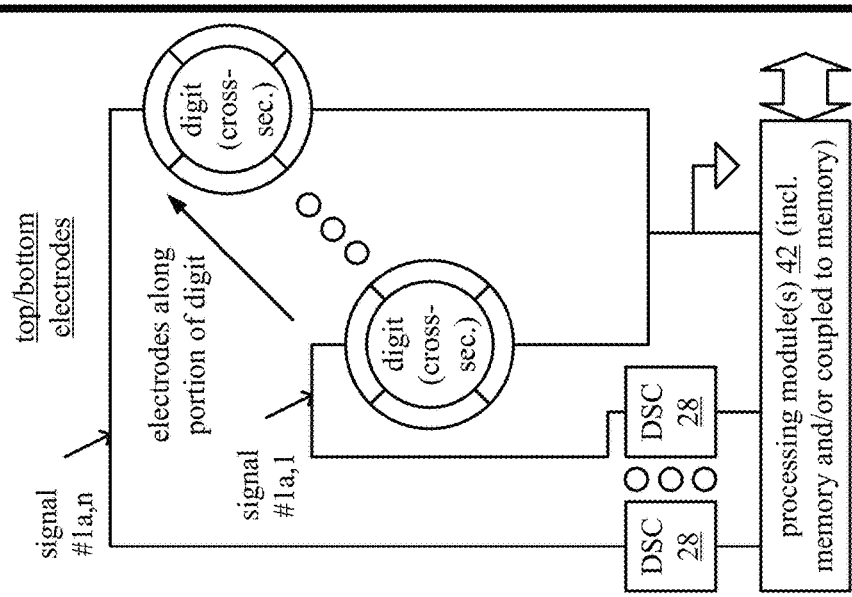
FIG. 35A is a schematic block diagram of another embodiment of connectivity between DSCs implemented to drive and simultaneously sense signals having particular characteristics provided to electrodes in a capacitive imaging glove in accordance with the present invention.

FIG. 35A is a schematic block diagram of another embodiment 3501 of connectivity between DSCs implemented to drive and simultaneously sense signals having particular characteristics provided to electrodes in a capacitive imaging glove in accordance with the present invention. This diagram is similar to the embodiment 3401 of FIG. 34A with at least one difference being that some of the electrodes are respectively in communication with a respective DSC 28 and other electrodes are connected to a known voltage potential as depicted in the diagram. For example, consider that the electrodes located along the bottom of the digit of the glove are connected to the known voltage potential. In some examples, this known voltage potential is ground. Note that the ground may be a circuit/common and/or earth ground. This diagram also includes one or more processing modules 42, which may include memory and/or be coupled to memory, that is in communication with and interacts with the DSCs 28, some of which are coupled to or connected to the electrodes of the glove.

FIG. 35B is a schematic block diagram of another embodiment 3502 of connectivity between DSCs implemented to drive and simultaneously sense signals having particular characteristics provided to electrodes in a capacitive imaging glove in accordance with the present invention. This diagram is similar to the embodiment 3402 of FIG. 34B with at least one difference being that some of the electrodes are respectively in communication with a respective DSC 28 and other electrodes are connected to a known voltage potential as depicted in the diagram. For example, consider that the electrodes located along the bottom and one of the sides of the digit of the glove are connected to the known voltage potential. In some examples, this known voltage potential is ground. Note that the ground may be a circuit/common and/or earth ground. This diagram also includes one or more processing modules 42, which may include memory and/or be coupled to memory, that is in communication with and interacts with the DSCs 28, some of which are coupled to or connected to the electrodes of the glove.

Figure 36:
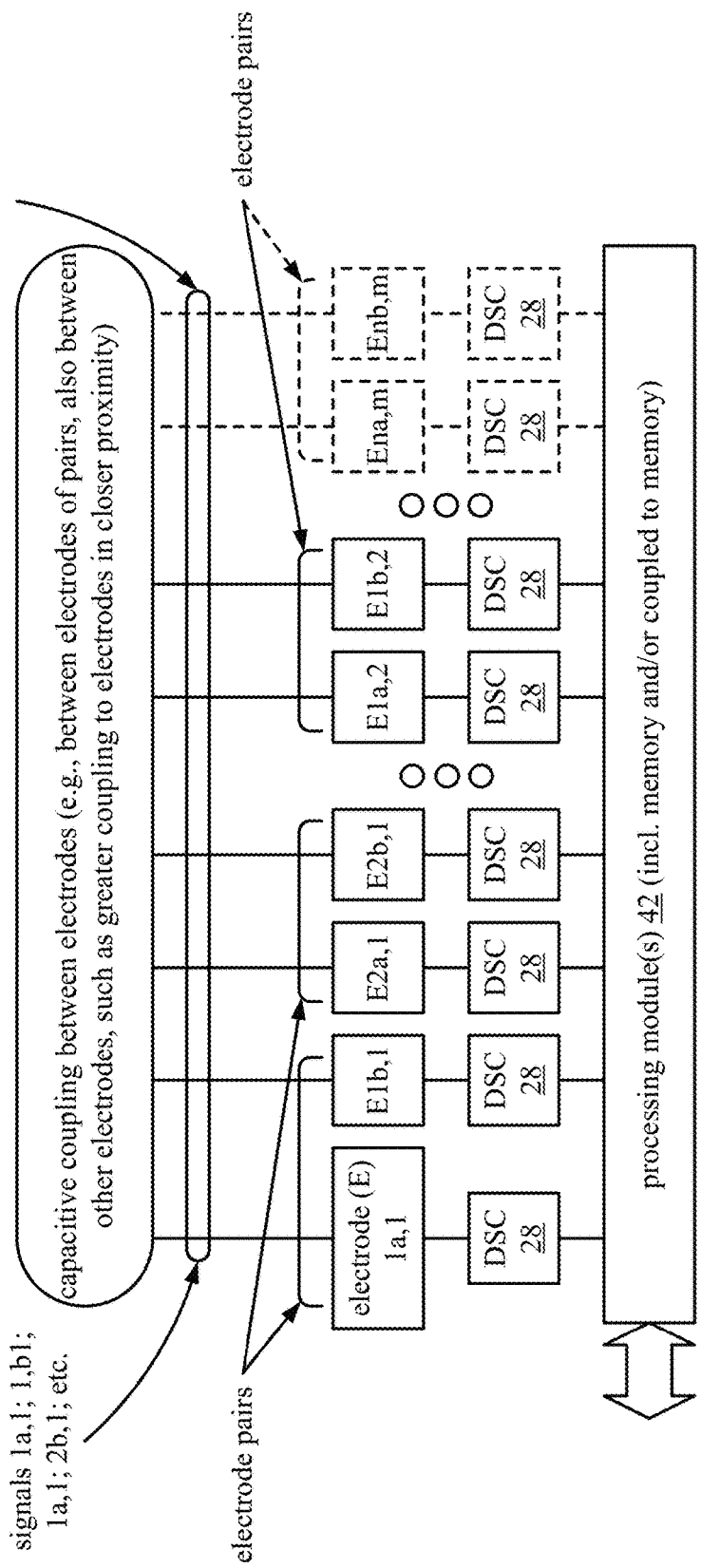
FIG. 36 is a schematic block diagram of another embodiment of connectivity between DSCs implemented to drive and simultaneously sense signals having particular characteristics provided to electrodes in a capacitive imaging glove in accordance with the present invention.

FIG. 36 is a schematic block diagram of another embodiment 3600 of connectivity between DSCs implemented to drive and simultaneously sense signals having particular characteristics provided to electrodes in a capacitive imaging glove in accordance with the present invention. This diagram also includes one or more processing modules 42, which may include memory and/or be coupled to memory, that is in communication with and interacts with the DSCs 28, some of which are coupled to or connected to the electrodes of the glove.

This diagram shows the number of electrodes that may be viewed as being grouped into electrode pairs. For example, consider that the respective electrodes of a given pair are particularly implemented respectively to DSCs 28 such that monitoring of the impedance Z (e.g., capacitive reactance, Xc) between the electrodes of the electrode pair provide information to the one or more processing modules 42 to determine distance between the electrodes of electrode pair. For example, consider a first electrode pair as including electrodes E1$a$,1 and E1$b$,1. Consider a second electrode pair as including as including electrodes E2$a$,1 and E2$b$,1, and so on. First and second DSCs 28 are configured to provide a first signal and a second signal, respectively, to electrodes E1$a$,1 and E1$b$,1. Third and fourth DSCs are configured to provide a third signal the fourth signal, respectively, to electrodes E2$a$,1 and E2$b$,1, and so on.

This diagram also includes one or more processing modules 42, which may include memory and/or be coupled to memory, that is in communication with and interacts with the DSCs 28, some of which are coupled to or connected to the electrodes of the glove. Considering an implementation of a glove that includes such electrodes that are arranged appropriately throughout the glove in pairs such that distance between the respective electrodes of the electrode pairs may be determined in accordance with capacitive imaging as well as monitoring change thereof to perform movement detection of the hand of the user of the glove. Note that the signals that are driven/sensed via the electrical connections to the electrodes may be differentiated by one or more properties and/or characteristics as well as described herein.

Also, note that any DSC 28 that is coupled or connected to an electrode that is included within electrode pair, and is configured to drive a signal to that electrode, is also configured to sense that signal including any change thereto as well as detect any other signal that may be coupled into the electrode from any other electrode including the other electrode of the electrode pair. Based on appropriate signal differentiation (e.g., signals being differentiated by one or more properties and/or characteristics as described herein), the DSC 28 is configured to detect which signal is being coupled from the other electrode of interest, such as the other electrode of the electrode pair, to determine distance between the electrodes of the electrode pair.

For example, electrodes may be paired together in one particular manner to facilitate capacitive imaging generally for the glove. Electrodes may be paired together in another particular manner to facilitate digit movement detection based on capacitive imaging. Electrodes will be paired together and yet another particular manner to facilitate inter-digit movement detection based on capacitive imaging, and so on. Note that a particular electrode may be included in more than one electrode pair. For example, an electrode may be included within the first pair of electrodes (e.g., that includes the electrode and a first other electrode) that is used to facilitate digit movement detection based on capacitive imaging, and that same electrode may also be included within the second pair of electrodes (e.g., that includes the electrode and a second other electrode) that is used to facilitate inter-digit movement detection based on capacitive imaging.

Employing multiple instantiations of such an implementation throughout the glove allows the one or more processing modules ready to utilize information provided from the respective DSCs to generate a capacitive image of the hand of the user of the glove as well as any changes thereto as may be used to perform movement detection. Generally speaking, the grouping of electrodes into electrode pairs may be made in any desired manner so that any desired granularity and any particular portions of the glove may be monitored in accordance with capacitive imaging and monitoring of change thereof.

Figure 37:
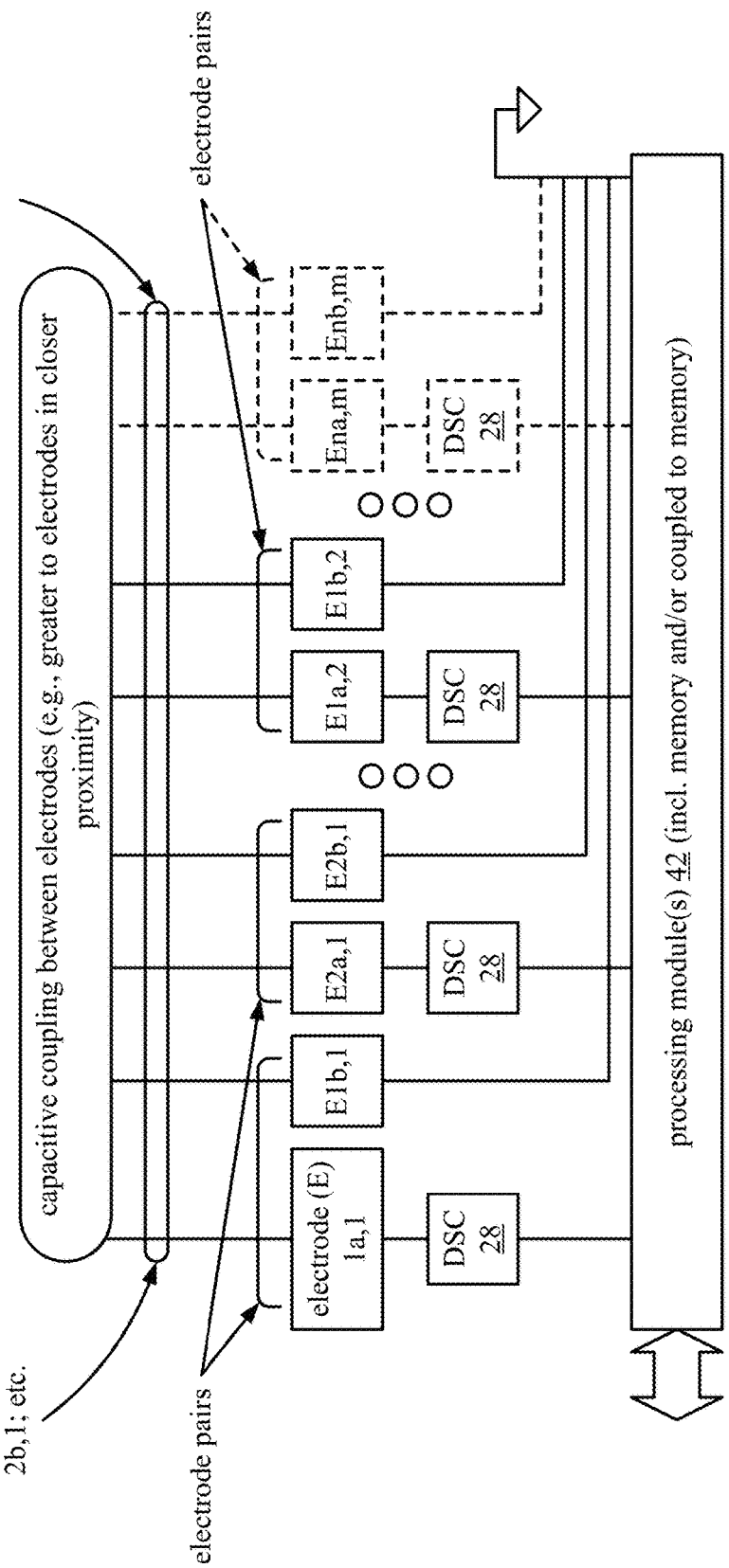
FIG. 37 is a schematic block diagram of another embodiment of connectivity between DSCs implemented to drive and simultaneously sense signals having particular characteristics provided to electrodes in a capacitive imaging glove in accordance with the present invention.

FIG. 37 is a schematic block diagram of another embodiment 3700 of connectivity between DSCs implemented to drive and simultaneously sense signals having particular characteristics provided to electrodes in a capacitive imaging glove in accordance with the present invention. This diagram is similar to the previous diagram with at least one difference being that one of the electrodes of each of the respective electrode pairs is connected to a known voltage potential. In some examples, this known voltage potential is ground. Note that the ground may be a circuit/common and/or earth ground. Generally speaking, one of the electrodes of each respective electrode pair may be connected to or coupled to a DSC 28 while the other electrode is connected to some known voltage potential.

Figure 38:
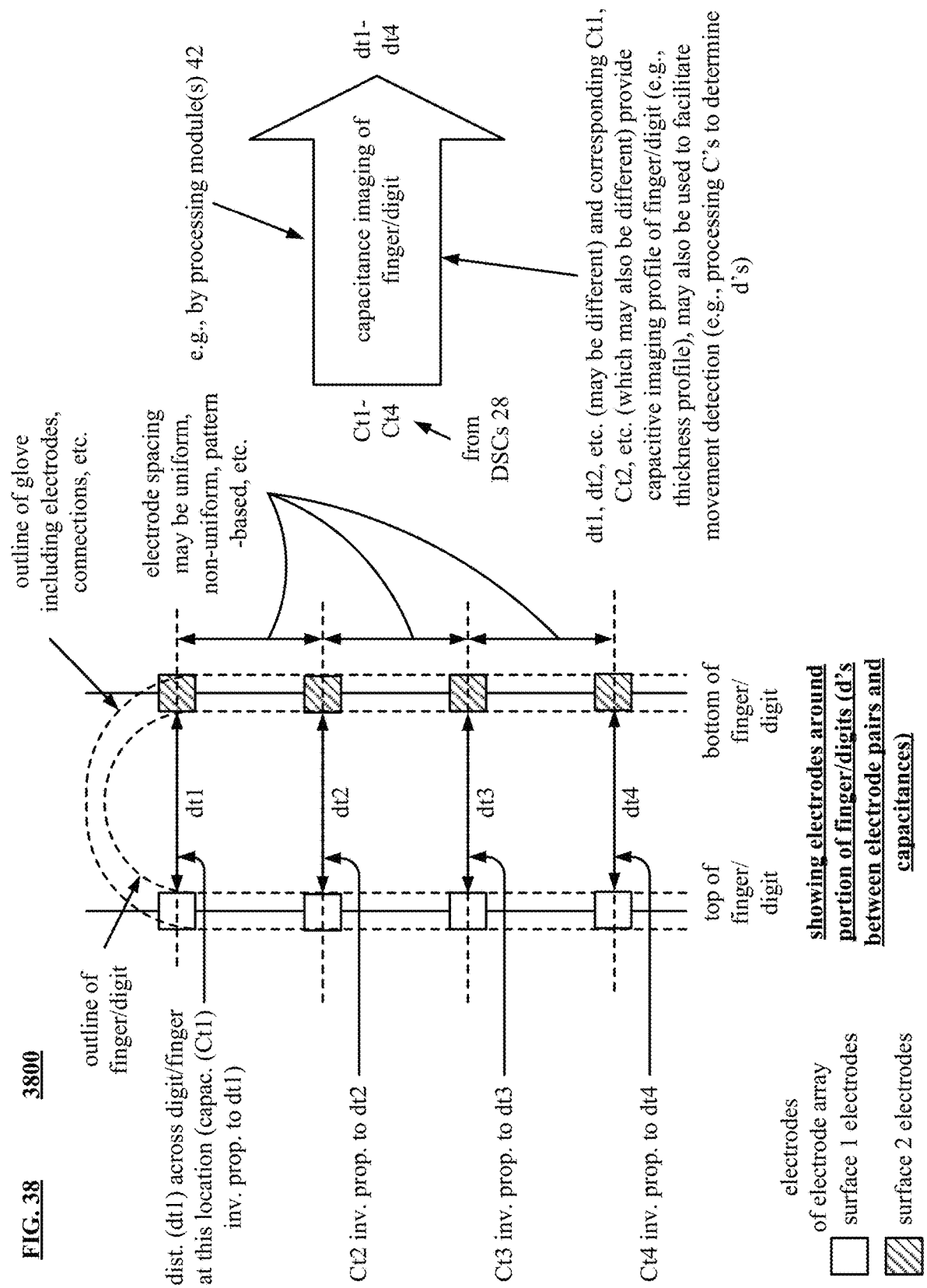
FIG. 38 is a schematic block diagram of an embodiment of capacitive imaging of a finger or digit using a capacitive imaging glove in accordance with the present invention.

FIG. 38 is a schematic block diagram of an embodiment 3800 of capacitive imaging of a finger or digit using a capacitive imaging glove in accordance with the present invention. This diagram shows perspective distances between electrodes implemented substantially or approximately opposite one another with respect to a cross-section of the digit of the glove and the corresponding capacitance that is inversely proportional to that distance. For example, the distance dt1 shown as being between two electrodes that are across a digit/finger of the glove at a location towards the top of the outline of the finger/digit is inversely proportional to the capacitance Ct1 between those electrodes. Similarly, the distance dt2 shown as being between two electrodes that are across a digit/finger of the glove is inversely proportional to the capacitance Ct2 between those electrodes, and so on.

In certainties examples, the electrodes shown on the left hand side of the finger/digit of the glove may be viewed as being the top of the finger/digit of the glove and being associated with surface 1 electrodes of an array of electrodes of the glove, and the electrodes shown on the right hand side of the finger/digit of the glove may be viewed as being the bottom of the finger/digit of the glove and being associated with surface 2 electrodes of the array of electrodes of the glove, or vice versa.

One or more DSCs 28 is configured to detect the capacitances between the respective pairs of electrodes and to provide information corresponding to those capacitances Ct1-Ct4 to one or more processing modules 42 that is implemented to perform capacitive imaging of the finger/digit of the glove thereby generating information corresponding to the respective distances dt1-dt4.

Generally speaking, with respect to capacitive imaging of the finger/digit of the glove, note that the different respective distances and corresponding capacitances may be different with respect to one user in comparison to another user of the glove. The one or more processing modules 42, by analyzing the respective distances of the finger/digit of the glove as shown in the diagram, is configured to generate a capacitive imaging profile of the finger/digit of the glove. This may be viewed as being a thickness profile of the finger/digit of the glove. As all described elsewhere herein, consider the glove being constructed of a flexible material that fits tightly to the finger/digit of the user of the glove (e.g., such that the material is an elastic material that will accommodate users having different sized hands and fingers/digits), then the respective distances of the finger/digit of the glove may be used to generate a capacitive imaging profile of the finger/digit of the glove (e.g., a thickness profile of the finger/digit of the glove). In addition, the one or more processing modules 42, by analyzing those respective distances of the finger/digit of the glove as shown in the diagram as a function of time including any change thereof, is configured to perform movement detection of the finger/digit of the glove.

Figure 39:
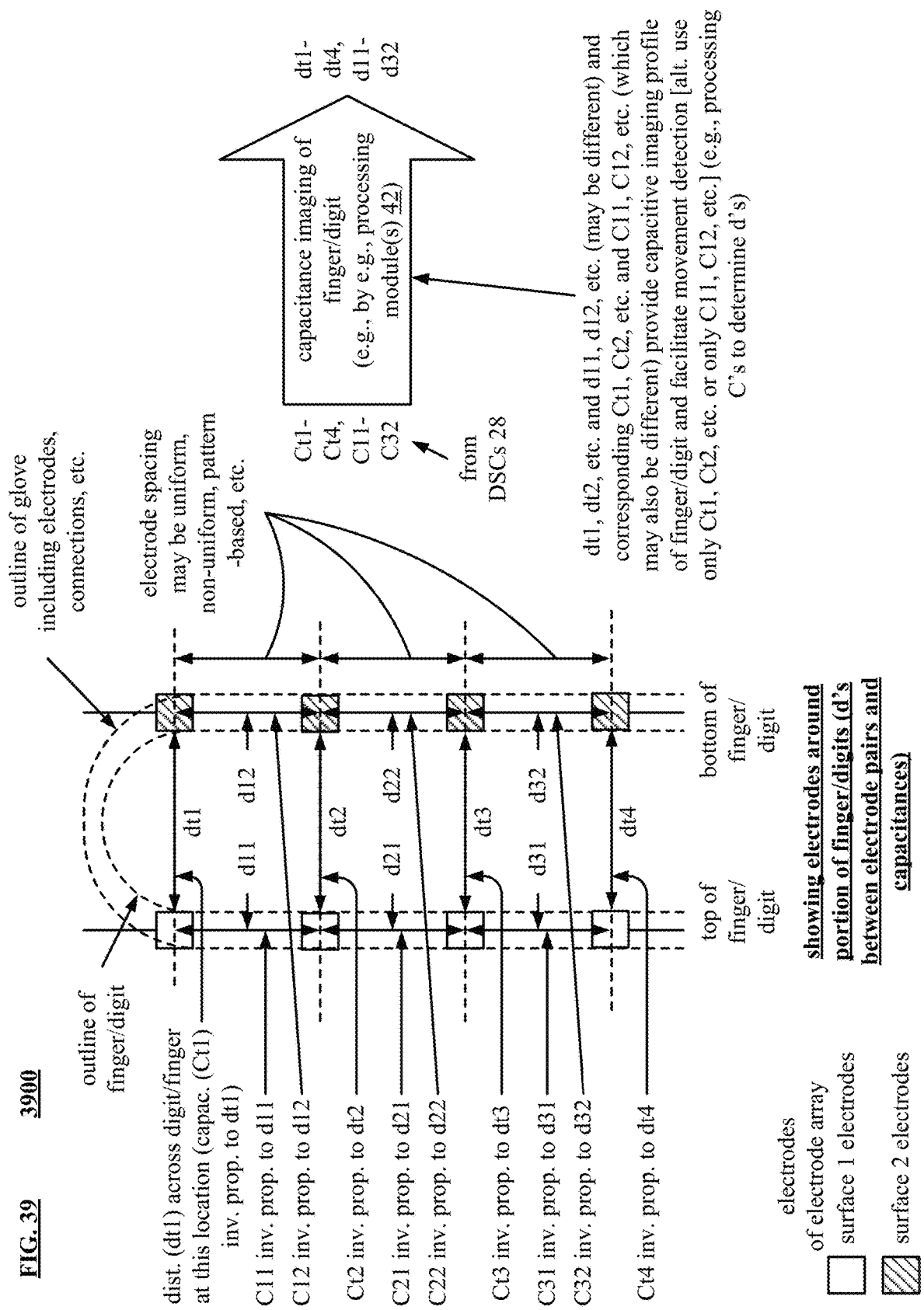
FIG. 39 is a schematic block diagram of another embodiment of capacitive imaging of a finger or digit using a capacitive imaging glove in accordance with the present invention.

FIG. 39 is a schematic block diagram of another embodiment 3900 of capacitive imaging of a finger or digit using a capacitive imaging glove in accordance with the present invention. This diagram has at least some similarities to the previous diagram yet also shows a number of additional distances that may be determined and monitored and tracked based on the respective capacitances between their respective electrodes of the finger/digit of the glove. For example, one or more DSCs 28 are configured to determine the respective capacitances Ct1, Ct2, Ct3, Ct4 between the electrodes associated with the distances shown as dt1, dt2, dt3, and dt4, and one or more processing modules 42 operating cooperatively with those one or more DSCs 28 is configured to process those respective capacitances Ct1, Ct2, Ct3, Ct4 to determine those respective distances dt1, dt2, dt3, and dt4.

In addition, one or more DSCs 28 are also configured to determine other respective capacitances, such as C11, C212, C21, C22, C31, and C32 between the electrodes associated with the distances shown as d11, d12, d21, d22, d31, and d32, and one or more processing modules 42 operating cooperatively with those one or more DSCs 28 is configured to process those respective capacitances C11, C212, C21, C22, C31, and C32 to determine those respective distances d11, d12, d21, d22, d31, and d32.

This diagram shows an alternative implementation in which even greater granularity and resolution of distance measurements with respect to distances between electrodes of the glove may be made in accordance with performing capacitive imaging the glove including monitoring and tracking of change thereof in accordance with movement detection. Note that a given electrode is included within the first pair of electrodes (e.g., electrodes associated with distance dt1) as well as a second pair of electrodes (e.g., electrodes associated with distance d11 or d12); the two electrodes shown at the top of the diagram are examples of an electrode that is included in more than one pair of electrodes.

FIG. 40A is a schematic block diagram of an embodiment of a method 4001 for execution by one or more devices in accordance with the present invention.

The method 4001 operates in step 4010 by providing, from a DSC, a signal to an electrode and simultaneously sensing that signal via the electrode. The method 4001 also operates in step 4020 by detecting an electrical characteristic of the electrode via sensing of the signal.

The method 4001 operates in step 4030 by generating a digital signal representative of the electrical characteristic of the electrode. The method 4001 also operates in step 4040 by processing the digital signal to determine the electrical characteristic of the electrode (e.g., impedance, capacitive reactance, capacitance, etc. of the electrode). The method 4001 operates in step 4050 by generating data corresponding to a distance between the electrode and another electrode based on the electrical characteristic of the electrode (e.g., based on characteristic(s) of the signal, the determined impedance, capacitive reactance, capacitance, etc. of the electrode).

FIG. 40B is a schematic block diagram of an embodiment of a method 4002 for execution by one or more devices in accordance with the present invention.

The method 4001 operates in step 4011 by providing, from DSCs, signals to at least some of the electrodes of a capacitive imaging glove and simultaneously sensing those signals via the at least some of the electrodes of the capacitive imaging glove. The method 4001 also operates in step 4021 by determining electrical characteristics of the at least some of the electrodes of the capacitive imaging glove (e.g., impedance, capacitive reactance, capacitance, etc. of the electrode).

The method 4001 operates in step 4031 by generating data corresponding to distances between at least some of the electrodes of the capacitive imaging glove (e.g., between first electrode and second electrode, between third electrode and fourth electrode, etc.) based on the electrical characteristics of the at least some of the electrodes of the capacitive imaging glove (e.g., based on characteristic(s) of the signals, the determined impedances, capacitive reactances, capacitances, etc. of the electrodes). The method 4001 also operates in step 4041 by generating capacitive image data representative of a shape of the capacitive imaging glove based on the distances between the at least some of the electrodes of the capacitive imaging glove (e.g., between first electrode and second electrode, between third electrode and fourth electrode).

Figure 41:
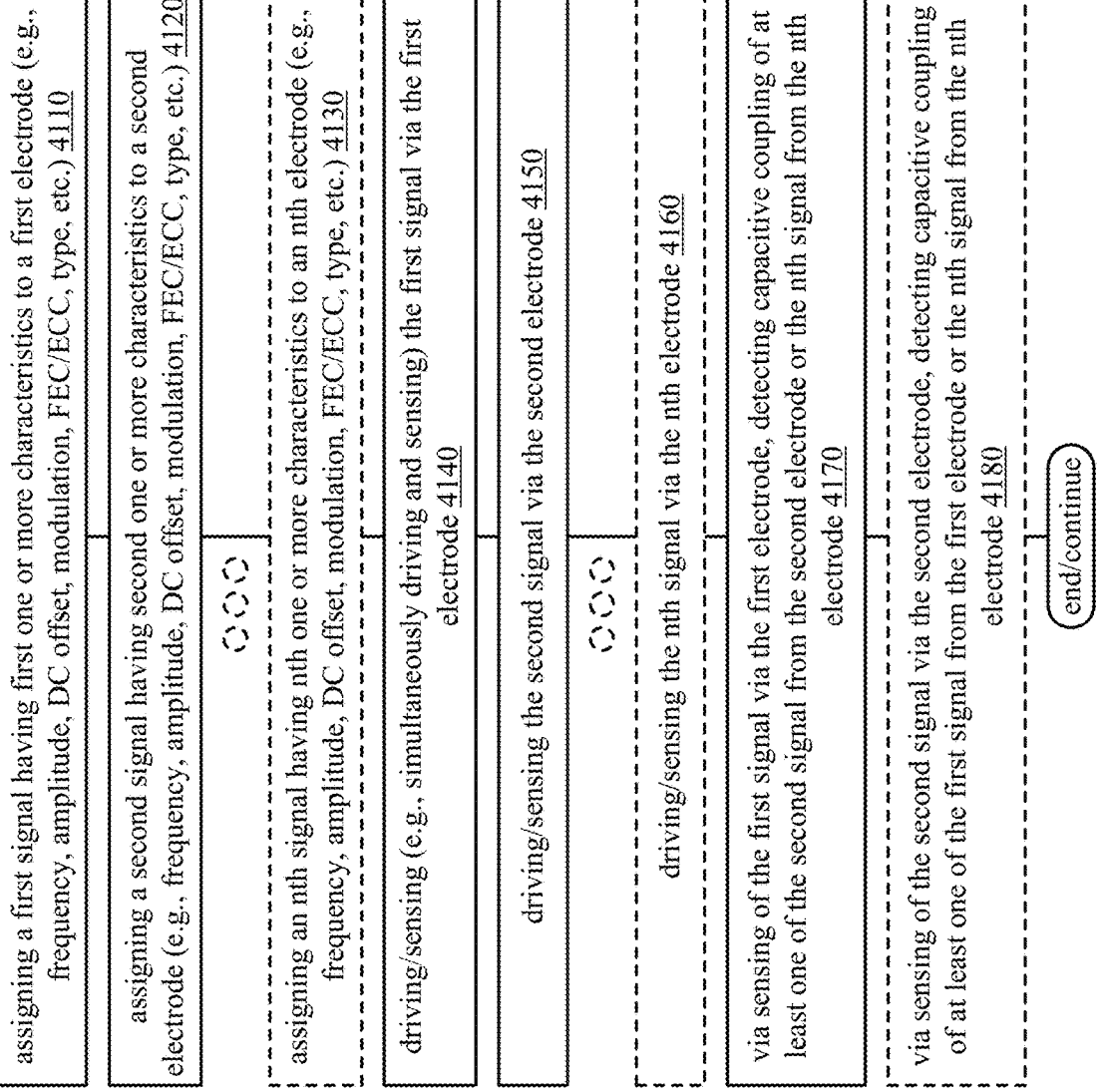
FIG. 41 is a schematic block diagram of another embodiment of a method for execution by one or more devices in accordance with the present invention.

FIG. 41 is a schematic block diagram of another embodiment of a method 4100 for execution by one or more devices in accordance with the present invention.

The method 4100 operates in step 4110 by assigning a first signal having first one or more characteristics to a first electrode (e.g., frequency, amplitude, DC offset, modulation, FEC/ECC, type, etc.). The method 4100 also operates in step 4120 by assigning a second signal having second one or more characteristics to a second electrode (e.g., frequency, amplitude, DC offset, modulation, FEC/ECC, type, etc.). In some alternative variants of the method 4100, the method 4100 also operates in step 4130 by assigning an nth signal having nth one or more characteristics to an nth electrode (e.g., frequency, amplitude, DC offset, modulation, FEC/ECC, type, etc.), such as where n is an integer greater than or equal to 3.

The method 4100 also operates in step 4140 by driving/sensing (e.g., simultaneously driving and sensing) the first signal via the first electrode. The method 4100 operates in step 4150 by driving/sensing the second signal via the second electrode. In some alternative variants of the method 4100, the method 4100 also operates in step 4160 by driving/sensing the nth signal via the nth electrode.

The method 4100 also operates via sensing of the first signal via the first electrode, in step 4170, by detecting capacitive coupling of at least one of the second signal from the second electrode or the nth signal from the nth electrode. In some alternative variants of the method 4100, the method 4100 also operates via sensing of the second signal via the second electrode, in step 4180, by detecting capacitive coupling of at least one of the first signal from the first electrode or the nth signal from the nth electrode.

Figure 42:
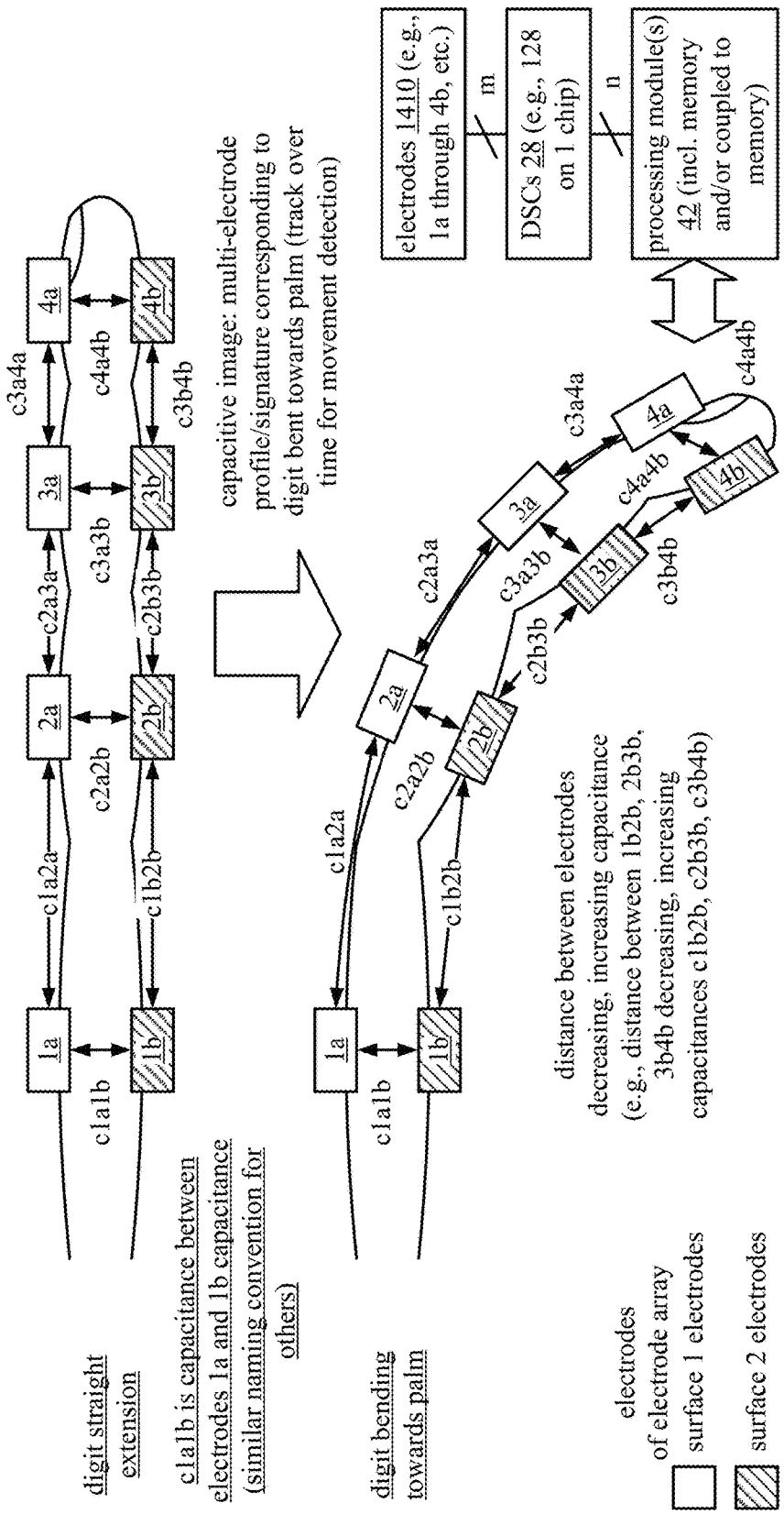
FIG. 42 is a schematic block diagram of an embodiment of varying capacitance between electrodes associated with a digit or finger in a capacitive imaging glove in accordance with the present invention.

FIG. 42 is a schematic block diagram of an embodiment 4200 of varying capacitance between electrodes associated with a digit or finger in a capacitive imaging glove in accordance with the present invention. This diagram also includes one or more processing modules 42, which may include memory and/or be coupled to memory, that is in communication with and interacts with the DSCs 28, some of which are coupled to or connected to the electrodes of the glove. In some examples, a single chip includes multiple DSCs 28, such as a 128 DSCs 28 in one particular implementation. Generally speaking, any number of DSCs 28 may be used in accordance with servicing the respective electrodes of the glove in accordance with capacitive imaging, movement detection, etc.

This diagram also shows a side view of a digit or finger showing the respective bones of the digit or finger including the metacarpal. Within a hand of the user, the metacarpal expands through the portion of the hand that includes the back and palm of the hand, and within each of the four fingers is a proximal phalanx, a middle phalanx, and a distal phalanx, and the thumb includes a proximal phalanx and a distal phalanx (i.e., the thumb has no middle phalanx).

In this example, the electrodes 1410 of the glove are located substantially or approximately opposite one another on the top and bottom of the respective segments of the digit or finger. For example, electrodes 1a and 1b are substantially or approximately opposite one another and are associated with the metacarpal. Similarly, electrodes 2a and 2b are substantially or approximately opposite one another and are associated with the proximal phalanx and so on. In addition, respective capacitances are associated with the distance between each of the respective electrodes. In the middle of the diagram, several examples of capacitances between electrodes are shown. For example, capacitance c1a1b is shown as corresponding to the capacitance between the electrodes 1a and 1b. Similarly, capacitance c1a2a is shown as corresponding to the capacitance between electrodes 1a and 2a, and so on. Note that other capacitances may also exist, such as a capacitance between electrodes 1b and 2a, which may be identified as capacitance c1b2a.

By using signal differentiation with respect to signals that are simultaneously provided to the respective electrodes of the glove and sensed the of those electrodes, a DSC 28 that is coupled to or connected to an electrode is configured to sense any other signal coupled into the electrode from one or more of the other electrodes. For example, consider a first DSC 28 that is coupled to or connected to electrode 1a. The first DSC 28 is configured to transmit a first signal via that electrode 1a and also simultaneously to detect any change of that first signal as well as one or more signals that are coupled into the electrode 1a from one or more of the other electrodes. For example, a second DSC 28 that is coupled to or connected to electrode 1b is configured to transmit a second signal via electrode 1b and simultaneously detect any change of that second signal as well as one or more signals that are coupled into the electrode 1b from one or more of the other electrodes.

As the second signal is coupled from the electrode 1b into the electrode 1a, the first DSC 28 is configured to detect the second signal that is coupled into the electrode 1a via the sensing of the first signal that the first DSC 28 provides via the electrode 1a. As the second signal is coupled into the electrode 1a, the first signal that is provided from the first DSC 28 and simultaneously sensed by the first DSC 28 will undergo a change. The first DSC 28 is configured to generate a first digital signal representative of an electrical characteristic of the electrode 1a and is based, at least in part, on the second signal being coupled into the electrode 1a. The first DSC 28 then provides the first digital signal representative of the electrical characteristic of the electrode 1a, which includes information corresponding to the second signal being coupled into the electrode 1a, to the one or more processing modules 42. The one or more processing modules 42 is configured to process the first digital signal representative of the electrical characteristic of the electrode 1a that it receives from the first DSC 28 to determine the electrical characteristic of the electrode 1a.

The electrical characteristic of the electrode 1a may include one or more of impedance Z, change of impedance Z, capacitance, and/or change of its capacitance. In some examples, the one or more processing modules 42 is configured to process the first digital signal representative of the impedance Z (e.g., capacitive reactance, Xc) of the electrode 1a that it receives from the first DSC 28 to determine the change of impedance Z (e.g., capacitive reactance, Xc) of the electrode 1a. Knowing the impedance Z (e.g., capacitive reactance, Xc) of the electrode 1a, and also knowing one or more characteristics or properties of the first signal and/or second signal, the one or more processing modules 42 configured to determine distance between the electrode 1a and the electrode 1b (e.g., in accordance with the principles described herein relating capacitance between electrodes to the distance between them).

Consider an example by which the signals that are provided from the DSCs 28 respectively to the respective electrodes 1410 of the glove are differentiated by frequency, then the one or more processing modules 42 is operative to perform signal processing on the first digital signal representative of the electrical characteristic of the electrode 1a that is provided from the first DSC 28 to determine electrical characteristic of the electrode 1a. Based on information related to the frequency of the second signal, the one or more processing modules 42 is configured to perform frequency selective filtering to identify the second signal that has been coupled into the electrode 1a from the electrode 1b. Knowing the frequencies of the respective signals, the one or more processing modules 42 is configured to first digital signal representative of the electrical characteristic of the electrode 1a that it receives from the first DSC 28 to determine the electrical characteristic of the electrode 1a and particularly to identify signals coupled into the electrode 1a from one or more other electrodes of interest.

Note that by employing signals provided to the respective electrodes 1410 having one or more orthogonal characteristics, such as being included in a basis signal set of orthogonal signals (e.g., differentiated by frequency in one implementation), the one or more processing modules 42 is configured to look for and detect those particular signals of interest, when present.

For example, knowing the frequency of the second signal that is provided from the second DSC 28 to the electrode 2a and is coupled into the electrode 1a from the electrode 2a, the one or more processing modules 42 is configured to perform appropriate filtering of the first digital signal representative of the electrical characteristic of the electrode 1a that it receives from the first DSC 28 to determine the presence therein of the second signal 2a is present based on the appropriate filtering governed by the knowledge of the frequency of the second signal that is provided from the second DSC 28 to the electrode 2a and, when present, one or more characteristics of the second signal 2a. Generally speaking, the one or more processing modules 42 is configured to perform appropriate filtering of the first digital signal representative of the electrical characteristic of the electrode 1a that it receives from the first DSC 28 to determine the presence therein of any other possible signals of interest that may be provided from other DSCs 28 to other electrodes of the glove and, when present, one or more characteristics of those other possible signals of interest.

In certain examples, the one or more processing modules 42 is configured to perform appropriate filtering of respective digital signals provided from the respective DSCs 28 looking particularly for specific other signals that have been coupled into those signals based on a mapping of certain electrodes of interest to the glove. In some examples, when processing a digital signal provided from a particular DSC 28, one or more processing modules 42 is configured to look particularly for some, but not all, of the signals that are provided from the DSCs to the electrodes of the glove. When processing a digital signal provided from a DSC 28 that services an electrode (e.g., the digital signal is representative of an electrical characteristic of that electrode), the one or more processing modules 42 is configured to process the digital signal and particularly look for signals of interest that would be coupled into the electrode from one or more other electrodes of interest. In some instances, the other electrode of interest are located in proximity to the electrode and/or may come in close proximity to the electrode as a user interacts with the glove. For example, consider an electrode at the end of the index finger and another electrode at the end of the thumb. As the user interacts with the glove, those two electrodes may come in close proximity with one another, even if they may not necessarily in close proximity of one another when the glove is not in use (e.g., the glove laying on a table with the digits of the glove being spread apart).

For example, consider the electrode 1a having some, but not all, of the other electrodes of the glove being electrodes of interest and signals that may be coupled from those some, but not all, of the other electrodes of the glove being signals of interest. In one example, electrodes 1b and 2a are electrodes of interest to the electrode 1a and signals 1b and 2a are signals of interest (e.g., signals 1b and 2a being signals that are provided from respective DSCs 28 to the electrodes 1b and 2a). The one or more processing modules 42 is configured to receive a digital signal from a DSC 28 that services electrode 1a, such that the digital signal from the DSC 28 is representative of an electrical characteristic of the electrode 1a. The one or more processing modules 42 is configured to perform appropriate filtering of the digital signal to determine the presence therein of the signals 1b and 2a based on the appropriate filtering governed by the knowledge of the frequency of the signals 1b and 2a and, when present, one or more characteristics of the signals 1b and 2a.

Note that the with respect to any electrode and its respective signal, note that any desired other one or more electrodes and other signals of interest may be associated with a given electrode unsuspected signal. In one example, consider electrode 1a and its respective signal, then electrodes 2a, 1b, and 2b are the electrodes and respective signals of interest. In another example, consider electrode 1a and its respective signal, electrodes 2a, and 1b are the electrodes and respective signals of interest. In yet another example, consider electrode 1a and its respective signal, then only electrode 1b is the electrode and respective signal of interest. The particular mapping of electrodes and their respective signals of interest to a the given electrode and its respective signal may be made in any desired manner any particular implementation. In some examples, those electrodes and closest proximity to a given electrode are selected and mapped to be the electrodes and respective signals of interest.

Note that the one or more processing modules 42 is configured to process the respective digital signals provided from the DSCs 28 that service the electrodes 1410 of the glove (e.g., including electrodes 1a, 1b, 2a, 2b, etc. through 4b) to determine the respective impedances Zs (e.g., capacitive reactances, capacitances) associated with the electrodes 1410. In addition, in some instances, based on the signal differentiation between the respective signals that are respectively provided from the DSCs 28 to the electrodes 1410 and simultaneously sensed by the DSCs 28, and based on knowledge of the signal assignment of which particular signals are provided from which particular DSCs to which electrodes 1410, the one or more processing model 1410 is operative to perform appropriate filtering to identify which signals of interest are being coupled into any given signal. Then, based on the determination of the impedances Zs (e.g., capacitive reactances, capacitances) associated with the electrodes 1410, the one or more processing modules is configured to determine distance between the various electrodes in accordance with the principles described herein and which capacitance between two electrodes is inversely proportional to the distance between the two electrodes.

As can be seen at the bottom of the diagram, as the digit of the glove changes position from a digit straight extension position to a digit bending towards palm position. As can be seen when moving downward in the diagram, the distance between certain electrodes will change based on the change of position of the respective electrodes of the glove based on the change of position of the digit by the user of the glove. As can be seen when moving downward in the diagram, as the distance between certain electrodes decreases, there will be increase in capacitance between those particular electrodes. Alternatively, as the distance between certain electrodes increases, there will be a decrease in capacitance between those particular electrodes.

The one or more processing modules 42 is configured to process the respective capacitances detected for the respective electrodes of the glove to generate a capacitive image corresponding to the respective impedances Zs (e.g., capacitive reactances, capacitances) associated with the electrodes 1410. For example, the one or more processing modules 42 is configured to generate the information corresponding to a first capacitive image corresponding to a first time and facilitate its storage in memory. Then, the one or more processing modules 42 is configured to generate the information corresponding to a second capacitive image corresponding to a second time (e.g., after the first time) and facilitate its storage in memory. The one more processing modules 42 is also configured to compare the first capacitive image and the second capacitive image, and based on differences between them, to determine movement detection of any one or more portions of a user's hand when interacting with the glove.

Also, based on comparison of that capacitive image with one or more other capacitive images that are generated at one or more different times, the one or more processing modules 42 is configured to perform movement detection of any one or more portions of a user's hand when interacting with the glove. In certain embodiments, the one or more processing modules 42 is configured to monitor and track the change of capacitance of the respective electrodes over time (e.g., monitor and track change of the capacitive image associated with the electrodes of the glove over time). The one or more processing modules 42 is configured to compare the respective capacitive images that have been generated at different respective times, and based on differences between them, to determine movement detection of any one or more portions of a user's hand when interacting with the glove.

Also, in some examples, one or more processing modules 42 is configured to compare the one or more capacitive images to one or more databases that include information corresponding to known capacitive images that are associated with known positions of a hand of the user was interacting the glove. For example, such one or more databases of information may be generated based on generating such capacitive images of a hand of a user interacting with the glove and storing those capacitive images along with information regarding the particular hand position, movement, etc. that the hand was undergoing as the user was interacting with the glove.

For example, consider at a first time that a user of the glove has the hand making a fist, then based on the one or more processing modules 42 generating a capacitive image of the glove when the hand is in that particular known position, the one or more processing modules 42 may also associate that particular capacitive image with that particular known position of the hand of a user of the glove. For another example, consider a second time that a user of the glove has the hand making a thumbs up, then based on the one or more processing modules 42 generating another capacitive image of the glove when the hand is in that particular known position, the one or more processing modules 42 may also associate that particular capacitive image with that particular known position of the hand of a user of the glove. For yet another example, consider at a second time that a user of the glove is pointing the index finger and the three other fingers and that thumb are folded back towards the palm of the hand of the glove, perhaps also including information that the thumb is placed particularly over the middle finger in that position, then based on the one or more processing modules 42 generating yet another capacitive image of the glove when the hand is in that particular known position, the one or more processing modules 42 may also associate that particular capacitive image with that particular known position of the hand of a user of the glove. Generally speaking, generation of such a database may be performed using such a system has a user of the glove is interacting with the glove. The one or more processing modules 42 is configured to utilize such information of such a database is only when making determination of the particular position of the hand of the user of the glove.

Figure 43:
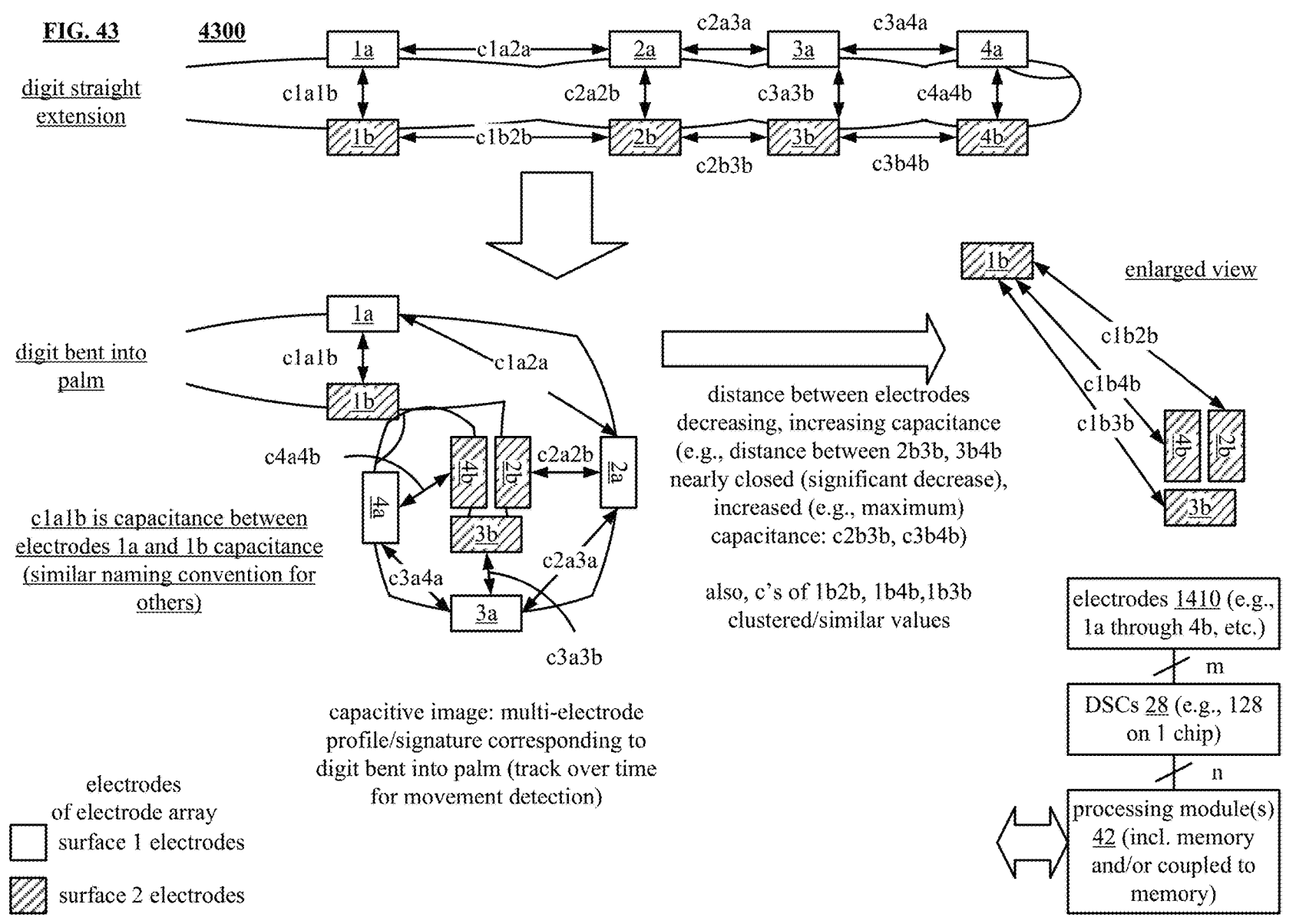

FIG. 43 is a schematic block diagram of another embodiment 4300 of varying capacitance between electrodes associated with a digit or finger in a capacitive imaging glove in accordance with the present invention. This diagram has similarities with the prior diagram with at least one difference being that it shows movement of the digits from a digit straight extension position to a digit bending very tightly back inwards towards the palm such as in accordance with a user of the glove possibly making a first or alternatively bending only this digit very tightly back inwards towards the palm. This diagram shows a different change of position of the digit of the user of the glove. As can be seen, the capacitances between the different respective electrodes will be different based on this position of the digit of the user of the glove in comparison to the prior diagram.

As described above, based on modeling and one or more database that store information associated with different respective capacitive images of the glove and particularly those respective capacitive images of the glove being associated with different respective positions of one or more portions of the hand of the user of the glove, the one or more processing modules 42 is configured to determine the particular position of the hand of the user of the glove based on comparison of the current capacitive image of the glove to information stored within the database and/or one or more models that correspond such passive images of the glove to various positions of one or more portions of the hand of the user of the glove.

As can be seen when moving downward in the diagram, the distance between certain electrodes will change based on the change of position of the respective electrodes of the glove based on the change of position of the digit by the user of the glove. As can be seen when moving downward in the diagram, as the distance between certain electrodes decreases, there will be increase in capacitance between those particular electrodes. Alternatively, as the distance between certain electrodes increases, there will be a decrease in capacitance between those particular electrodes.

FIG. 44 is a schematic block diagram of another embodiment 4400 of varying capacitance between electrodes associated with a digit or finger in a capacitive imaging glove in accordance with the present invention. As also described above, with respect to a particular electrode, it may have some, but not all, of the other electrodes of the glove being electrodes of interest and corresponding signals of interest. In this diagram, consider electrode 2*b* as an electrode for which corresponding electrodes of interest and signals of interest are being identified and mapped for use in digit movement detection (considering electrodes of interest and signals of interest within a given digit). Some examples of identification and mapping of electrodes of interest and signals of interest for digit movement detection are provided.

In one example, on the lower left portion of the diagram, consider electrode 2*b* with electrodes 1*a* 2*a* 3*a* 1*b* and 3*b* are the corresponding electrodes of interest and signals that may be coupled from electrodes 1*a* 2*a* 3*a* 1*b* and 3*b* are the corresponding signals of interest. In an example of operation and implementation, the one or more processing modules 42 is configured to receive a digital signal from a DSC 28 that services electrode 2*b*, such that the digital signal from the DSC 28 is representative of an electrical characteristic of the electrode 2*b*. The one or more processing modules 42 is configured to perform appropriate filtering of the digital signal to determine the presence therein of the signals 1*a* 2*a* 3*a* 1*b* and 3*b* (e.g., from electrodes 1*a* 2*a* 3*a* 1*b* and 3*b*) based on the appropriate filtering governed by the knowledge of the frequency of the signals 1*a* 2*a* 3*a* 1*b* and 3*b* and, when present, one or more characteristics of the signals 1*a* 2*a* 3*a* 1*b* and 3*b*. The one or more processing modules 42 is configured to look for and detect those particular signals of interest based on their orthogonality (e.g., based on the signals being differentiated by frequency).

In another example, on the lower right portion of the diagram, consider electrode 2*b* with electrodes 2*a* 1*b* 3*b* and 4*b* are the corresponding electrodes of interest and signals that may be coupled from electrodes 2*a* 1*b* 3*b* and 4*b* are the corresponding signals of interest. Note that while electrode 4*b* is not necessarily in the closest proximity to the electrode 2*b*, during change of position of the digit of a user of the glove, such as when the user of the glove is bending the digit very tightly inward towards the palm of the hand as depicted in FIG. 43, a signal being coupled into electrode 2*b* from electrode 4*b* may be of interest and useful in determining the capacitive image of the hand of the user of the glove.

In an example of operation and implementation, the one or more processing modules 42 is configured to receive a digital signal from a DSC 28 that services electrode 2*b*, such that the digital signal from the DSC 28 is representative of an electrical characteristic of the electrode 2*b*. The one or more processing modules 42 is configured to perform appropriate filtering of the digital signal to determine the presence therein of the signals 2*a* 1*b* 3*b* and 4*b* (e.g., from electrodes 2*a* 1*b* 3*b* and 4*b*) based on the appropriate filtering governed by the knowledge of the frequency of the signals 1*a* 2*a* 1*b* 3*b* and 4*b* and, when present, one or more characteristics of the signals 2*a* 1*b* 3*b* and 4*b*. The one or more processing modules 42 is configured to look for and detect those particular signals of interest based on their orthogonality (e.g., based on the signals being differentiated by frequency).

FIG. 45 is a schematic block diagram of another embodiment 4500 of varying capacitance between electrodes associated with a digit or finger in a capacitive imaging glove in accordance with the present invention. In this diagram, consider electrode 4*a* as an electrode for which corresponding electrodes of interest and signals of interest are being identified and mapped.

In one example, on the lower left portion of the diagram, consider electrode 4*a* with electrodes 3*a* 3*b* and 4*b* are the corresponding electrodes of interest and signals that may be coupled from electrodes 3*a* 3*b* and 4*b* are the corresponding signals of interest. In an example of operation and implementation, the one or more processing modules 42 is configured to receive a digital signal from a DSC 28 that services electrode 4*a*, such that the digital signal from the DSC 28 is representative of an electrical characteristic of the electrode 4*a*. The one or more processing modules 42 is configured to perform appropriate filtering of the digital signal to determine the presence therein of the signals 3*a* 3*b* and 4*b* (e.g., from electrodes 3*a* 3*b* and 4*b*) based on the appropriate filtering governed by the knowledge of the frequency of the signals 3*a* 3*b* and 4*b* and, when present, one or more characteristics of the signals 3*a* 3*b* and 4*b*. The one or more processing modules 42 is configured to look for and detect those particular signals of interest based on their orthogonality (e.g., based on the signals being differentiated by frequency).

In another example, on the lower right portion of the diagram, consider electrode 4*a* with electrodes 2*a* 2*b* 3*a* 3*b* and 4*b* are the corresponding electrodes of interest and signals that may be coupled from electrodes 2*a* 2*b* 3*a* 3*b* and 4*b* are the corresponding signals of interest. Note that while electrode 2*a* and 2*b* are not necessarily in the closest proximity to the electrode 4*a*, during change of position of the digit of a user of the glove, such as when the user of the glove is bending the digit very tightly inward towards the palm of the hand as depicted in FIG. 43, a signal being coupled from electrodes 2*a* and 2*b* into electrode 4*a* may be of interest and useful in determining the capacitive image of the hand of the user of the glove.

In an example of operation and implementation, the one or more processing modules 42 is configured to receive a digital signal from a DSC 28 that services electrode 4*a*, such that the digital signal from the DSC 28 is representative of an electrical characteristic of the electrode 4*a*. The one or more processing modules 42 is configured to perform appropriate filtering of the digital signal to determine the presence therein of the signals 2*a* 2*b* 3*a* 3*b* and 4*b* (e.g., from electrodes 2*a* 2*b* 3*a* 3*b* and 4*b*) based on the appropriate filtering governed by the knowledge of the frequency of the signals 2*a* 2*b* 3*a* 3*b* and 4*b* and, when present, one or more characteristics of the signals 2*a* 2*b* 3*a* 3*b* and 4*b*. The one or more processing modules 42 is configured to look for and detect those particular signals of interest based on their orthogonality (e.g., based on the signals being differentiated by frequency).

Regardless of the particular mapping is used in a given time, and note that the mapping of electrodes to one or more other electrodes of interest and corresponding signals of interest made be different in different examples, and may be modified and changed at different times as desired within any given example.

Note that the one or more processing modules 42 is configured to process the respective digital signals provided from the DSCs 28 that service the electrodes 1410 of the glove (e.g., including electrodes 1*a*, 1*b*, 2*a*, 2*b*, etc. through 4*b*) to determine the respective impedances Zs (e.g., capacitive reactances, capacitances) associated with the electrodes 1410. In addition, in some instances, based on the signal differentiation between the respective signals that are respectively provided from the DSCs 28 to the electrodes 1410 and simultaneously sensed by the DSCs 28, and based on knowledge of the signal assignment of which particular signals are provided from which particular DSCs to which electrodes 1410, the one or more processing model 1410 is operative to perform appropriate filtering to identify which signals of interest are being coupled into any given signal. Then, based on the determination of the impedances Zs (e.g., capacitive reactances, capacitances) associated with the electrodes 1410, the one or more processing modules is configured to determine distance between the various electrodes in accordance with the principles described herein and which capacitance between two electrodes is inversely proportional to the distance between the two electrodes.

Generally speaking, such identification and mapping of electrodes of interest and signals of interest for any given electrode of the glove may be performed. In some examples, every electrode of the glove has one or more corresponding electrodes of interest and signals of interest mapped to it such that capacitive imaging of the glove may be performed using all the available electrodes. In other examples, fewer than all of the electrodes of the glove have one or more corresponding electrodes of interest and signals of interest mapped to it such that capacitive imaging of the glove may be performed using a subset of all available electrodes. In addition, for different respective applications, different identification and mapping of electrodes of interest and signals of interest for the electrodes of the glove is performed. For example, considering an application in which less than full granularity and resolution of capacitive imaging of the glove is being performed, then fewer than all of the electrodes of the glove may not be used in accordance with such capacitive imaging of the glove. Considering an application in which full granularity and resolution of capacitive imaging of the glove is being performed, then all of the electrodes of the glove may be used in accordance with such capacitive imaging of the glove.

In addition, in some examples, note that different identification and mapping of electrodes of interest and signals of interest is performed for a given electrode depending on the particular operation being performed in accordance with capacitive imaging with above. For example, to perform digit movement detection based on capacitive imaging, an electrode has a first group of electrodes of interest and signals of interest that are mapped to it. However, to perform inter-digit movement detection based on capacitive imaging, that same electrode may have a first group of electrodes of interest and signals of interest that are mapped to it. The one or more processing modules 42 is configured to look for and detect those particular signals of interest based on their orthogonality (e.g., based on the signals being differentiated by frequency) and specifically based on which particular mode of operation is being performed.

For example, when performing digit movement detection based on capacitive imaging, the one or more processing modules 42 is configured to perform appropriate filtering of a digital signal that is provided from a DSC 28 that services the electrode to determine the presence therein of the first group of signals of interest corresponding to the first group of electrodes of interest that are particularly mapped for digit movement detection based on capacitive imaging. However, when performing inter-digit movement detection based on capacitive imaging, the one or more processing modules 42 is configured to perform appropriate filtering of the digital signal that is provided from a DSC 28 that services the electrode to determine the presence therein of the second group of signals of interest corresponding to the first group of electrodes of interest that are particularly mapped for inter-digit movement detection based on capacitive imaging. In some instances, note that the first group of electrodes of interest and the second group of electrodes of interest include one or more common electrodes.

FIG. 46 is a schematic block diagram of another embodiment of a method 4600 for execution by one or more devices in accordance with the present invention. The method 4600 operates in step 4610 by driving/sensing (e.g., simultaneously driving and sensing) a first signal via a first electrode associated with a digit of a capacitive imaging glove. The method 4600 also operates via sensing of the first signal via the first electrode, in step 4620, by detecting capacitive coupling of one or more other signals of interest (e.g., differentiated from one another and the first signal by frequency) to the first electrode associated with the digit of the capacitive imaging glove from a corresponding one or more other electrodes of interest also associated with the digit of the capacitive imaging glove (e.g., that are assigned to be looked for, detected, etc. via the first electrode in accordance with digit movement detection based on capacitive imaging).

The method 4600 operates in step 4630 by performing processing (e.g., filtering) of the first signal based on the signal differentiation to determine presence of the one or more other signals of interest being coupled therein (e.g., frequency selective filtering looking for the one or more frequencies).

The method 4600 also operates in step 4640 by, based on a determination of presence of the one or more other signals of interest being coupled therein, determining an electrical characteristic of the first electrode of the capacitive imaging glove (e.g., impedance, capacitive reactance, capacitance, etc. of the electrode). The method 4600 operates in step 4650 by generating data corresponding to distances between the first electrode and the one or more other electrodes of interest of the capacitive imaging glove based on the electrical characteristic of the first electrode of the capacitive imaging glove.

The method 4600 also operates in step 4660 by generating capacitive image data representative of a shape and/or change thereof of the digit of the capacitive imaging glove based on the distances between the first electrode and the one or more other electrodes of interest of the capacitive imaging glove in accordance with digit movement detection based on capacitive imaging.

Figure 47:
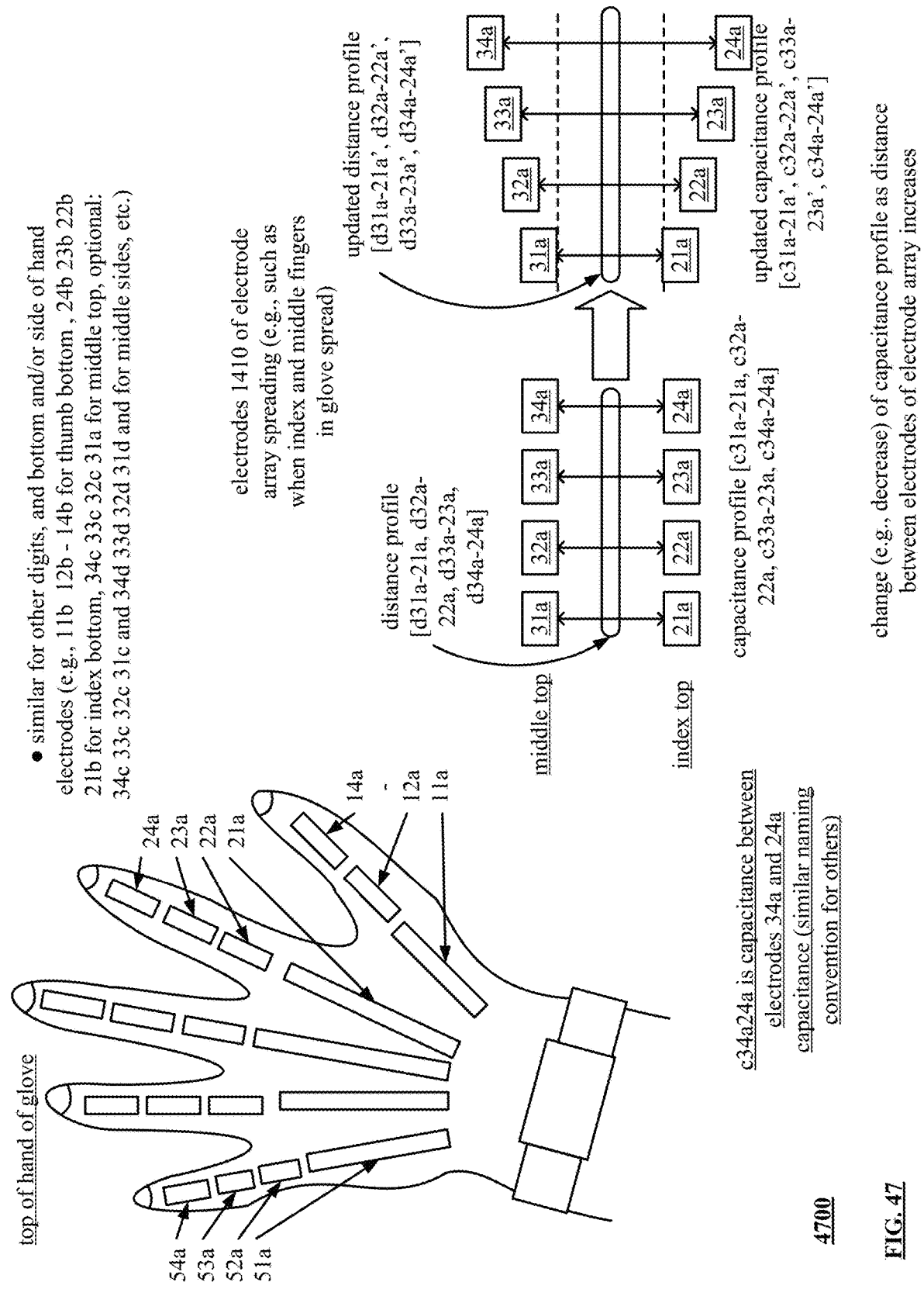
FIG. 47 is a schematic block diagram of an embodiment of varying capacitance between electrodes associated with more than one digit or finger in a capacitive imaging glove in accordance with the present invention.

FIG. 47 is a schematic block diagram of an embodiment 4700 of varying capacitance between electrodes associated with more than one digit or finger in a capacitive imaging glove in accordance with the present invention. The top left of this diagram shows a view of the top of the hand of the glove that includes electrodes therein. This particular implementation includes electrodes similarly implemented as within FIG. 29 such that they are implemented using elongated electrodes that are tailored generally to the skeletal structure of the digits of a hand of the user of the glove. Generally speaking, note that the electrodes may be implemented in any desired manner including any of those described herein.

Considering electrodes implemented on the back of the hand of the glove, a numbering convention for the electrodes of the glove are provided for the five digits of the glove. For the thumb, beginning with the electrode corresponding to the metacarpal of the thumb, 11*a*; for the electrode corresponding to the proximal phalanx of the thumb, 12*a*; and for the electrode corresponding to the distal phalanx of the thumb, 14*a* (the thumb does not include a middle phalanx and therefore does not include an electrode 13*a*). For the index finger, beginning with the electrode corresponding to the metacarpal of the index finger, 21*a*; for the electrode corresponding to the proximal phalanx of the index finger, 22*a*; for the electrode corresponding to the middle phalanx of the index finger, 23*a*; and for the electrode corresponding to the distal phalanx of the index finger, 24*a*. Similar numbering convention is for the other electrodes of the glove.

Note also that other electrodes may be implemented on the palm of the hand of the glove, and using a similar numbering convention, for the thumb, beginning with the electrode corresponding to the metacarpal of the thumb, 11*b*; for the electrode corresponding to the proximal phalanx of the thumb, 12*b*; and for the electrode corresponding to the distal phalanx of the thumb, 14*b* (the thumb does not include a middle phalanx and therefore does not include an electrode 13*b*), and so on for the other digits. For example, consider the electrodes 11*a* and 11*b* being implemented substantially or approximately oppositely one another (e.g., one on the back of the hand of the glove and the other on the palm of the glove corresponding to the metacarpal of the thumb), and consider the electrodes 12*a* and 12*b* being implemented substantially or approximately oppositely located around the perimeter of a cross-section of the thumb of the glove, and so on for the other digits of the glove.

The right-hand side of the diagram shows the distance profile and corresponding capacitance profile between some of the electrodes of the glove. For example, considering the electrodes 34*a* 33*a* 32*a* 31*a* and the electrodes 24*a* 23*a* 22*a* 21*a* as corresponding to the electrodes of the middle top digit of the glove and the index top digit of the glove, respectively, then the corresponding capacitance distance profile and corresponding capacitance profile exists between the electrodes. In one example, consider the middle and index digits to be parallel to one another, then the distance profile and corresponding capacitance profile would be substantially or approximately uniform. In another example, consider the middle and index digits to be spread apart such as if a user of the glove was making peace symbol with those two digits, then the distance profile and corresponding capacitance profile would be modified accordingly, with capacitance being reduced moving towards the end of the digits based on the distance between those digits increasing when moving towards the end of the digits.

For example, a distance profile associated with this particular group of electrodes to be distance profile [d31a-21a, d32a-22a, d33a-23a, d34a-24a] effectuates a corresponding capacitance profile [c31a-21a, c32a-22a, c33a-23a, c34a-24a] associated with the respective distances between particular electrodes. Changes (e.g., the middle and index digits to be spread apart such as if a user of the glove was making peace symbol with those two digits), then an updated distance profile [d31a-21a', d32a-22a', d33a-23a', d34a-24a'] effectuates a corresponding updated capacitance profile updated capacitance profile [c31a-21a', c32a-22a', c33a-23a', c34a-24a'].

As described above respect to identification and mapping of electrodes of interest and signals of interest is performed for a given electrode for digit movement detection, identification and mapping of electrodes and signals of interest is also performed for the electrode for inter-digit movement detection. Some examples of identification and mapping of electrodes of interest and signals of interest for inter-digit movement detection are provided.

Figure 48:
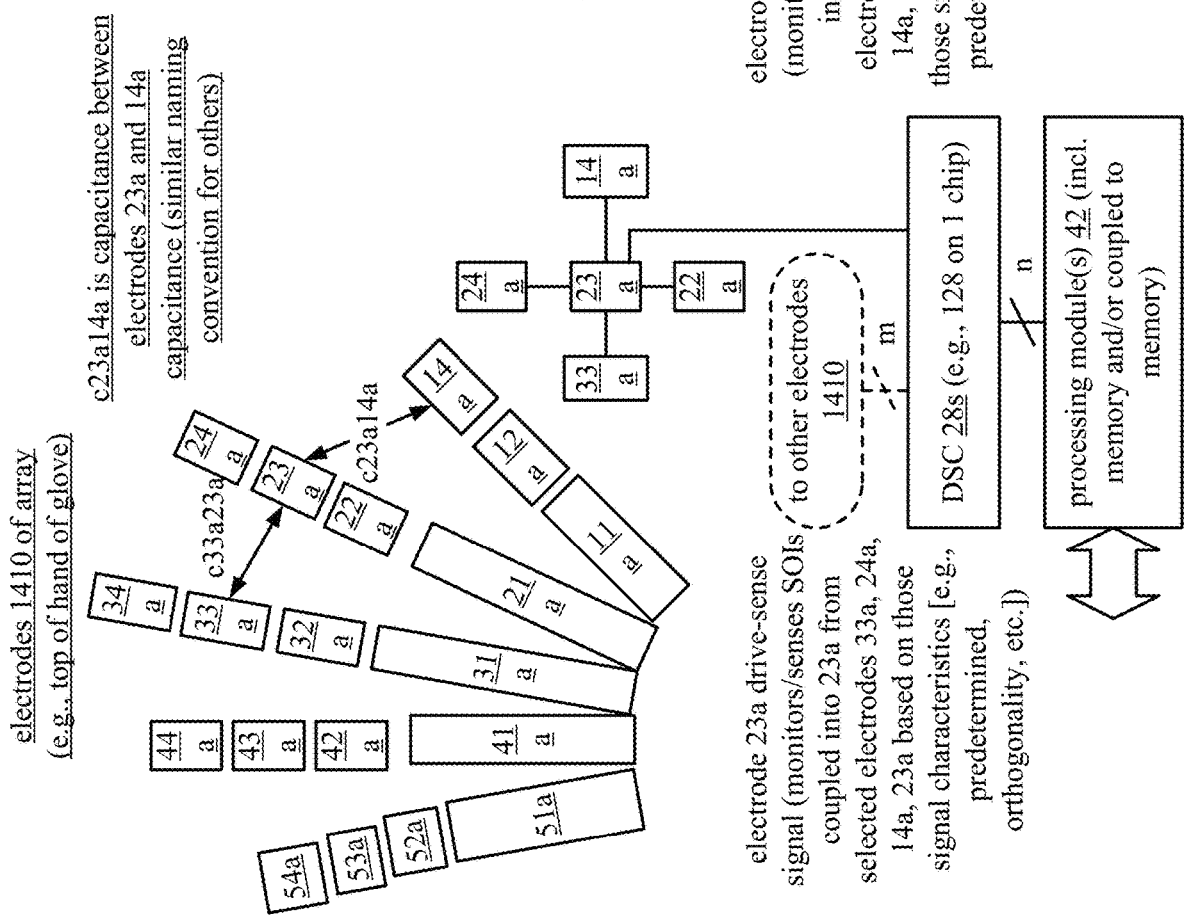
FIG. 48 is a schematic block diagram of another embodiment of varying capacitance between electrodes associated with more than one digit or finger in a capacitive imaging glove in accordance with the present invention.

FIG. 48 is a schematic block diagram of another embodiment 4800 of varying capacitance between electrodes associated with more than one digit or finger in a capacitive imaging glove in accordance with the present invention. As also described above, with respect to a particular electrode, it may have some, but not all, of the other electrodes of the glove being electrodes of interest and corresponding signals of interest. In this diagram, consider electrode 23a as an electrode for which corresponding electrodes of interest and signals of interest are being identified and mapped for use in inter-digit movement detection (considering electrodes of interest and signals of interest within a given digit and also other digits). Some examples of identification and mapping of electrodes of interest and signals of interest for inter-digit movement detection are provided.

In one example, on the lower left portion of the diagram, consider electrode 23a with electrodes 24a 33a 22a and 14a are the corresponding electrodes of interest and signals that may be coupled from electrodes 24a 33a 22a and 14a are the corresponding signals of interest. In an example of operation and implementation, the one or more processing modules 42 is configured to receive a digital signal from a DSC 28 that services electrode 23a, such that the digital signal from the DSC 28 is representative of an electrical characteristic of the electrode 23a. The one or more processing modules 42 is configured to perform appropriate filtering of the digital signal to determine the presence therein of the signals 24a 33a 22a and 14a (e.g., from electrodes 24a 33a 22a and 14a) based on the appropriate filtering governed by the knowledge of the frequency of the signals 1a 24a 33a 22a and 14a and, when present, one or more characteristics of the signals 24a 33a 22a and 14a. The one or more processing modules 42 is configured to look for and detect those particular signals of interest based on their orthogonality (e.g., based on the signals being differentiated by frequency).

In another example, on the lower right portion of the diagram, consider electrode 23a with electrodes 24a 24b 33b 33a 23b 22a 14b and 14a are the corresponding electrodes of interest and signals that may be coupled from electrodes 24a 24b 33b 33a 23b 22a 14b and 14a are the corresponding signals of interest. Note that electrodes having a b suffix correspond to those implemented on the palm of the glove. In an example of operation and implementation, the one or more processing modules 42 is configured to receive a digital signal from a DSC 28 that services electrode 23a, such that the digital signal from the DSC 28 is representative of an electrical characteristic of the electrode 23a. The one or more processing modules 42 is configured to perform appropriate filtering of the digital signal to determine the presence therein of the signals 24a 24b 33b 33a 23b 22a 14b and 14a (e.g., from electrodes 24a 24b 33b 33a 23b 22a 14b and 14a) based on the appropriate filtering governed by the knowledge of the frequency of the signals 24a 24b 33b 33a 23b 22a 14b and 14a and, when present, one or more characteristics of the signals 24a 24b 33b 33a 23b 22a 14b and 14a. The one or more processing modules 42 is configured to look for and detect those particular signals of interest based on their orthogonality (e.g., based on the signals being differentiated by frequency).

Figure 49:
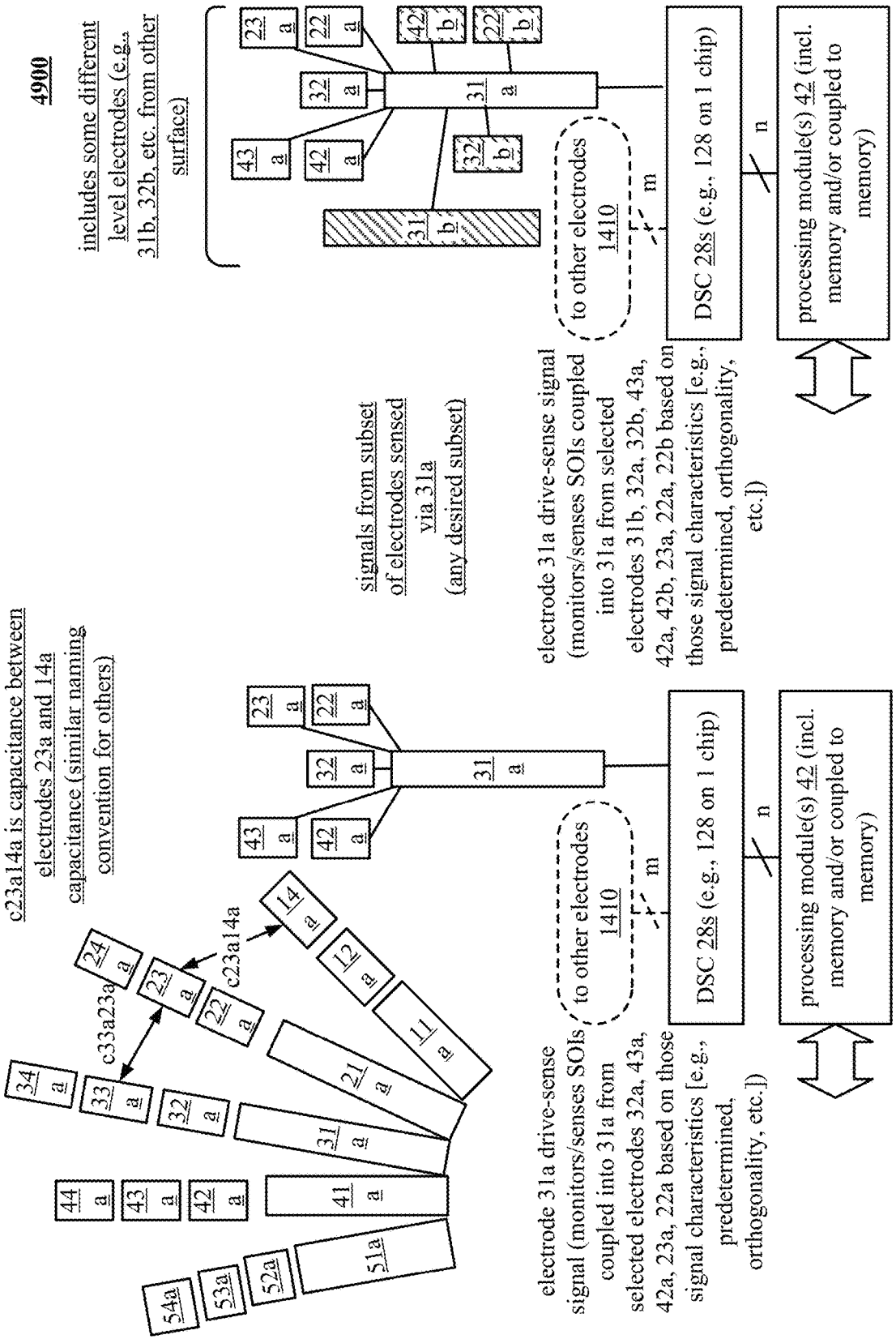
FIG. 49 is a schematic block diagram of another embodiment of varying capacitance between electrodes associated with more than one digit or finger in a capacitive imaging glove in accordance with the present invention.

FIG. 49 is a schematic block diagram of another embodiment 4900 of varying capacitance between electrodes associated with more than one digit or finger in a capacitive imaging glove in accordance with the present invention. In this diagram, consider electrode 32a as an electrode for which the corresponding electrodes of interest and signals of interest are being identified and mapped for use in inter-digit movement detection. In this diagram, consider electrode 31a (e.g., the electrode on the back of the hand associated with the metacarpal of the middle finger) as an electrode for which corresponding electrodes of interest and signals of interest are being identified and mapped for use in inter-digit movement detection (considering electrodes of interest and signals of interest within a given digit and also other digits). Some examples of identification and mapping of electrodes of interest and signals of interest for inter-digit movement detection are provided.

In one example, on the lower left portion of the diagram, consider electrode 31a with electrodes 43a 42a 32a 23a and 22a are the corresponding electrodes of interest and signals that may be coupled from electrodes 43a 42a 32a 23a and 22a are the corresponding signals of interest. In an example of operation and implementation, the one or more processing modules 42 is configured to receive a digital signal from a DSC 28 that services electrode 31a, such that the digital signal from the DSC 28 is representative of an electrical characteristic of the electrode 31a. The one or more processing modules 42 is configured to perform appropriate filtering of the digital signal to determine the presence therein of the signals 43a 42a 32a 23a and 22a (e.g., from electrodes 43a 42a 32a 23a and 22a) based on the appropriate filtering governed by the knowledge of the frequency of the signals 43a 42a 32a 23a and 22a and, when present, one or more characteristics of the signals 43a 42a 32a 23a and 22a. The one or more processing modules 42 is configured to look for and detect those particular signals of interest based on their orthogonality (e.g., based on the signals being differentiated by frequency).

In another example, on the lower right portion of the diagram, consider electrode 31a with electrodes 31b 32a 32b 43a 42a 42b 23a 22a and 22b are the corresponding electrodes of interest and signals that may be coupled from electrodes 31b 32a 32b 43a 42a 42b 23a 22a and 22b are the corresponding signals of interest. Again, note that electrodes having a b suffix correspond to those implemented on the palm of the glove. In an example of operation and implementation, the one or more processing modules 42 is configured to receive a digital signal from a DSC 28 that services electrode 31*a*, such that the digital signal from the DSC 28 is representative of an electrical characteristic of the electrode 31*a*. The one or more processing modules 42 is configured to perform appropriate filtering of the digital signal to determine the presence therein of the signals 31*b* 32*a* 32*b* 43*a* 42*a* 42*b* 23*a* 22*a* and 22*b* (e.g., from electrodes 31*b* 32*a* 32*b* 43*a* 42*a* 42*b* 23*a* 22*a* and 22*b*) based on the appropriate filtering governed by the knowledge of the frequency of the signals 31*b* 32*a* 32*b* 43*a* 42*a* 42*b* 23*a* 22*a* and 22*b* and, when present, one or more characteristics of the signals 3 1*b* 32*a* 32*b* 43*a* 42*a* 42*b* 23*a* 22*a* and 22*b*. The one or more processing modules 42 is configured to look for and detect those particular signals of interest based on their orthogonality (e.g., based on the signals being differentiated by frequency).

Again, note that different respect to groups of electrodes of interest may be identified and mapped for different perspective purposes including digit movement detection based on capacitive imaging and inter-digit movement detection based on capacitive imaging. Several examples have been provided showing identification and mapping of electrodes of interest to a particular electrode for digit movement detection based on capacitive imaging and inter-digit movement detection based on capacitive imaging. Note that such examples are not exhaustive, and also note that alternative mappings may be performed in accordance with such principles as well. Generally speaking, for a particular electrode that is to be used in accordance with capacitive imaging, one or more other electrodes of interest are identified to assist in determining the impedance Z (e.g., capacitive reactance, Xc) and corresponding distance between that particular electrode and the one or more other electrodes of interest.

FIG. 50 is a schematic block diagram of another embodiment of a method 5000 for execution by one or more devices in accordance with the present invention. The method 5000 operates in step 5010 by driving/sensing (e.g., simultaneously driving and sensing) a first signal via a first electrode associated with a digit of a capacitive imaging glove.

The method 5000 also operates via sensing of the first signal via the first electrode, in step 5020, by detecting capacitive coupling of one or more other signals of interest (e.g., differentiated from one another and the first signal by frequency) to the first electrode of the digit of the capacitive imaging glove from a corresponding one or more other electrodes of interest associated with the digit and also at least one other digit of the capacitive imaging glove (e.g., that are assigned to be looked for, detected, etc. via the first electrode in accordance with inter-digit movement detection based on capacitive imaging).

The method 5000 operates in step 5030 by performing processing (e.g., filtering) of the first signal based on the signal differentiation to determine presence of the one or more other signals of interest being coupled therein (e.g., frequency selective filtering looking for the one or more frequencies).

The method 5000 also operates in step 5040, based on a determination of presence of the one or more other signals of interest being coupled therein, by determining an electrical characteristic of the first electrode of the capacitive imaging glove (e.g., impedance, capacitive reactance, capacitance, etc. of the electrode). The method 5000 operates in step 5050 by generating data corresponding to distances between the first electrode and the one or more other electrodes of interest associated with the digit and also the at least one other digit of the capacitive imaging glove based on the electrical characteristic of the first electrode of the capacitive imaging glove.

The method 5000 also operates in step 5060 by generating capacitive image data representative of a shape and/or change thereof of the digit and/or the at least one other digit of the capacitive imaging glove based on the distances between the first electrode and the one or more other electrodes of interest associated with the digit and also at least one other digit of the capacitive imaging glove in accordance with inter-digit movement detection based on capacitive imaging.

Figure 51:
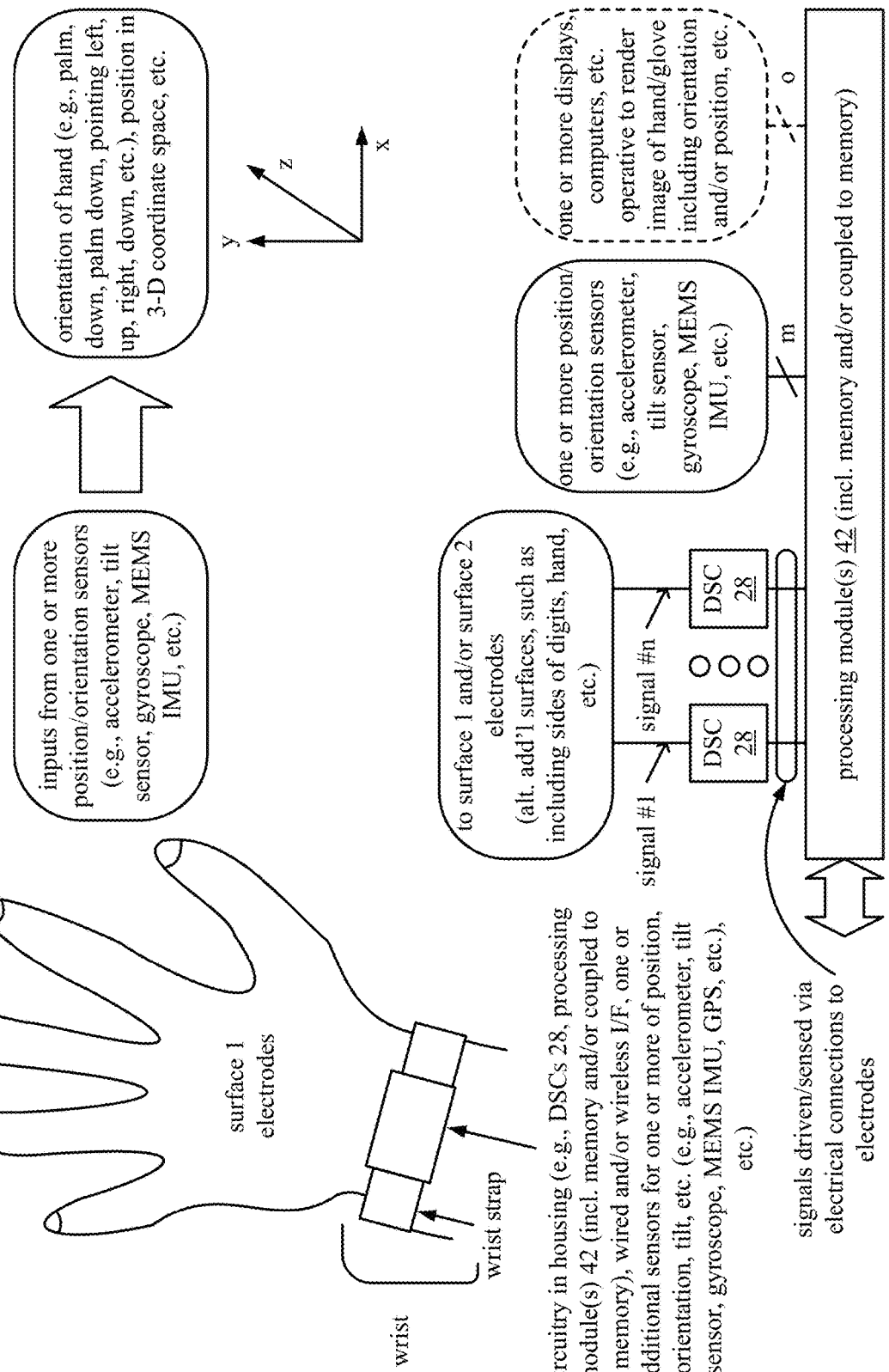
FIG. 51 is a schematic block diagram of an embodiment of circuitry implemented to drive and simultaneously sense signals having particular characteristics provided to electrodes in a capacitive imaging glove including to perform hand movement detection in a three-dimensional (3-D) space in accordance with the present invention.

FIG. 51 is a schematic block diagram of an embodiment 5100 of circuitry implemented to drive and simultaneously sense signals having particular characteristics provided to electrodes in a capacitive imaging glove including to perform hand movement detection in a three-dimensional (3-D) space in accordance with the present invention. This diagram also includes one or more processing modules 42, which may include memory and/or be coupled to memory, that is in communication with and interacts with the DSCs 28, some of which are coupled to or connected to the electrodes of the glove. For example, consider the electrodes to be associated with a surface 1 and/or a surface 2 of the glove, such as the back of the hand of the glove and the palm of the glove. In addition, the one or more processing modules 42 is configured to communicate with and interact with one or more position and/or orientation sensors that are associated with or implemented in the glove. Examples of such position and/or orientation sensors may include any one or more of an accelerometer, a tilt sensor, a gyroscope, a global positioning system (GPS) sensor, a micro-electro-mechanical systems (MEMS) inertial measurement unit (IMU), etc. Examples of accelerometer may include a three axis/triaxial, 3-D accelerometer. Examples of a gyroscope may include 3-D gyroscope. Examples of IMUs may include inertial sensors.

Also, in some examples, the one or more processing modules 42 is configured to communicate with and interact with one or more displays, computers, etc. that is operative to render image and/or video data of the glove (and may also include image and/or video of a depiction of a hand of the user of the glove) including the orientation and/or position thereof. In some examples, this is performed in reference to a 3-D coordinate space (e.g., x, y, z). The one or more processing modules 42 is configured to provide the image and/or video data of the glove to the one or more displays, computers, etc. to be displayed thereon. In some examples, the one or more processing modules 42 facilitates storage of the image and/or video data of the glove in memory for subsequent use.

The one or more processing modules 42 is configured to perform capacitive imaging of the glove in accordance with any of the various aspects, embodiments, and/or examples of the invention (and/or their equivalents). In addition, the one or more processing modules 42 is configured to receive inputs from one or more position and/or orientation sensors. Based on the capacitive imaging of the glove being performed by the one or more processing modules, and also based on information regarding the position and/or orientation of the glove (e.g., optionally with reference to a 3-D coordinate space), the one or more processing modules is configured to generate image and/or video data of the glove.

Considering an accelerometer as one of the one or more position and/or orientation sensors operative with the glove, an accelerometer includes a motion sensor that is implemented to measure acceleration force. Note that an acceleration force may be constant, such as gravity, or it may be made based on movement or vibrations of the glove. Acceleration is often defined as the measurement of the change of velocity as a function of time, such as change in velocity divided by a change in time. There are a variety of ways in which accelerometers may be implemented. Two examples include those based on the piezoelectric effect and those operating based on capacitance. With respect to an accelerometer operating based on the piezoelectric effect, a piezoelectric material is included within the sensors such that as the piezoelectric material is stressed due to acceleration forces (e.g., such as caused by a mass within the sensor compressing the piezoelectric material due to the acceleration), the piezoelectric material generates a voltage from the stress. Such an accelerometer operating based on the piezoelectric effect processes the voltage to determine velocity and orientation.

A capacitance accelerometer, which is also described herein including with respect to FIG. 53, typically includes an electrode that is configured to move based on acceleration force (e.g., a mass that is displaced as a function of acceleration) and moves closer to or farther away from one or more other electrodes (e.g., one or more other fixed electrodes), and the change of capacitance between the electrodes based on the change of distance between the electrodes is detected and interpreted to determine the amount of distance that the electrode that is configured to move has in fact moved and to determine the corresponding acceleration force that caused such movement. For example, such determination of the distance that the electrode that is configured to move has in fact may be determined in accordance with the principles described herein regarding change of capacitance between two electrodes based on the distance between them, and change thereof, is detected.

In addition, note that many accelerometers are implemented to detect acceleration along more than one axis. For example, to determine two-dimensional (2-D) movement, to accelerometers would be implemented along two separate axes. To determine three-dimensional (3-D) movement, three accelerometers would be implemented along three separate axes. When using such as a three axis/triaxial, 3-D accelerometer, 3-D positioning may be determined based on the information from the three respective accelerometers.

When the one or more position and/or orientation sensors operative with the glove includes an accelerometer, the one or more processing modules 42 is configured to communicate with and interact with the accelerometer to determine information regarding the position and/or orientation sensor of the glove.

Considering a gyroscope as one of the one or more position and/or orientation sensors operative with the glove, a gyroscope includes a motion sensor that is implemented to utilize the acceleration force of gravity of the Earth to determine orientation. Often times, a gyroscope will include some mechanism that, when rotating, will provide some indication of the central gravitational pull of the mechanism thereby indicating which direction is down and corresponding to gravity of the Earth. Mechanical gyroscopes may include a freely rotating disk called a rotor, that is implemented to rotate about an axis, and as the axis rotates, the rotor remains stationary to indicate the central gravitational pull thereby indicating which direction is down and corresponding to gravity of the Earth. Fiber-optic gyroscopes may be implemented to include a loop of optical fiber via which one or more optical signals rotates, and phase change during the rotation around the loop of optical fiber provides an indication of the central gravitational pull thereby indicating which direction is down and corresponding to gravity of the Earth. Note that an accelerometer and a gyroscope may be differentiated such that an accelerometer is a device configured to measure non-gravitational acceleration, while a gyroscope is a device configured to measure gravitational acceleration. The gyroscope may be implemented to help provide an indication of orientation such as relative to the gravity of the Earth, and an accelerometer, measuring non-gravitational acceleration such as based on vibration, and particularly a 3-D accelerometer may be implemented to provide information regarding the orientation of a device (e.g., the glove in this instance) relative to the service of the earth. When the one or more position and/or orientation sensors operative with the glove includes an accelerometer and/or gyroscope, the one or more processing modules 42 is configured to communicate with and interact with the accelerometer and/or gyroscope to determine information regarding the position and/or orientation sensor of the glove.

Considering an inertial sensor as one of the one or more position and/or orientation sensors operative with the glove, an inertial sensor is often times used to describe the combination of a 3-D accelerometer and a 3-D gyroscope (e.g., such a device that includes the sensors may be referred to as an inertial measurement unit (IMU)). A micro-electro-mechanical systems (MEMS) inertial measurement unit (IMU) is device having very low power consumption and an ability to start operation quickly while having a very small size allowing its implementation in a number of space-limiting applications. When the one or more position and/or orientation sensors operative with the glove includes an inertial sensor and/or a MEMS IMU, the one or more processing modules 42 is configured to communicate with and interact with the inertial sensor and/or a MEMS IMU e to determine information regarding the position and/or orientation sensor of the glove.

Considering a tilt sensor as one of the one or more position and/or orientation sensors operative with the glove, a tilt sensor includes a sensor that is implemented to detect orientation or inclination. Tilt sensors can be implemented extremely cheaply, as a tilt sensor may be implemented very easily using a sensor that, when oriented downward, includes some elements that provides connectivity between two portions of an electrical circuit thereby completing the circuit, and, when oriented software, include some element that does not provide such connectivity between those two portions of the electric circuit thereby opening the circuit. One particular way to implement a tilt sensor is to use a cavity that includes some type of conductive free mass that is free to move inside. Historically, a blob of mercury has been used to serve this function, however, given the toxicity and environmental problems of mercury, other appropriate materials may be selected, such as a conductive free mass, a conductive rolling ball, etc. Generally speaking, gravity operates to move the conductive free mass to a first location when the sensor is upright thereby closing the circuit, and gravity operates to move the conductive free mass to a second location when this insert is not upright, or inverted, thereby opening the circuit. Based on electrical conductivity of the circuit, the signal that is indicative of whether or not the tilt sensor is upright or not is provided. When the one or more position and/or orientation sensors operative with the glove includes a tilt sensor, the one or more processing modules 42 is configured to communicate with and interact with the accelerometer to determine information regarding the position and/or orientation sensor of the glove.

Considering a global positioning system (GPS) sensor as one of the one or more position and/or orientation sensors operative with the glove, a GPS sensor includes a GPS receiver that is implemented to perform tracking of the signals provided from GPS specialized satellites that are implemented above the earth (e.g., oftentimes in geosynchronous orbit to the earth) that operate in accordance with the tracking process that combines measurements from multiple GPS satellites that are collected at different times. The GPS receiver is configured to process the measurements received from these respective GPS satellites to estimate the location of the device (e.g., the glove in this instance) that includes the GPS sensor on earth. When the device (e.g., the glove in this instance) is moving, the GPS receiver is configured to process the measurements received from these respective GPS satellites to predict or estimate what will be the next location of the GPS sensor based on any receipt of subsequent or next signals from the respective GPS satellites. When the one or more position and/or orientation sensors operative with the glove includes a GPS sensor, the one or more processing modules 42 is configured to communicate with and interact with the accelerometer to determine information regarding the position and/or orientation sensor of the glove.

Note that such examples of various types of position and/or orientation sensors is not exhaustive, and any other type of sensor configured to provide information regarding position and/or orientation may also or alternatively be implemented within such a glove as described herein.

Figure 52:
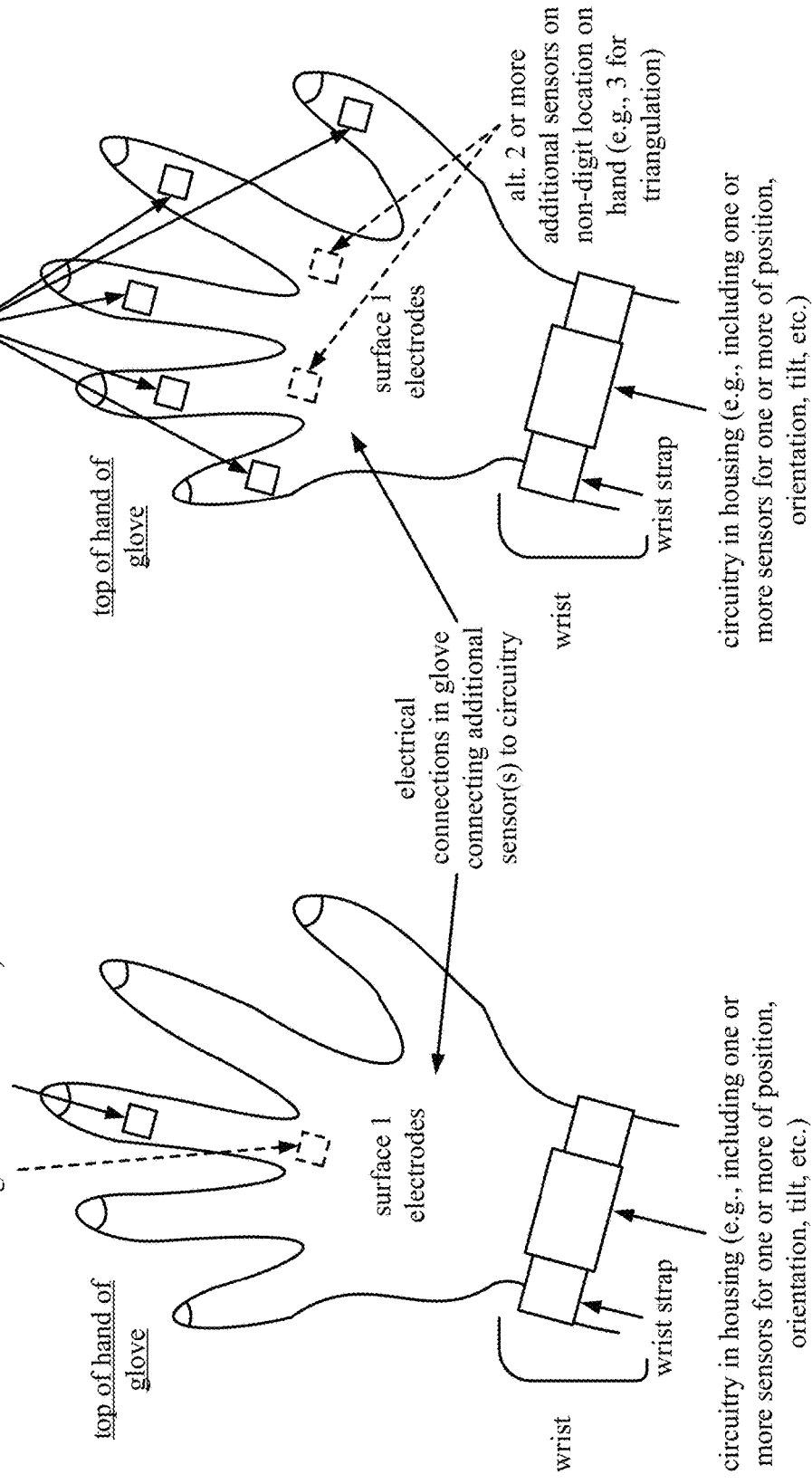
FIG. 52A is a schematic block diagram of an embodiment of at least one sensor implemented in a capacitive imaging glove to facilitate hand movement detection in a 3-D space in accordance with the present invention.
FIG. 52B is a schematic block diagram of an embodiment of multiple sensors implemented in a capacitive imaging glove to facilitate hand movement detection in a 3-D space in accordance with the present invention.

FIG. 52A is a schematic block diagram of various embodiments 5201 of at least one sensor implemented in a capacitive imaging glove to facilitate hand movement detection in a 3-D space in accordance with the present invention. This diagram shows an additional position and/or orientation sensors that is implemented with respect to the glove. For example, the additional sensor may be implemented towards the end of the middle finger of the glove. Alternatively, it may be implemented on any other digit of the glove. In some examples, the additional sensor is mounted on the back of the hand. Generally speaking, the additional sensor may be implemented anywhere as desired within the glove. Information provided by the position and/or orientation sensor included within the housing and also from the additional position and/or orientation sensor are provided to the one or more processing modules 42.

FIG. 52B is a schematic block diagram of an embodiment 5202 of multiple sensors implemented in a capacitive imaging glove to facilitate hand movement detection in a 3-D space in accordance with the present invention. This diagram shows multiple additional position and/or orientation sensors that are implemented with respect to the glove particularly on the respective digits of the glove. In some examples, the multiple additional position and/or orientation sensors are implemented towards the ends of the respective digits. Generally speaking, the additional sensor may be implemented anywhere as desired within the glove. Information provided by the position and/or orientation sensor included within the housing and also from the additional position and/or orientation sensor are provided to the one or more processing modules 42.

In certain examples, note that one or more position and/or orientation sensors may be implemented within the circuitry in the housing that is associated with the wrist strap of the glove. Also, in some examples, one or more position and/or orientation sensors is implemented in one or more other locations of the glove. Also, when multiple position and/or orientation sensors are implemented in the glove, note that one of the position and/or orientation sensors may be implemented to serve as a reference point (e.g., such as a known location with respect to the 3-D coordinate space), and one or more other position and/or orientation sensors is operative to provide information relative to and based on that reference point.

FIG. 53 is a schematic block diagram of an embodiment 5300 of a capacitance accelerometer as may be implemented within one or more sensors of a capacitive imaging glove to facilitate hand movement detection in a 3-D space in accordance with the present invention. This diagram shows one possible implementation by which a capacitive accelerometer may be implemented. Such a capacitive accelerometer may be implemented using bulk micro-machining technology and be implemented as a MEMS device. An electrode 5320 (e.g., a movable mass) is implemented as part of a chip/silicon in accordance with the cantilever type structure. A cantilever 5310 connects the electrode 5322 the chip/silicon. In some examples, the electrode 5320, sometimes referred to as a seismic mass, is free to move within the structure and between two electrodes, shown as fixed electrode 5322 and 5324. Sometimes, insulators 5330 are implemented on the top and bottom of the electrode 5322 prevent direct contact of the electrode 5320 with either of the fixed electrodes 5322 and 5324 as it moves an operation and in response to an acceleration force. The structure/housing 5390 of the capacitive accelerometer may be implemented using some insulating type material. For example, the capacitive accelerometer may be implemented between two Pyrex glass plates in accordance with electrostatic bonding.

Based on the capacitive accelerometer being exposed to an acceleration, the electrodes 5320, the seismic mass, will move and change the respective capacitances between the electrode 5320 and the fixed electrode 5322 as well as between the electrode 5320 and the fixed electrode 5324. In some examples, the capacitive difference between the two capacitors is used to interpret a measure of the acceleration to which the capacitive accelerometer has been exposed. In addition, in certain applications, the structure of such a capacitive accelerometer being symmetrical along a horizontal line drawn down the middle of the chip/silicon, the cantilever 5310, and the electrode 5320, and the fact that the electrode 5320 interacts with both fixed electrodes 5322 and 5324 in accordance with differential sensing considering both of the capacitances (e.g., both respective capacitances between the electrode 5320 and the fixed electrode 5322 as well as between the electrode 5320 and the fixed electrode 5324), and the fact that the structure/housing 5390 is typically constructed of similar material, a capacitive accelerometer implemented in accordance with such a design may have high insensitivity to environmental conditions such as thermal mismatch.

On the lower right-hand portion of the diagram, this diagram also includes one or more processing modules 42, which may include memory and/or be coupled to memory, that is in communication with and interacts with the DSCs 28, which are configured simultaneously to transmit signals to the electrode 5320 as well as the fixed electrodes 5322 and 5324 and simultaneously since those signals in accordance with the principles of operation of any desired implementation of DSC 28 including those as described herein. In some examples, the respective signals that are provided from the DSCs 28 or differentiated from one another (e.g., such as by frequency and/or any other means of differentiating including those described in). For example, signal #1 from a first DSC 28 has a first frequency, signal #2 from a second DSC 28 has a second frequency, and signal #3 from a third DSC 28 has a third frequency. In some alternative examples, note that fewer than three DSCs 28 or implemented to provide respective signals to the electrodes 5320, the fixed electrode 5322, and the fixed electrode 5324. For example, in one possible alternative example, only two DSCs 28 are implemented to provide to respective signals to the fixed electrode 5322 and the fixed electrode 5324 and simultaneously to since those signals to determine both respective capacitances between the electrode 5320 and the fixed electrode 5322 as well as between the electrode 5320 and the fixed electrode 5324.

This diagram shows the various possible implementations by which one or more DSCs 28 is configured to interface with a capacitive accelerometer, such as many limited for use within the glove as described herein, to provide information that may subsequently be provided to the one or more processing modules 42 regarding the position and/or orientation of the glove.

In addition, note that a DSC 28 may be implemented interact with any of the different types of position and/or orientation sensors as described herein, or any other position and/or orientation sensor that may be implemented within the glove, such that the DSC 28 detects an electrical characteristic of the position and/or orientation sensor and provides a digital signal representative of the electrical characteristic to the one or more processing modules 42.

FIG. 54 is a schematic block diagram of another embodiment of a method 5400 for execution by one or more devices in accordance with the present invention. The method 5400 operates in step 5410 by receiving inputs (e.g., sensing information) from one or more position and/or orientation sensors implemented within a capacitive imaging glove. The method 5400 also operates in step 5420 by processing the inputs from the one or more position and/or orientation sensors implemented within the capacitive imaging glove to generate information of the position and/or orientation of the capacitive imaging glove.

The method 5400 operates in step 5430 by processing the information of the position and/or orientation of the capacitive imaging glove to generate/render image and/or video data of the capacitive imaging glove including the position and/or orientation of the capacitive imaging glove.

The method 5400 also operates in step 5440 by providing the image and/or video data of the capacitive imaging glove including the position and/or orientation of the capacitive imaging glove to a display, computer monitor, etc. for display thereon.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A capacitive imaging glove comprising:
  a plurality of electrodes implemented throughout the capacitive imaging glove including a first electrode and a second electrode;
  a plurality of drive-sense circuits (DSCs), wherein a DSC of the plurality of DSCs, when enabled, configured to:
    receive a reference signal and to generate a signal based on the reference signal;

provide the signal to the first electrode via a single line and simultaneously to sense the signal via the single line, wherein sensing of the signal includes detection of an electrical characteristic of the first electrode, and wherein the signal is configured to be coupled from the first electrode to the second electrode via a gap between the first electrode and the second electrode within the capacitive imaging glove; and generate a digital signal representative of the electrical characteristic of the first electrode;

memory that stores operational instructions; and one or more processing modules operably coupled to the plurality of DSCs and the memory, wherein, the one or more processing modules, when enabled, is configured to execute the operational instructions to:

generate the reference signal;

process the digital signal representative of the electrical characteristic of the first electrode to determine the electrical characteristic of the first electrode;

process the electrical characteristic of the first electrode to determine a distance between the first electrode and the second electrode; and generate capacitive image data representative of a shape of the capacitive imaging glove based on the distance between the first electrode and the second electrode.

2. The capacitive imaging glove of claim 1, wherein, the one or more processing modules, when enabled, is further configured to execute the operational instructions to:

generate the capacitive image data associated with the shape of the capacitive imaging glove based on the distance between the first electrode and the second electrode and also based on a plurality of other distances between other respective electrodes of the plurality of electrodes.

3. The capacitive imaging glove of claim 1, wherein at least one of:

an electrode of the plurality of electrodes has a shape of a square, a rectangle, a circle, an oval, a diamond, a triangle, an arc, or a hexagon; or the electrode of the plurality of electrodes is implemented to curve around a portion of a digit of the capacitive imaging glove.

4. The capacitive imaging glove of claim 1, wherein, the one or more processing modules, when enabled, is further configured to execute the operational instructions to:

process the digital signal representative of the electrical characteristic of the first electrode to determine a capacitance associated with the distance between the first electrode and the second electrode, wherein the electrical characteristic of the first electrode corresponds to at least one of an impedance, a capacitive reactance, or the capacitance of the first electrode; and calculate the distance between the first electrode and the second electrode based on the capacitance associated with the distance between the first electrode and the second electrode.

5. The capacitive imaging glove of claim 1, wherein:

another DSC of the plurality of DSCs, when enabled, configured to:

receive another reference signal and to generate another signal based on the another reference signal;

provide the another signal to the second electrode via another single line and simultaneously to sense the another signal via the another single line, wherein sensing of the another signal includes detection of another electrical characteristic of the second electrode, and wherein the another signal is configured to be coupled from the second electrode to the first electrode via the gap between the first electrode and the second electrode within the capacitive imaging glove; and generate another digital signal representative of the another electrical characteristic of the second electrode;

the one or more processing modules, when enabled, is further configured to execute the operational instructions to:

generate the another reference signal;

process the another digital signal representative of the another electrical characteristic of the second electrode to determine the another electrical characteristic of the second electrode;

process the another electrical characteristic of the second electrode to determine the distance between the first electrode and the second electrode; and generate other capacitive image data representative of the shape of the capacitive imaging glove based on the distance between the first electrode and the second electrode that is determined based on the another electrical characteristic of the second electrode.

6. The capacitive imaging glove of claim 5, wherein:

the signal includes a first one or more characteristics including a first frequency; and the another signal includes a second one or more characteristics including a second frequency that is different than the first frequency.

7. The capacitive imaging glove of claim 1, wherein:

another DSC of the plurality of DSCs, when enabled, configured to:

receive another reference signal and to generate another signal based on the another reference signal;

provide the another signal to a third electrode of the plurality of electrodes via another single line and simultaneously to sense the another signal via the another single line, wherein sensing of the another signal includes detection of another electrical characteristic of the third electrode, and wherein the another signal is configured to be coupled from the third electrode to a fourth electrode of the plurality of electrodes via another gap between the third electrode and the fourth electrode within the capacitive imaging glove; and generate another digital signal representative of the another electrical characteristic of the third electrode;

the one or more processing modules, when enabled, is further configured to execute the operational instructions to:

generate the another reference signal;

process the another digital signal representative of the another electrical characteristic of the third electrode to determine the another electrical characteristic of the third electrode;

process the another electrical characteristic of the third electrode to determine another distance between the third electrode and the fourth electrode; and generate other capacitive image data representative of the shape of the capacitive imaging glove based on the another distance between the third electrode and the fourth electrode.

8. The capacitive imaging glove of claim 7, wherein:
the signal includes a first one or more characteristics including a first frequency; and
the another signal includes a second one or more characteristics including a second frequency that is different than the first frequency.

9. The capacitive imaging glove of claim 1, wherein the DSC of the plurality of DSCs further comprises:
a power source circuit operably coupled to the first electrode via the single line, wherein, when enabled, the power source circuit is configured to provide the signal that includes an alternating current (AC) component via the single line coupling to the first electrode; and
a power source change detection circuit operably coupled to the power source circuit, wherein, when enabled, the power source change detection circuit is configured to:
detect an effect on the signal that is based on the electrical characteristic of the first electrode; and
generate the digital signal representative of the electrical characteristic of the first electrode that corresponds to the distance between the first electrode and the second electrode.

10. The capacitive imaging glove of claim 9 further comprising:
the power source circuit including a power source to source at least one of a voltage or a current to the first electrode via the single line; and
the power source change detection circuit including:
a power source reference circuit configured to provide at least one of a voltage reference or a current reference based on the reference signal; and
a comparator configured to compare the at least one of the voltage or the current provided to the first electrode via the single line to the at least one of the voltage reference or the current reference to produce the signal.

11. A capacitive imaging glove comprising:
a plurality of electrodes implemented throughout the capacitive imaging glove including a first electrode and a second electrode;
a plurality of drive-sense circuits (DSCs), wherein a DSC of the plurality of DSCs, when enabled, configured to:
provide a signal that is based on a reference signal to the first electrode via a single line and simultaneously to sense the signal via the single line, wherein sensing of the signal includes detection of an impedance of the first electrode, and wherein the signal is configured to be coupled from the first electrode to the second electrode via a gap between the first electrode and the second electrode within the capacitive imaging glove; and
generate a digital signal representative of the impedance of the first electrode; memory that stores operational instructions; and
one or more processing modules operably coupled to the plurality of DSCs and the memory, wherein, the one or more processing modules, when enabled, is configured to execute the operational instructions to:
process the digital signal representative of the impedance of the first electrode to determine a capacitance associated with a distance between the first electrode and the second electrode;
process the capacitance associated with the distance between the first electrode and the second electrode to determine the distance between the first electrode and the second electrode; and
generate capacitive image data representative of a shape of the capacitive imaging glove based on the distance between the first electrode and the second electrode.

12. The capacitive imaging glove of claim 11, wherein:
the one or more processing modules, when enabled, is further configured to execute the operational instructions to generate the reference signal; and
the DSC of the plurality of DSCs, when enabled, is further configured to receive the reference signal from the one or more processing modules.

13. The capacitive imaging glove of claim 11, wherein, the one or more processing modules, when enabled, is further configured to execute the operational instructions to:
generate the capacitive image data representative of the shape of the capacitive imaging glove based on the distance between the first electrode and the second electrode and also based on a plurality of other distances between other respective electrodes of the plurality of electrodes.

14. The capacitive imaging glove of claim 11, wherein at least one of:
an electrode of the plurality of electrodes has a shape of a square, a rectangle, a circle, an oval, a diamond, a triangle, an arc, or a hexagon; or
the electrode of the plurality of electrodes is implemented to curve around a portion of a digit of the capacitive imaging glove.

15. The capacitive imaging glove of claim 11, wherein:
another DSC of the plurality of DSCs, when enabled, configured to:
provide another signal based on another reference signal to the second electrode via another single line and simultaneously to sense the another signal via the another single line, wherein sensing of the another signal includes detection of another impedance of the second electrode, and wherein the another signal is configured to be coupled from the second electrode to the first electrode via the gap between the first electrode and the second electrode within the capacitive imaging glove; and
generate another digital signal representative of the another impedance of the second electrode;
the one or more processing modules, when enabled, is further configured to execute the operational instructions to:
process the another digital signal representative of the another impedance of the second electrode to determine another capacitance associated with the distance between the first electrode and the second electrode;
process the another capacitance associated with the distance between the first electrode and the second electrode to determine the distance between the first electrode and the second electrode; and
generate other capacitive image data representative of the shape of the capacitive imaging glove based on the distance between the first electrode and the second electrode that is determined based on the another capacitance.

16. The capacitive imaging glove of claim 15, wherein:
the signal includes a first one or more characteristics including a first frequency; and
the another signal includes a second one or more characteristics including a second frequency that is different than the first frequency.

17. The capacitive imaging glove of claim 11, wherein:
another DSC of the plurality of DSCs, when enabled, configured to:
- receive another reference signal and to generate another signal based on the another reference signal;
- provide the another signal to a third electrode of the plurality of electrodes via another single line and simultaneously to sense the another signal via the another single line, wherein sensing of the another signal includes detection of another impedance of the third electrode, and wherein the another signal is configured to be coupled from the third electrode to a fourth electrode of the plurality of electrodes via another gap between the third electrode and the fourth electrode within the capacitive imaging glove; and
- generate another digital signal representative of the another impedance of the third electrode;

the one or more processing modules, when enabled, is further configured to execute the operational instructions to:
- process the another digital signal representative of the another impedance of the third electrode to determine another capacitance associated with the distance between the first electrode and the second electrode;
- process the another capacitance associated with the distance between the first electrode and the second electrode to determine the distance between the first electrode and the second electrode; and
- generate other capacitive image data representative of the shape of the capacitive imaging glove based on the distance between the first electrode and the second electrode that is determined based on the another capacitance.

18. The capacitive imaging glove of claim 17, wherein:
- the signal includes a first one or more characteristics including a first frequency; and
- the another signal includes a second one or more characteristics including a second frequency that is different than the first frequency.

19. The capacitive imaging glove of claim 11, wherein the DSC of the plurality of DSCs further comprises:
- a power source circuit operably coupled to the first electrode via the single line, wherein, when enabled, the power source circuit is configured to provide the signal that includes an alternating current (AC) component via the single line coupling to the first electrode; and
- a power source change detection circuit operably coupled to the power source circuit, wherein, when enabled, the power source change detection circuit is configured to:
  - detect an effect on the signal that is based on the electrical characteristic of the first electrode; and
  - generate the digital signal representative of the electrical characteristic of the first electrode that corresponds to the distance between the first electrode and the second electrode.

20. The capacitive imaging glove of claim 19 further comprising:
- the power source circuit including a power source to source at least one of a voltage or a current to the first electrode via the single line; and
- the power source change detection circuit including:
  - a power source reference circuit configured to provide at least one of a voltage reference or a current reference based on the reference signal; and
  - a comparator configured to compare the at least one of the voltage or the current provided to the first electrode via the single line to the at least one of the voltage reference or the current reference to produce the signal.

* * * * *